(12) United States Patent  (10) Patent No.: US 9,090,274 B1
Arjomand et al.  (45) Date of Patent: Jul. 28, 2015

(54) CONVERTIBLE CARGO CONTAINER

(71) Applicants: Hamid Arjomand, Tigard, OR (US); Phillip H. Neal, San Rafael, CA (US)

(72) Inventors: Hamid Arjomand, Tigard, OR (US); Phillip H. Neal, San Rafael, CA (US)

( * ) Notice: Subject to any disclaimer, the term of this patent is extended or adjusted under 35 U.S.C. 154(b) by 0 days.

(21) Appl. No.: 14/481,235

(22) Filed: Sep. 9, 2014

Related U.S. Application Data

(63) Continuation of application No. 13/568,031, filed on Aug. 6, 2012, now abandoned.

(60) Provisional application No. 61/515,828, filed on Aug. 5, 2011.

(51) Int. Cl.
*B62B 3/02* (2006.01)
(52) U.S. Cl.
CPC ........................................ *B62B 3/02* (2013.01)
(58) Field of Classification Search
CPC .... A45F 4/02; A45C 5/146; A45C 2009/005; B62K 3/002; B62B 5/0026; B62B 5/087; B62B 2202/24
See application file for complete search history.

(56) References Cited

U.S. PATENT DOCUMENTS

| | | | |
|---|---|---|---|
| 3,314,494 A | 4/1967 | Weitzner | |
| 6,076,641 A | 6/2000 | Kinzer et al. | |
| 6,182,981 B1 | 2/2001 | Kuo | |
| 6,301,746 B1 | 10/2001 | Myers et al. | |
| 6,315,307 B1 * | 11/2001 | Chen et al. | 280/40 |
| 6,332,621 B1 | 12/2001 | Wu | |
| 6,460,866 B1 * | 10/2002 | Altschul et al. | 280/30 |
| 6,478,315 B1 | 11/2002 | Manesis | |
| 6,688,614 B2 * | 2/2004 | Hsu | 280/37 |
| 6,802,409 B1 | 10/2004 | Tiramani et al. | |
| 6,938,740 B2 | 9/2005 | Gandy | |
| 6,953,199 B2 | 10/2005 | Malloy, III | |
| 7,011,319 B2 | 3/2006 | Lu | |
| 7,014,020 B2 | 3/2006 | Tamura | |
| 7,029,015 B2 * | 4/2006 | Lin | 280/47.26 |
| 7,097,181 B2 | 8/2006 | Sadow | |
| 7,134,677 B2 * | 11/2006 | Opsvik | 280/87.041 |
| 7,246,805 B2 | 7/2007 | Neal et al. | |
| 7,431,311 B2 * | 10/2008 | Turner et al. | 280/30 |
| 7,614,628 B2 | 11/2009 | O'Connor | |
| 7,731,204 B2 | 6/2010 | Turner et al. | |
| 7,837,206 B1 * | 11/2010 | Lee | 280/37 |
| 8,201,837 B2 * | 6/2012 | Dweek | 280/30 |
| 8,282,109 B1 * | 10/2012 | Arjomand et al. | 280/37 |
| 8,282,113 B2 * | 10/2012 | Veal et al. | 280/87.041 |
| 8,540,252 B2 * | 9/2013 | Arjomand et al. | 280/37 |
| 8,695,999 B2 * | 4/2014 | Von Bismarck | 280/87.041 |
| 2002/0043544 A1 | 4/2002 | Caneba | |

(Continued)

FOREIGN PATENT DOCUMENTS

| | | |
|---|---|---|
| KR | 200236701 | 10/2001 |
| WO | 2008090571 A1 | 7/2008 |
| WO | 2013022860 A2 | 2/2013 |

*Primary Examiner* — Brodie Follman

(74) *Attorney, Agent, or Firm* — Patent Law Offices of Michael E. Woods; Michael E. Woods

(57) ABSTRACT

An apparatus which is convertible from a portable cargo container to a wheeled vehicle. In particular, the present invention is a backpack or article of luggage that includes a deployable wheeled platform so that the backpack or luggage is convertible to a scooter type vehicle. The present invention is particularly useful for transporting relatively heavy loads along with a human operator, quickly and with minimal effort.

11 Claims, 65 Drawing Sheets

(56) References Cited

U.S. PATENT DOCUMENTS

| | | |
|---|---|---|
| 2003/0001351 A1 | 1/2003 | Schauble et al. |
| 2003/0042711 A1* | 3/2003 | Hsu ............................. 280/651 |
| 2004/0056442 A1* | 3/2004 | Ostrowski et al. ....... 280/87.041 |
| 2004/0094919 A1* | 5/2004 | Roder et al. .................... 280/30 |
| 2004/0238303 A1 | 12/2004 | Hafif |
| 2006/0071436 A1 | 4/2006 | O'Connor |
| 2006/0273534 A1 | 12/2006 | Turner et al. |
| 2008/0042379 A1 | 2/2008 | Amran |
| 2009/0066045 A1 | 3/2009 | Turner et al. |
| 2009/0315301 A1* | 12/2009 | Athalye ........................ 280/651 |
| 2010/0213680 A1 | 8/2010 | Massara et al. |
| 2011/0155527 A1 | 6/2011 | Veal et al. |
| 2012/0013089 A1* | 1/2012 | Reeves ....................... 280/47.26 |
| 2013/0033012 A1* | 2/2013 | Arjomand et al. ........... 280/7.17 |
| 2013/0033020 A1 | 2/2013 | Arjomand et al. |
| 2013/0056950 A1* | 3/2013 | Von Bismarck .............. 280/269 |

* cited by examiner

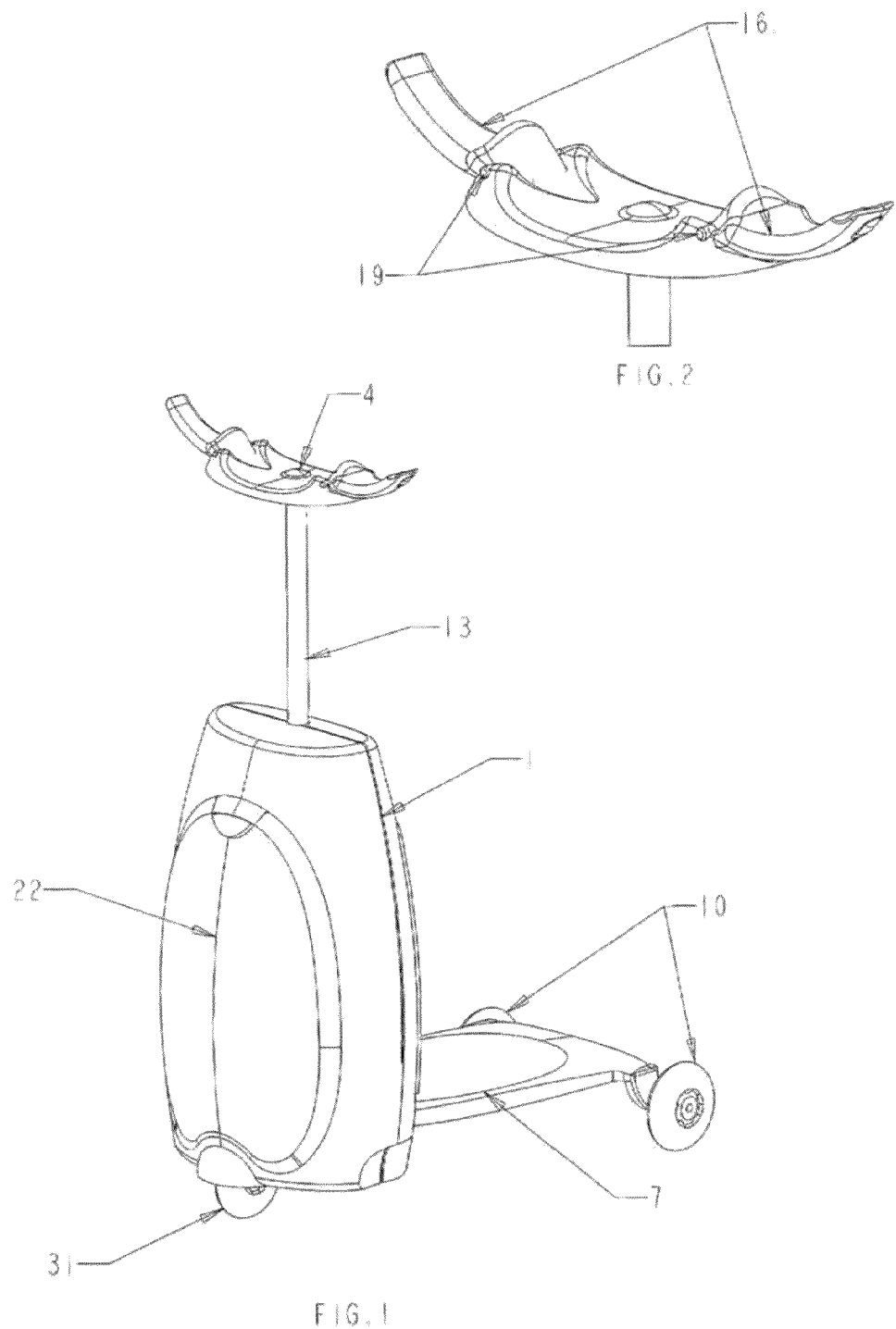

CONVERTIBLE CARGO CONTAINER

CROSS REFERENCE TO RELATED APPLICATIONS

This application is a continuation of U.S. patent application Ser. No. 13/568,031 which claims the benefit of U.S. Provisional Application No. 61/515,828, filed 5 Aug. 2011 and is related to U.S. patent application Ser. No. 12/769,187 filed Apr. 28, 2010 titled CONVERTIBLE CARGO CONTAINER, the entireties of these contents hereby expressly incorporated by reference herein for all purposes.

FIELD OF THE INVENTION

This invention relates generally to an apparatus which is convertible from a portable cargo container to a wheeled vehicle, and more particularly, but not exclusively, to a backpack or article of luggage that includes a deployable wheeled platform so that the backpack or luggage is convertible to a scooter type vehicle. Some embodiments of the present invention are particularly useful for transporting relatively heavy loads along with a human operator, quickly and with minimal effort.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Backpacks and articles of luggage combining wheels and retractable pull handles are well known in the art. Although these devices aid in transporting cargo, they do not aid in transporting a human operator.

Likewise, foldable scooters and bicycles as disclosed in U.S. Pat. No. 3,680,879 are also well known in the art. These devices provide a convenient means of transporting a bike or scooter, but do not provide an operator the ability to carry any cargo.

Other portable wheeled devices known in the art are described in U.S. Pat. No. 6,155,579 which discloses a foldable child stroller and U.S. Pat. No. 5,791,670 which discloses an article carrying device. U.S. Pat. Nos. 5,609,278, 5,984,154, 5,483,495, 6,179,176, 4,036,336, 5,749,503, 5,881,932, and 5,743,447 all disclose wheeled carrying devices with alternative carrying devices.

Convertible backpacks that also function as rideable scooters can be susceptible to folding and loading that sometimes pose physical risks to users. Some physical risks include folding and scissoring components that, without attention, may lead to pinching risks as a user transitions between the various modes.

Further, many deck transition/attachment systems can lead to unstable connections when the deck is open. It can be the case that the coupling that enables the end of the deck to fold for storage, also means that the attachment can be a point of failure during riding. Failure modes include instability or premature folding, particularly when a rider pushes forward, or pulls back, on a steering mechanism.

In some implementations having a backpack and a folding deck engaging a back of the backpack, the deck and folding hardware can add a significant distance between the backpack pack and the wearer. This distance can degrade the quality of the backpack function of being worn on the back and carrying items because the items extend too far away from the user.

An important consideration for some users is the ease by which a deck is transitioned between a closed mode and an open mode. For these users, a simple one-handed operable latching mechanism is superior. Unfortunately, for any latching solutions attempting to address other concerns identified herein, it can be a challenge to also maintain desired simplicity.

What is needed is a backpack or article of luggage that includes a deployable wheeled platform so that the backpack or luggage is convertible to a scooter type vehicle, preferably while reducing the drawbacks identified herein.

BRIEF SUMMARY OF THE INVENTION

The following summary of the invention is provided to facilitate an understanding of some of technical features related to a backpack including a deployable wheeled riding platform, and is not intended to be a full description of the present invention. A full appreciation of the various aspects of the invention can be gained by taking the entire specification, claims, drawings, and abstract as a whole. The present invention is applicable to other types of luggage and other deployable wheeled platforms.

Overcoming these problems by providing a convertible cargo container with a deployable wheeled platform is a primary objective of the present invention. Other objects of the invention will become apparent in light of the following disclosure and related claims.

A combination scooter, pull-pack, backpack with three user transportation modes: riding, pulling, and carrying. The Product design incorporates the following combination of unique characteristics and components: An integrated three-wheeled scooter where, in ride mode, one wheel is located at the front end of the cargo carrier, and the other two wheels are located at the rear of a deployable riding platform so as to be functional in both ride mode with the platform deployed, and in pull mode with the platform retracted; an integrated cargo carrier component; a fully deployable and retractable riding platform with an integrated linkage between the cargo carrier and platform such that all three wheels remain in contact with the ground allowing the cargo carrier to remain standing upright while transforming between open and closed positions, as well as through the transition between these positions; an integrated roller(s) mechanism on the end of the platform that allows the platform to easily roll up and down between open and closed positions; a latching mechanism(s) integrated into the platform that allows the platform to be secured in both open and closed positions; an offset steering mechanism with a linkage to the front wheel chassis allowing the rider to turn the scooter's front wheel free of the cargo payload weight resistance in order to achieve the desired turn; integrated strap(s) for carrying the entire unit when riding and pulling aren't convenient; an integrated and vertically adjustable handlebar component; and an integrated friction brake pedal on the rear of the platform that slows both rear wheels when depressed in ride mode.

Embodiments of the present invention is generally comprised of three main components, a cargo container 1, a handle 4, and a retractable platform 7 having wheels 10, which can be converted to three basic modes, a backpack, wheeled luggage, and a scooter type vehicle. The first backpack mode is suitable for carrying light loads or loads over rough terrain. The second wheeled luggage mode is most suited to carrying cargo in medium traffic areas with generally flat terrain, such as an airport. The third scooter type vehicle mode is well suited to transporting a load as well as the operator great distances over low traffic areas with generally flat terrain. The third scooter type mode is also particularly advantageous when time is of the essence. The invention thus overcomes several problems associated with manually hauling cargo efficiently, while also providing a means to transport an operator along with the payload.

A mobility cargo platform includes a vertically extending central main support having a longitudinal channel extending from a bottom end to a top end and a track assembly disposed along an outside of the vertically extending main support extending upwardly from a first location proximate the bottom end to a second location toward the top end; a steering handle rotatably disposed inside the longitudinal channel and extending from the bottom end above the top end controlling a direction; a steerage linkage coupled to the steering handle at the bottom end and extending in a first direction away from the vertically extending central main support; a steering wheel assembly, coupled to the steerage linkage; a stowable rider deck having a proximal end including a track engagement assembly coupled to the track assembly and a distal end coupled to a rear wheel assembly, the stowable rider deck repeatably transitionable between a closed mode in which the proximal end is proximate the second location with the rider deck generally vertical and an open mode in which the proximal end is proximate the first location with the rider deck generally horizontal; a cargo container coupled to the vertically extending central main support; and a latching assembly, coupled to the stowable rider deck, securing the stowable rider deck in the closed mode.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention. The forgoing and other features and advantages of the invention will be apparent from the detailed description contained herein below, taken in conjunction with the drawings, in which:

FIG. 1 is a front isometric view of a first embodiment of the present invention in a fully extended riding position.

FIG. 2 is an isometric view of the handles of the first embodiment in a deployed position.

FIG. 54 illustrates a rear perspective view of the alternative embodiment in an open mode.

FIG. 55 illustrates a rear perspective view of the alternative embodiment in an intermediate mode.

FIG. 56 illustrates a rear perspective view of the alternative embodiment in a closed mode.

FIG. 57 illustrates a side view of the alternative embodiment in the open mode.

FIG. 58 illustrates a side view of the alternative embodiment in the intermediate mode.

FIG. 59 illustrates a side view of the alternative embodiment in the closed mode.

FIG. 60 illustrates a top view of a portion of the wheeled rideable platform engaging a main tube.

FIG. 61 illustrates a top view of the lateral rails of FIG. 60.

FIG. 62 illustrates a section of a front perspective view of the alternative embodiment.

FIG. 63 illustrates a bottom perspective view of the section illustrated in FIG. 62.

FIG. 64 illustrates the bottom perspective view of the section illustrated in FIG. 63 without a protective shroud.

FIG. 65 illustrates a front perspective view of the sliding linkage in the intermediate open mode.

FIG. 66 illustrates a detail view of the sliding linkage shown in FIG. 65.

FIG. 67 illustrates a front perspective view of the sliding linkage in the open mode.

FIG. 68 illustrates the perspective view of FIG. 65 with the sliding linkage shroud removed.

FIG. 69 illustrates a perspective view of the latch mechanism in the latched position.

FIG. 70 illustrates a side view of the latch mechanism of FIG. 69.

FIG. 71 illustrates a perspective view of the latch mechanism in the unlatched position.

FIG. 72 illustrates a side view of the latch mechanism of FIG. 71.

FIG. 73 illustrates a side cross-section of engagement of the latch mechanism in the open mode.

DETAILED DESCRIPTION OF THE INVENTION

Embodiments of the present invention provide a system and method for a backpack or article of luggage that includes a deployable wheeled platform so that the backpack or luggage is convertible to a scooter type vehicle, preferably while reducing the drawbacks identified herein. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 3:
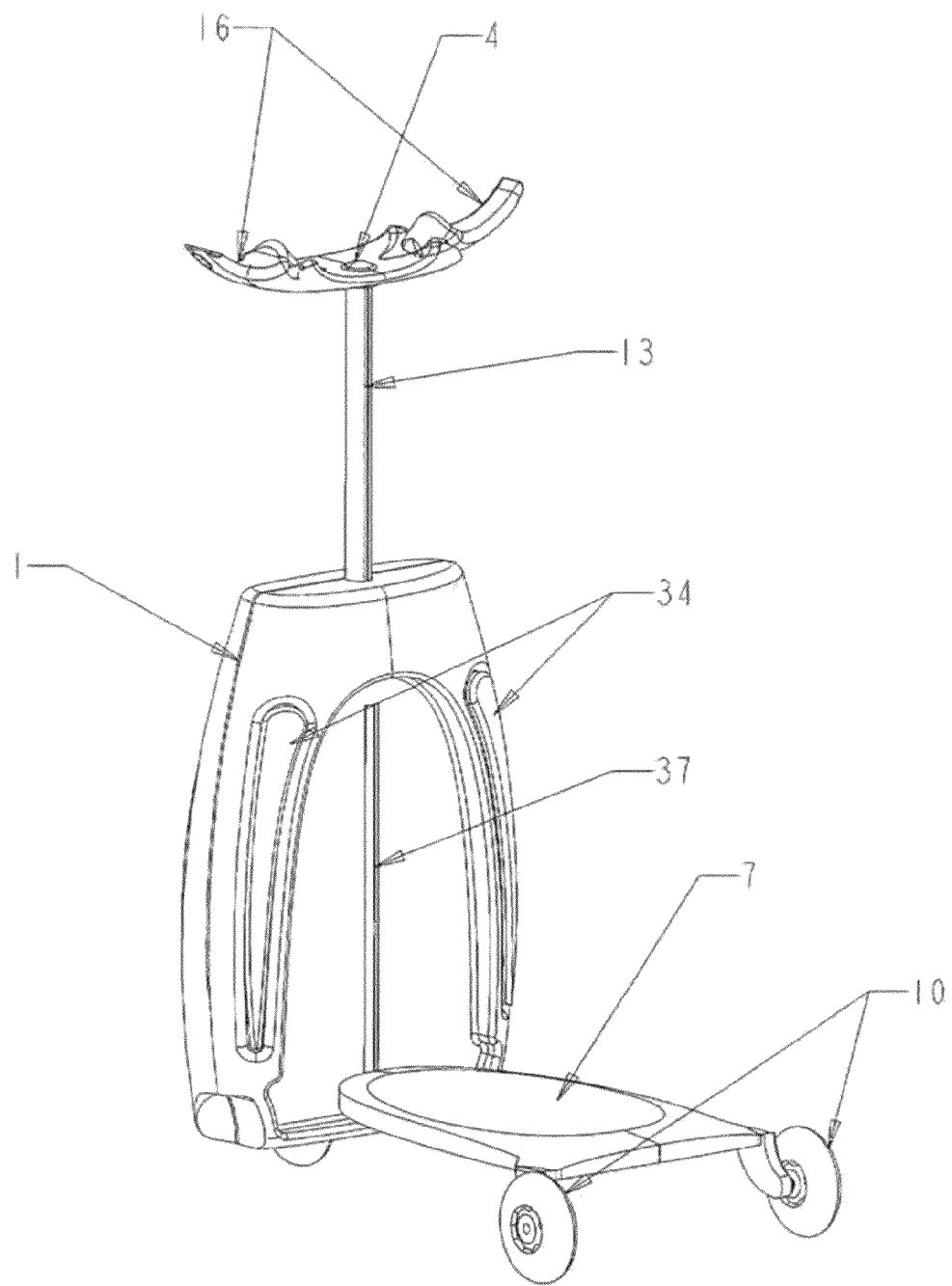
FIG. 3 is a rear isometric view of the first embodiment of the present invention in a fully extended riding position.
Figure 6:
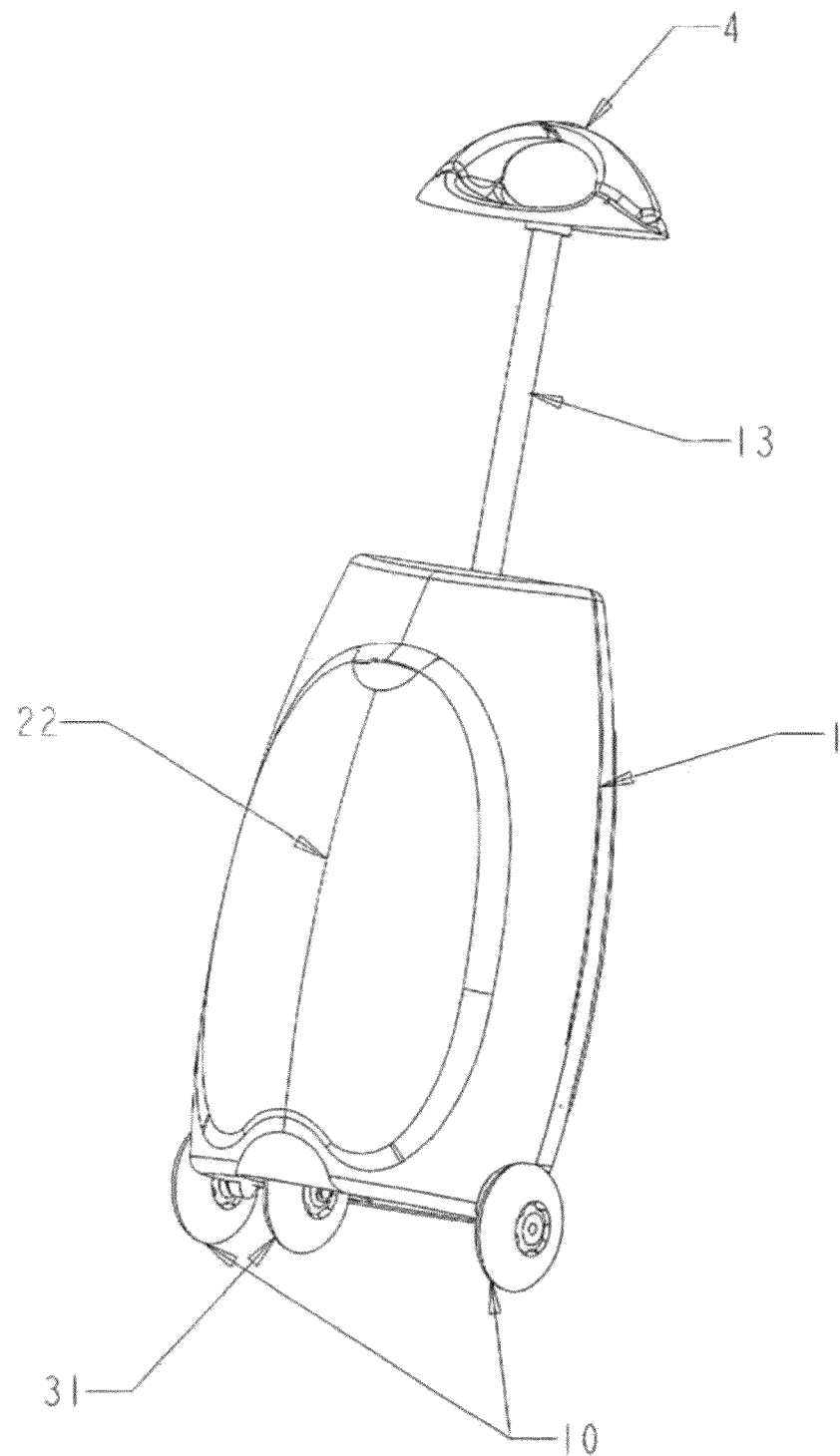
FIG. 6 is a front isometric view of the first embodiment with the platform in a retracted position and the handles closed and in an extended position.
Figure 7:
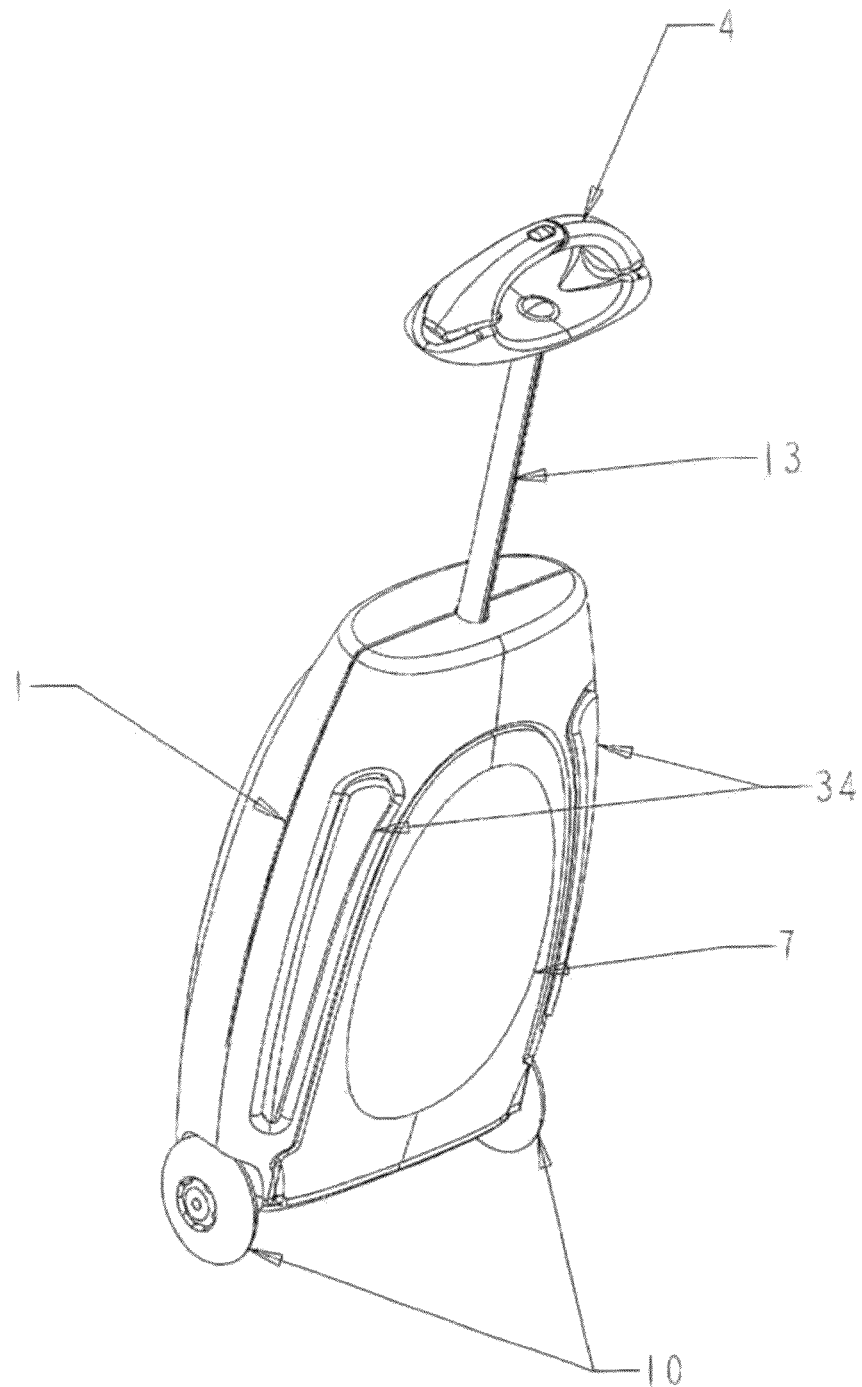
FIG. 7 is a rear isometric view of FIG. 5.
Figure 8:
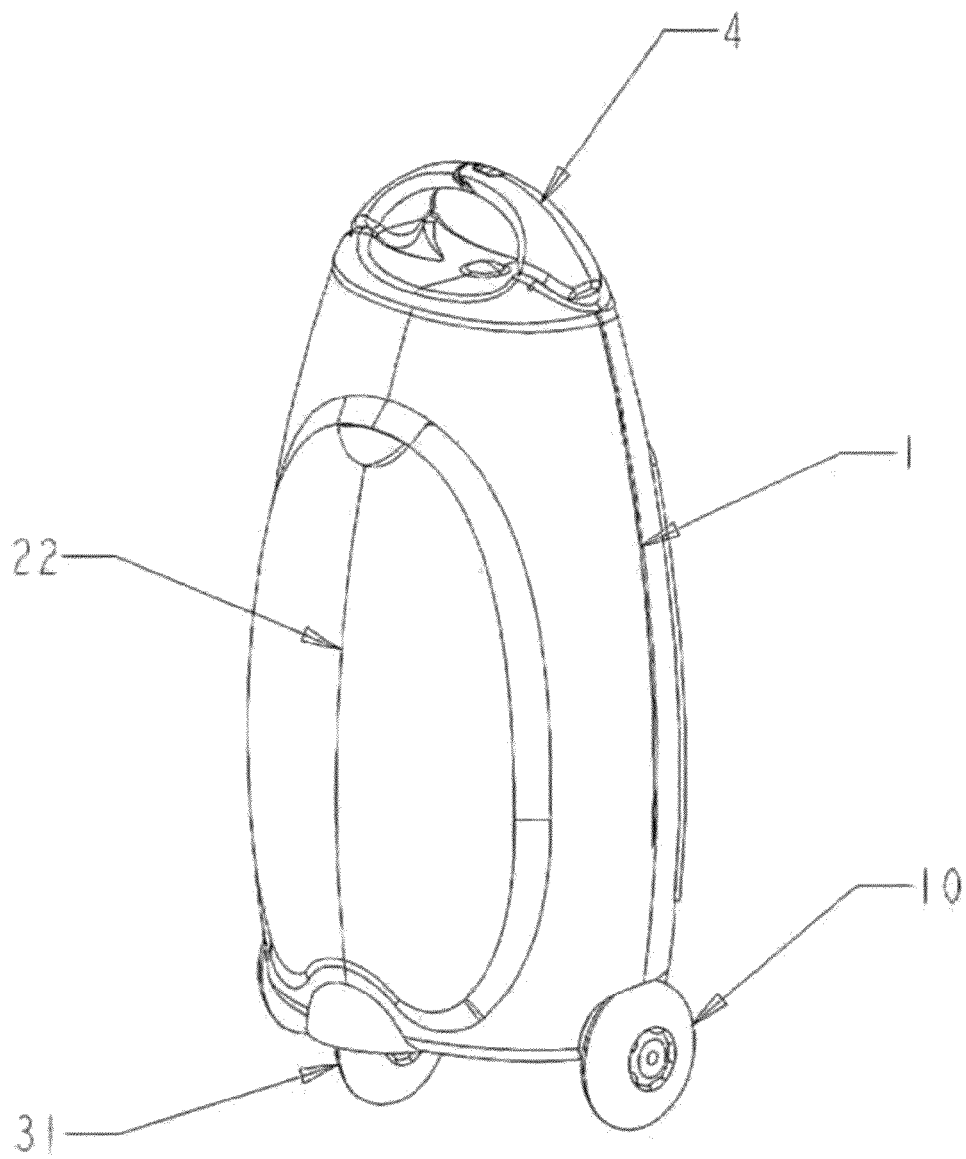
FIG. 8 is a front isometric view of the first embodiment with the present invention in a fully retracted position.
Figure 9:
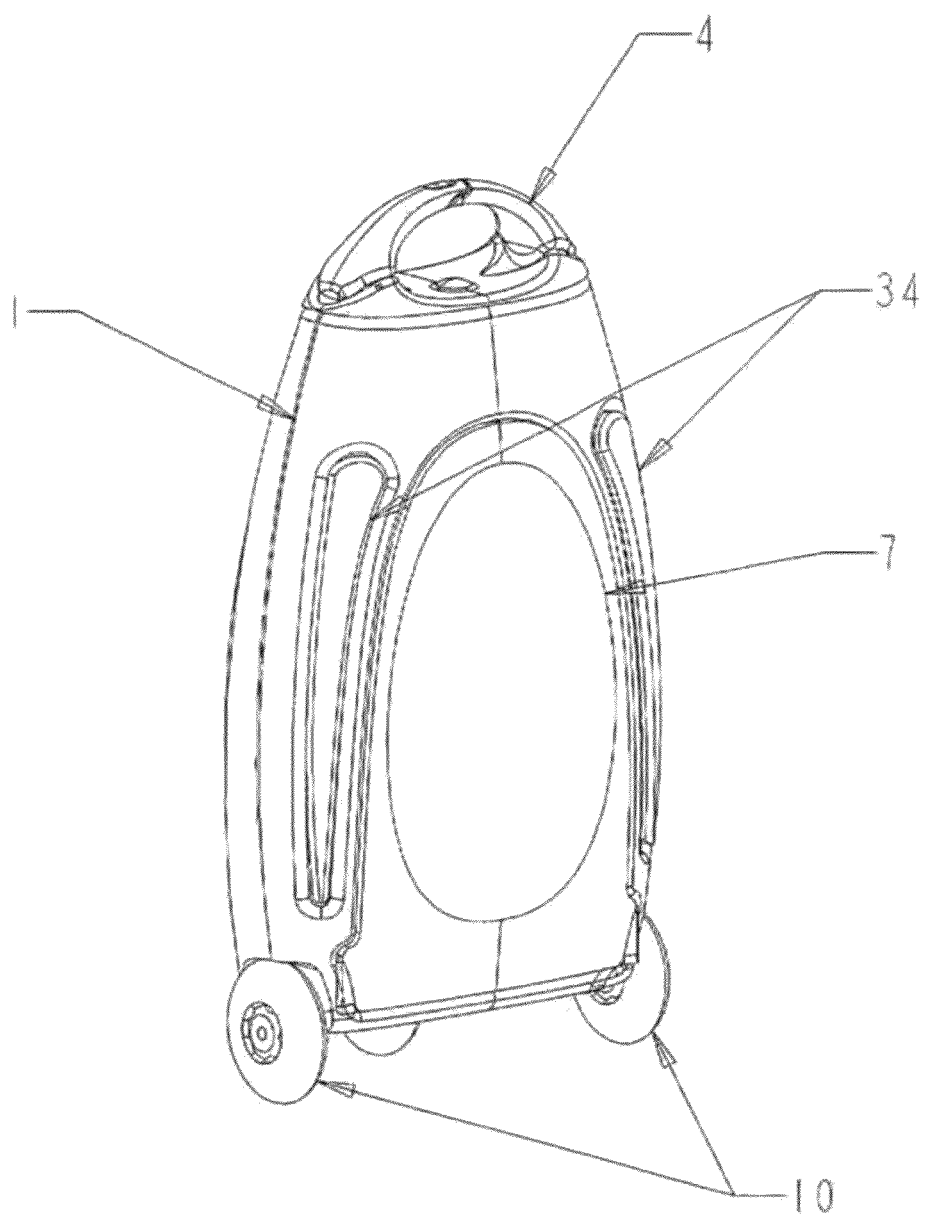
FIG. 9 is a rear isometric view of the first embodiment with the present invention in a fully retracted position.

Embodiments of the present invention include a cargo container which can be converted into a scooter type vehicle for transporting a person and his cargo. Embodiments generally include three main components, a cargo container 1, a handle 4, and a retractable platform 7 having wheels 10. The invention has three use positions including riding, as shown in FIGS. 1-3, pulling/pushing, as shown in FIGS. 6-7 and carrying as shown in FIGS. 8-9.

Referring specifically to FIGS. 1 and 2, the convertible cargo container is seen in its ride mode having retractable platform 7 deployed to a position substantially perpendicular to cargo container 1. The cargo container 1 can be manufactured of hard shell plastic such as ABS, or lightweight metal. Wheels 10 are mounted at the outer edges of the lower end of platform 7. Platform 7 can be made of any suitably light, strong material such as plastic or thin metal to achieve rigidity and low weight. Wheels 10 can be fabricated of any suitable polymer, plastic, rubber, or synthetic rubber. Additionally, it is noted that the platform could also have a single rear wheel centrally mounted. Telescoping tube 13 is shown in its extended position and handles 4 are pivoted to their horizontal position about pivots 19 forming a handle bar 16. Telescoping tube 13 uses spring biases balls and detents so that it can maintain its extended and retracted positions. Handles 4 can be pivoted to a closed position as shown in FIGS. 4-10 when it is desired to push/pull or carry the cargo container. In push/pull or carry mode the platform 7 is retracted to a position that is substantially parallel to the rear side of the cargo container. Shoulder straps 34 are mounted on the cargo container in a conventional manner so that the invention can be carried as a backpack. Shoulder straps 34 may be detachable or retractable. Door 22 can be pivotally mounted or friction fit to provide access to main storage compartment 25. Platform 7 deploys along a slot 37 in the cargo container 1 and is slidably connected to telescoping tube 13 at its upper end through a sliding bearing 43.

Figure 12:
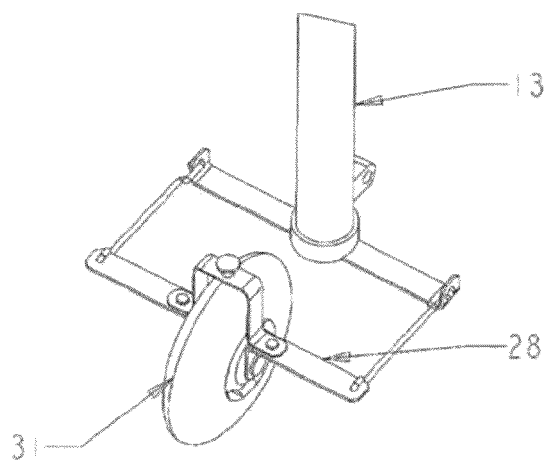
FIG. 12 is an isometric view of the telescoping steering tube and associated wheel.
Figure 11:
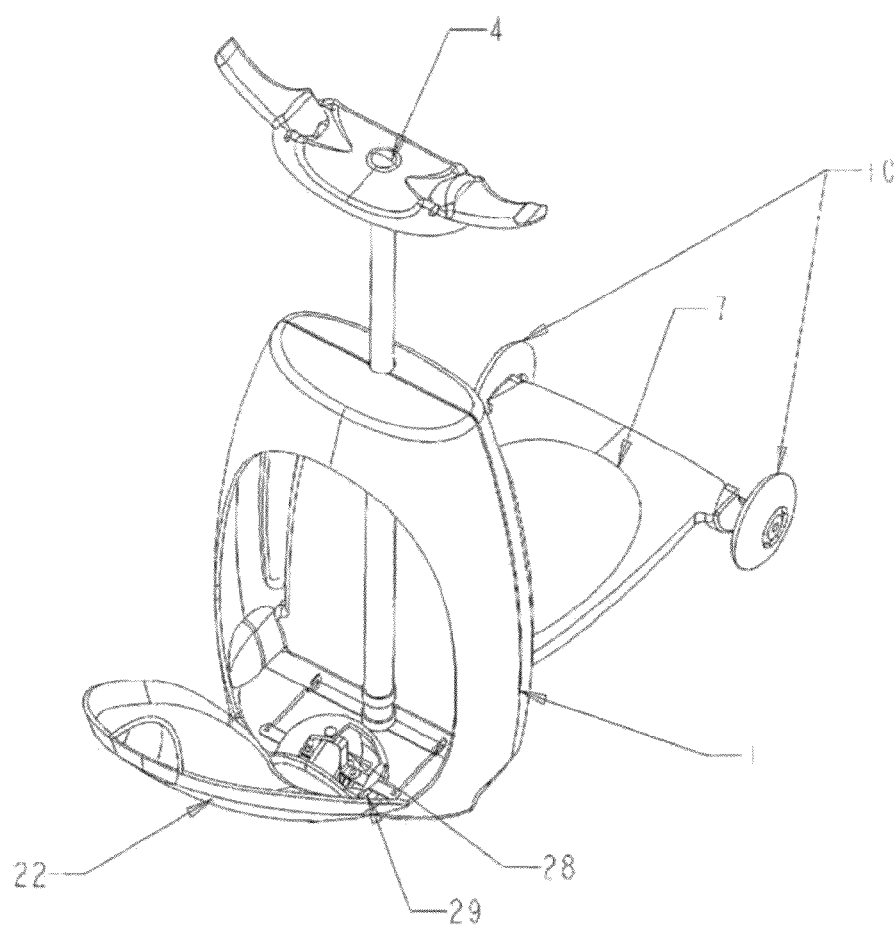
FIG. 11 is an isometric view of the first embodiment showing the telescoping steering tube and associated wheel.
Figure 14:
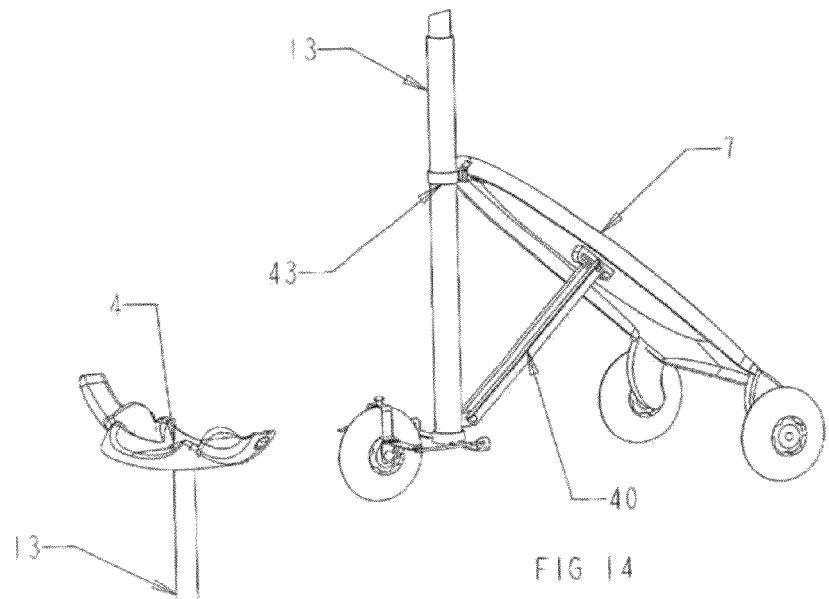
FIG. 14 is a front isometric view of the retractable platform.
Figure 13:
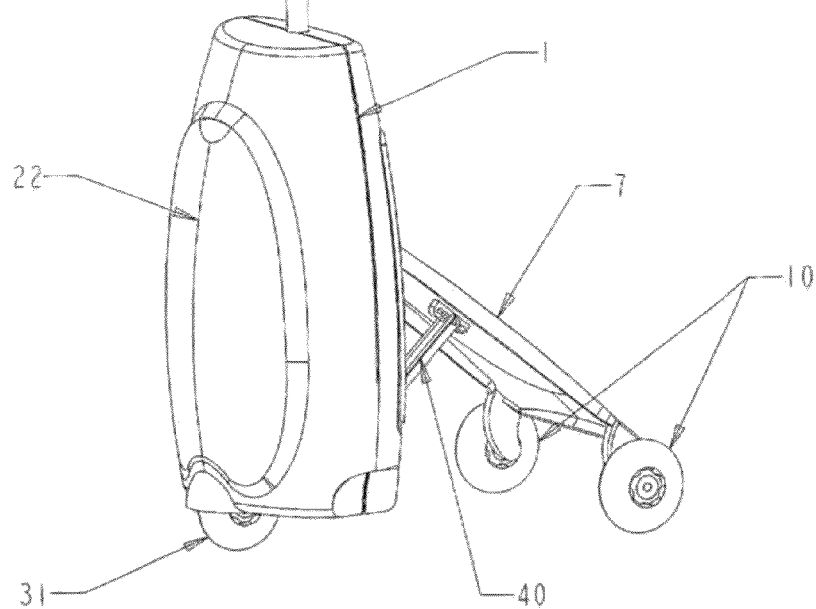
FIG. 13 is a front isometric view of the first embodiment showing the retractable platform.
Figure 16:
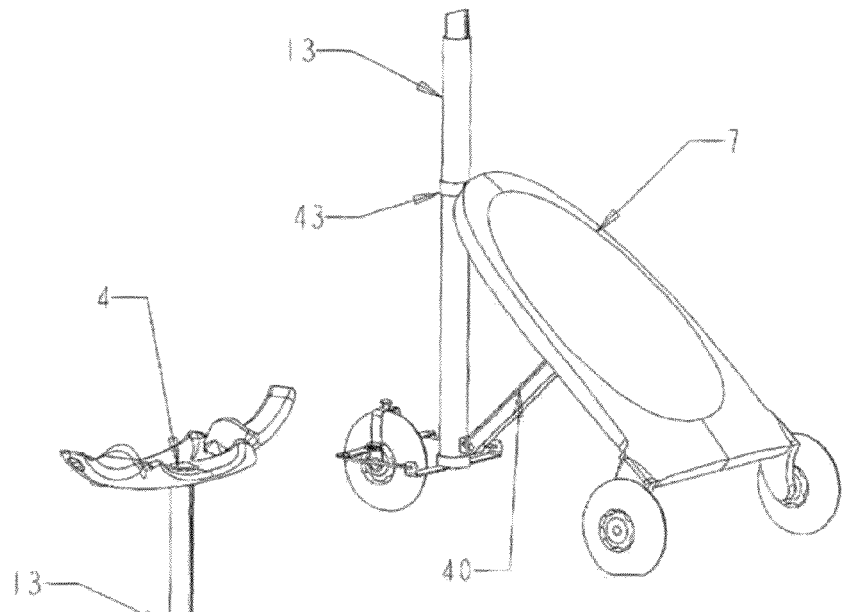
FIG. 16 is a rear isometric view of the retractable platform.
Figure 15:
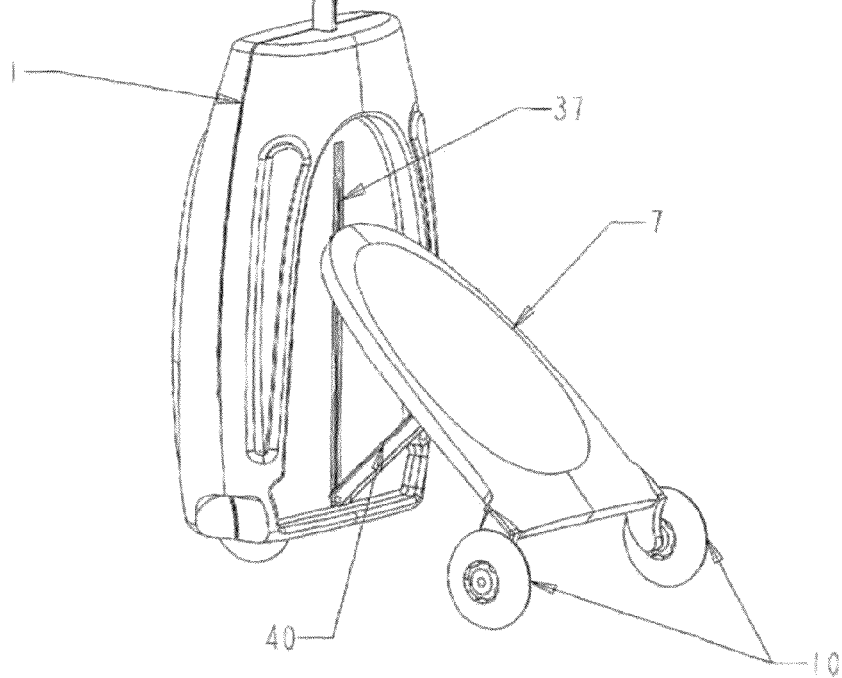
FIG. 15 is a rear isometric view of the first embodiment showing the retractable platform.

Telescoping tube 13 is rotatably mounted in the cargo container 1 as is distal end, and is connected to steering assembly 28 as shown in FIGS. 11-12. The frame of the steering assembly 28 can be rotated in the cargo container through arcuate slots 29. Front wheel 31 is rotatably mounted in steering assembly 28. The telescoping tube and steering assembly can be fabricated from any suitable lightweight metal or plastic.

As can best be seen in FIGS. 13-16, a linkage arm 40 pivotally connects platform 7 to the distal end of telescoping tube 13. In this manner, platform 7 can be retracted to its push/pull or carry position.

Figure 4:
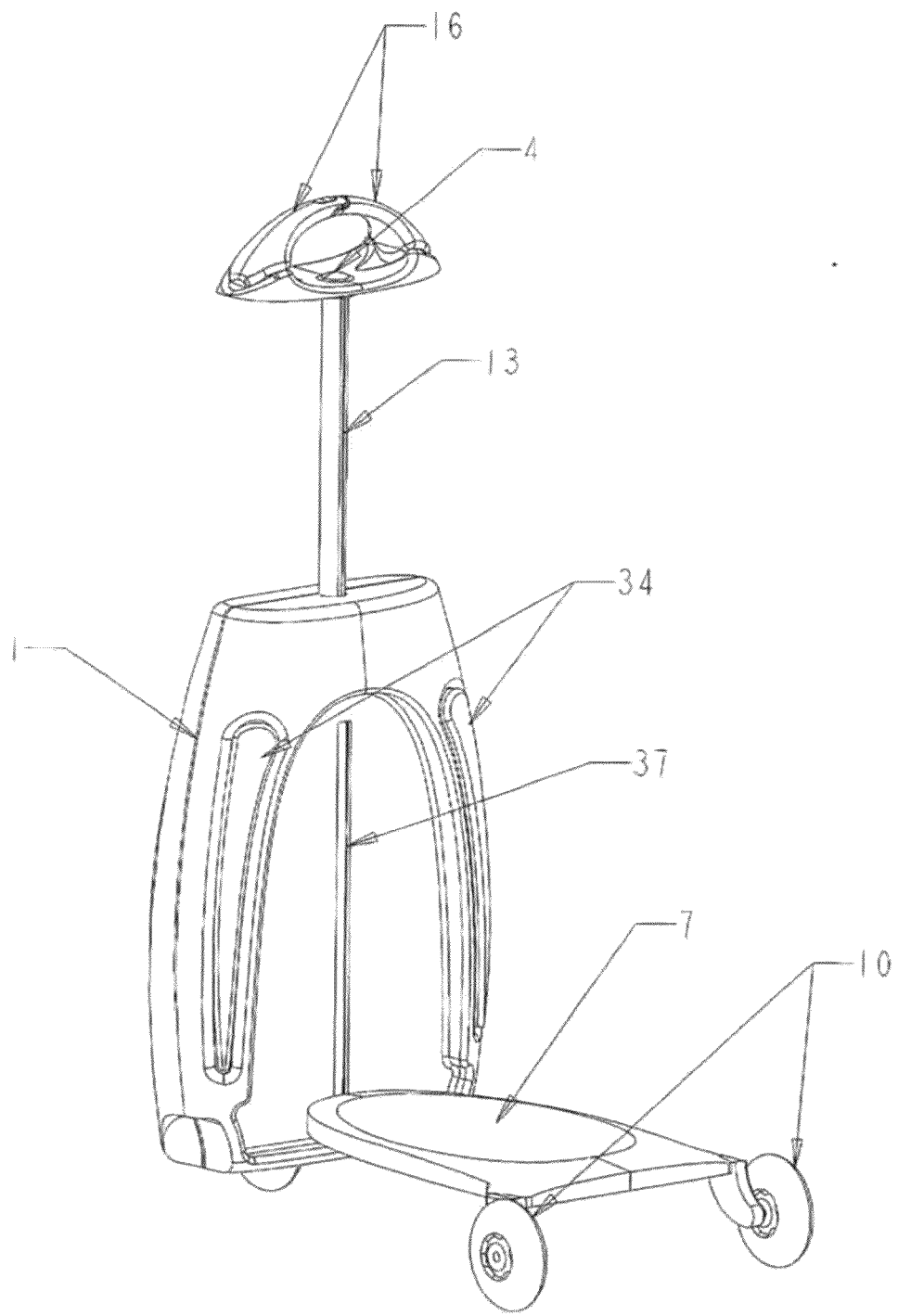
FIG. 4 is a rear isometric view of the first embodiment in an intermediate stage with the handles in a closed position.
Figure 5:
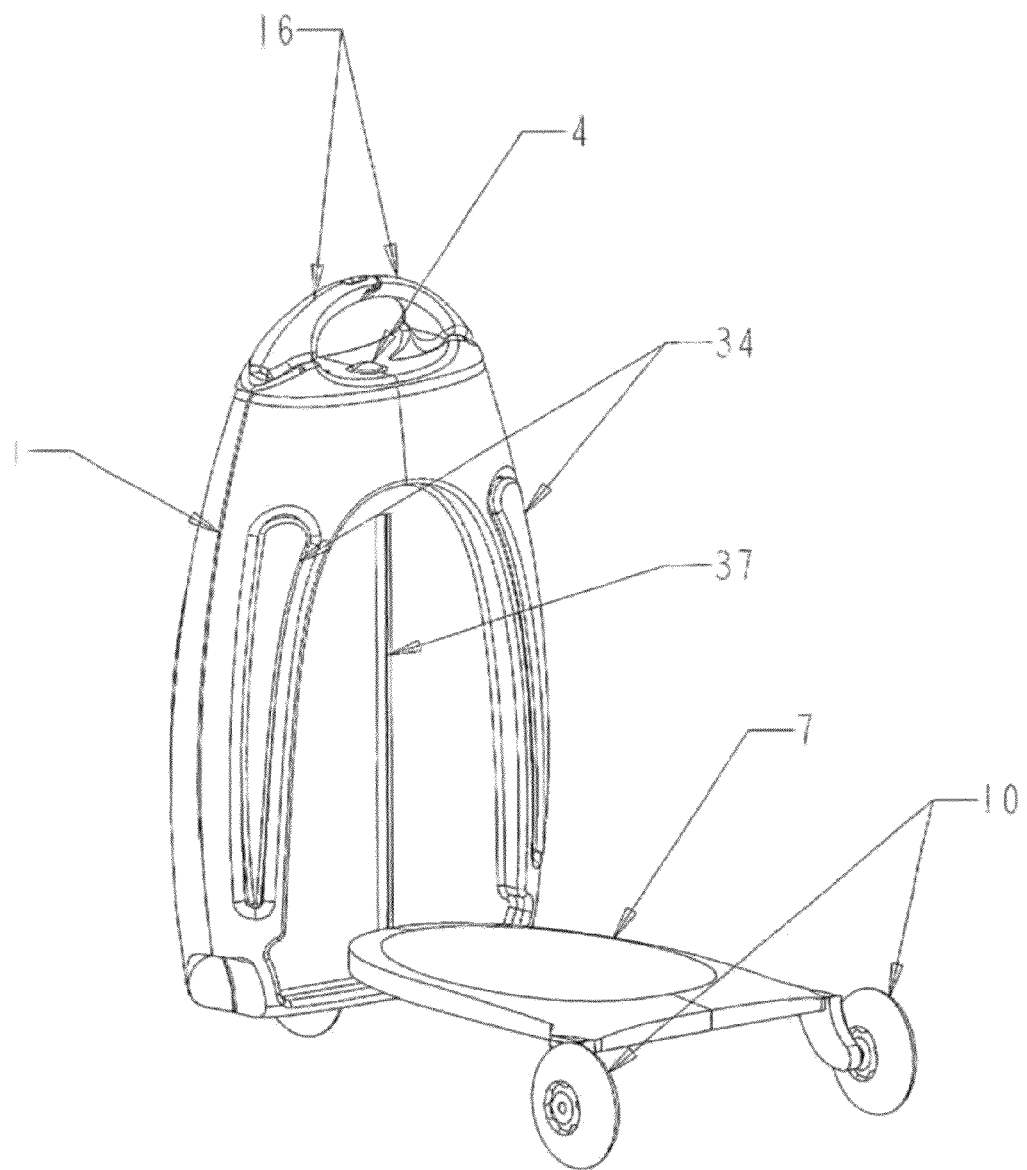
FIG. 5 is a rear isometric view of the first embodiment in an intermediate stage with the handles retracted and in a closed position.
Figure 10:
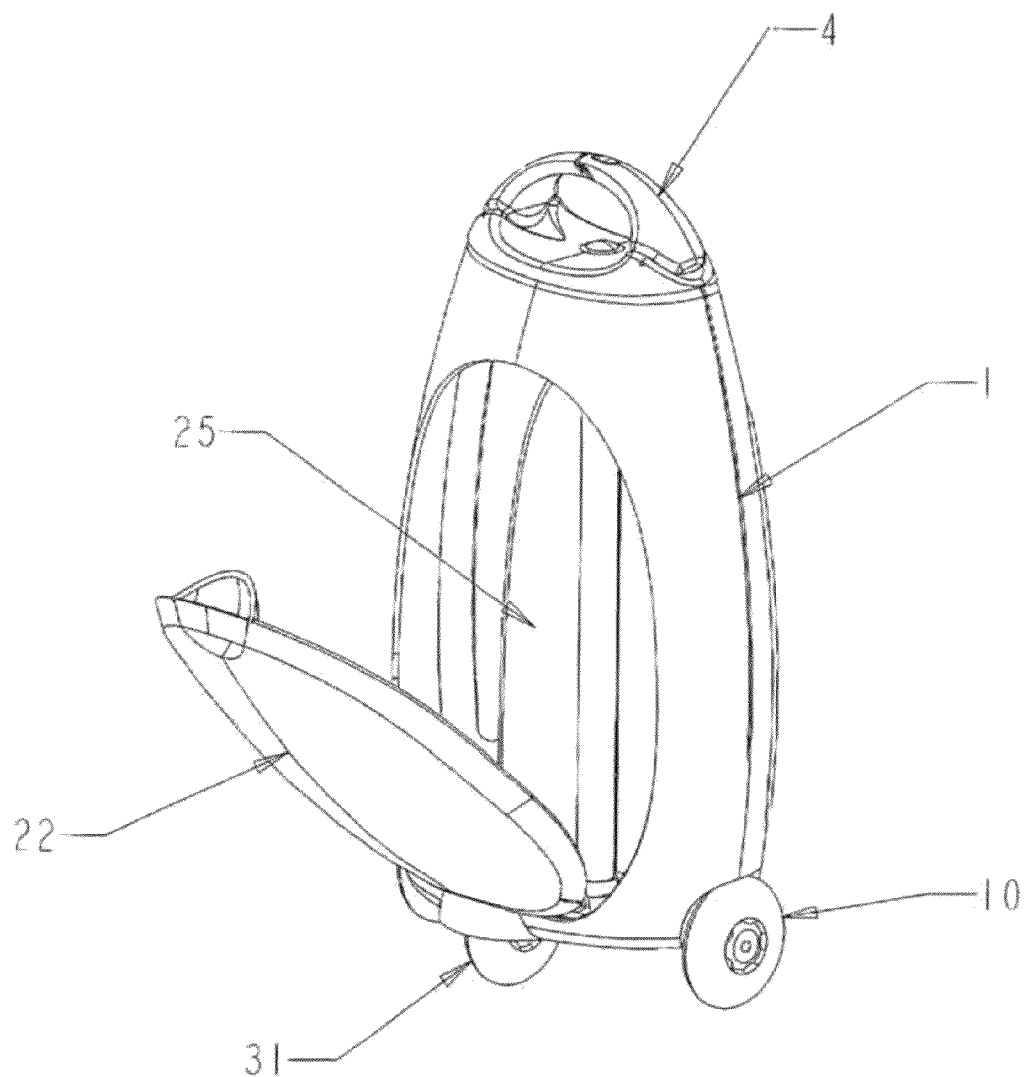
FIG. 10 is a front isometric view of the first embodiment with the present invention in a fully retracted position with the cargo container closure in an open position.

Operation of the device will now be described. When an operator wants to transport himself and cargo in scooter mode, the handles 4 are fully deployed as handle bar 16, and the platform 7 is fully deployed at a substantially perpendicular angle to the cargo container 1. The operator stands on platform 7 and steers the device with telescoping tube 13 and the attached steering assembly 28. When a high traffic area is encountered, the operator would step off the platform and pivot the handles to their closed position as shown in FIG. 4. Platform 7 would then be retracted along slot 37 until it is substantially parallel to the rear side of the cargo container 1 as shown in FIGS. 6 and 7. The apparatus is now in its wheeled luggage mode and can be transport on wheels 10 by pushing or pulling the closed handles. When carrying the apparatus is desirable, telescoping tube 13 is in its fully retracted position as shown in FIGS. 8-10, and the apparatus can be worn as a backpack utilizing shoulder straps 34. The bottom of platform 7 may be contoured to provide the operator lumber support when using the apparatus in backpack mode. The transition steps are reversed when switching from backpack mode to scooter mode. It is noted that the order the transitional steps are performed is not crucial, and may be altered.

Figure 17:
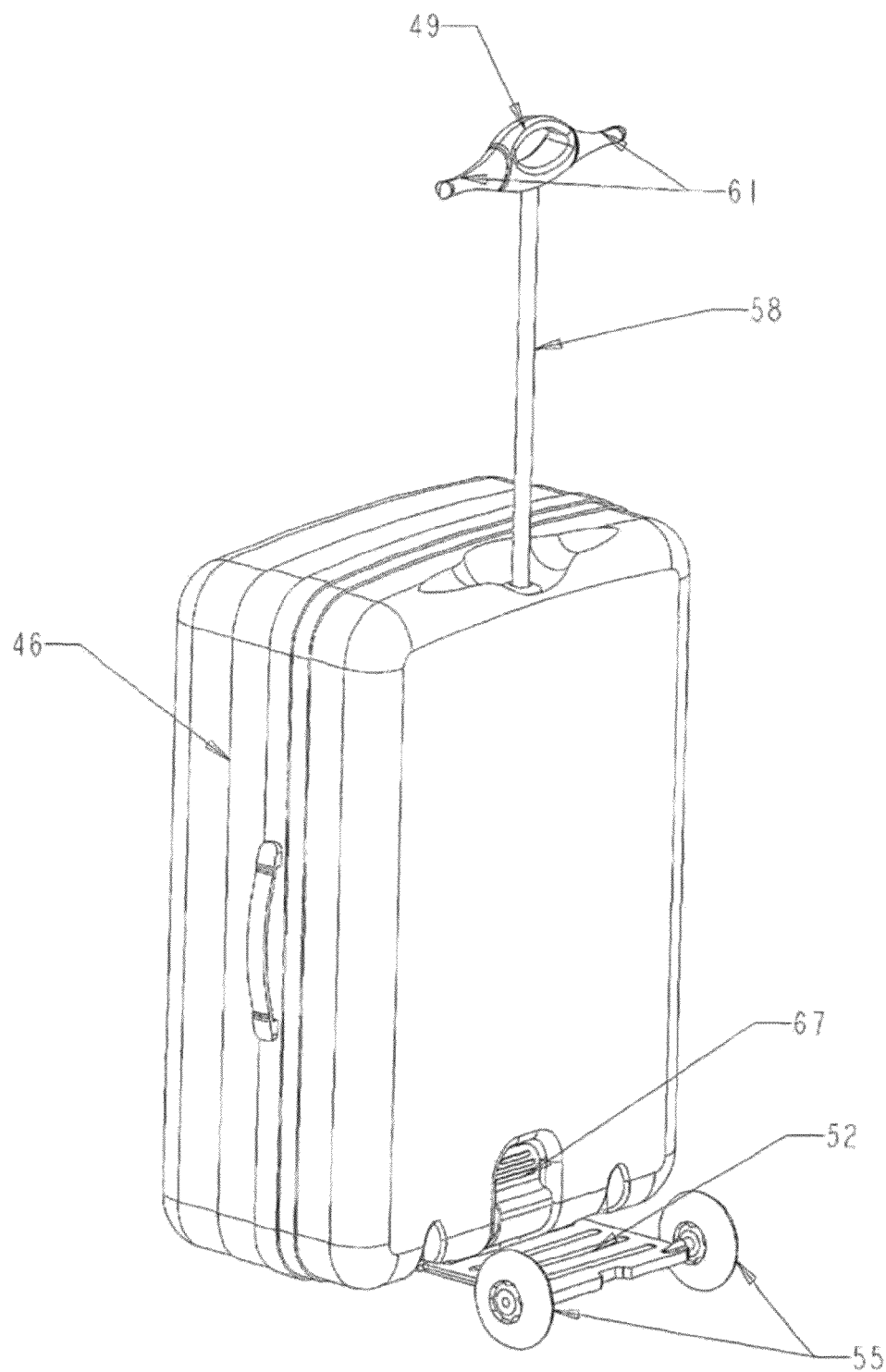
FIG. 17 is a rear isometric view of a second embodiment of the invention with its platform extended.
Figure 18:
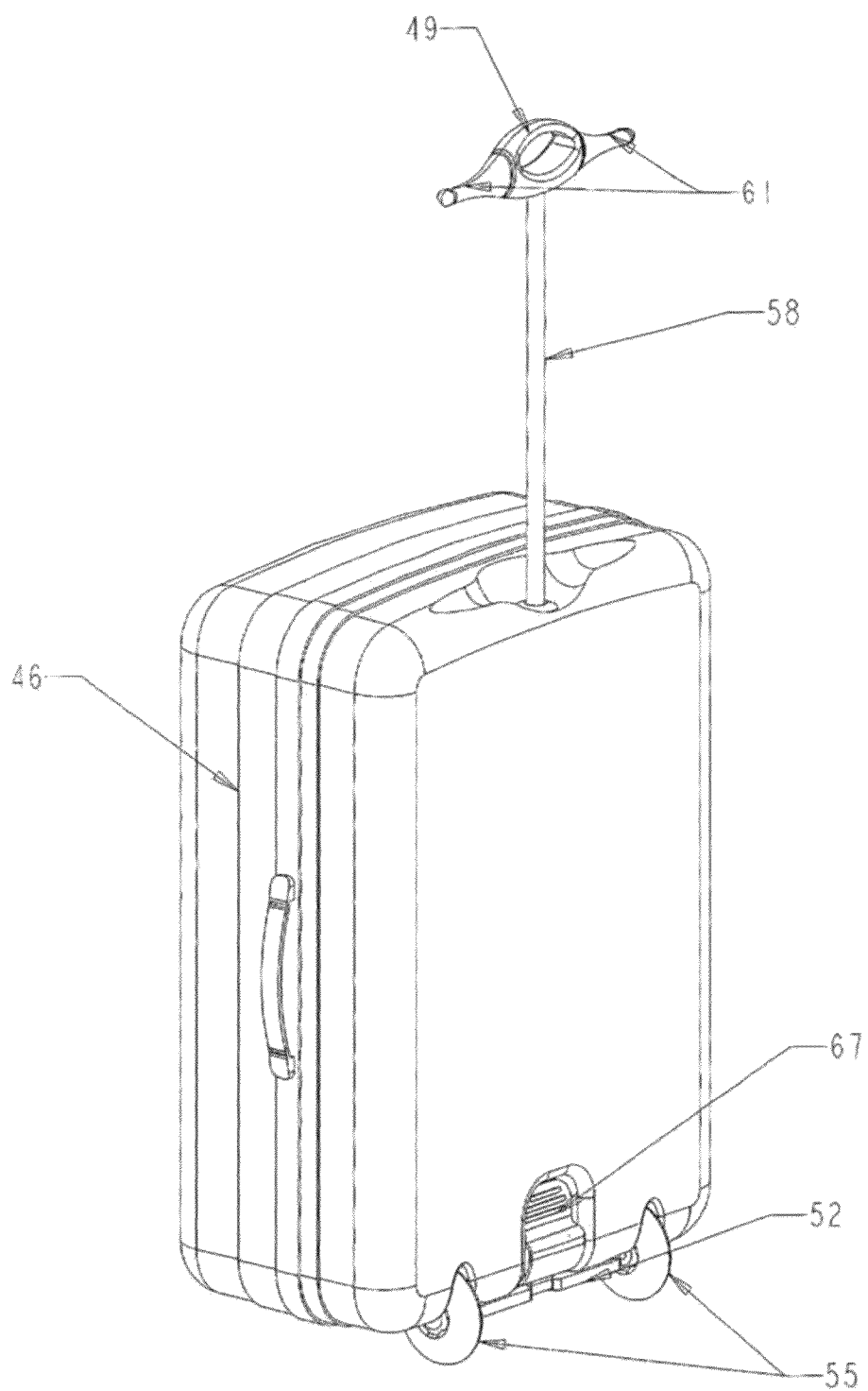
FIG. 18 is the same view as FIG. 17 with the platform retracted.
Figure 19:
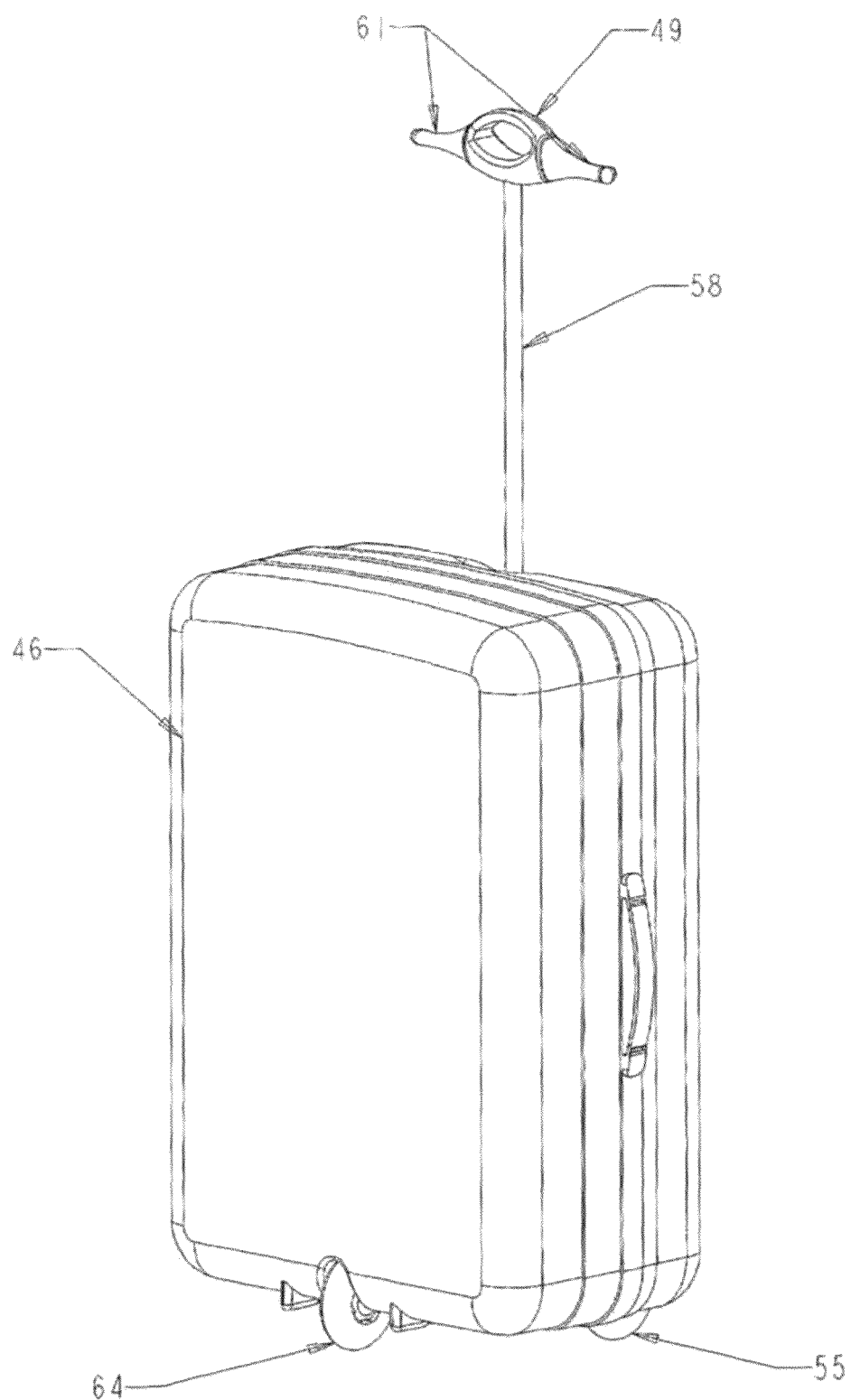
FIG. 19 is a front isometric view of the second embodiment of the invention.
Figure 20:
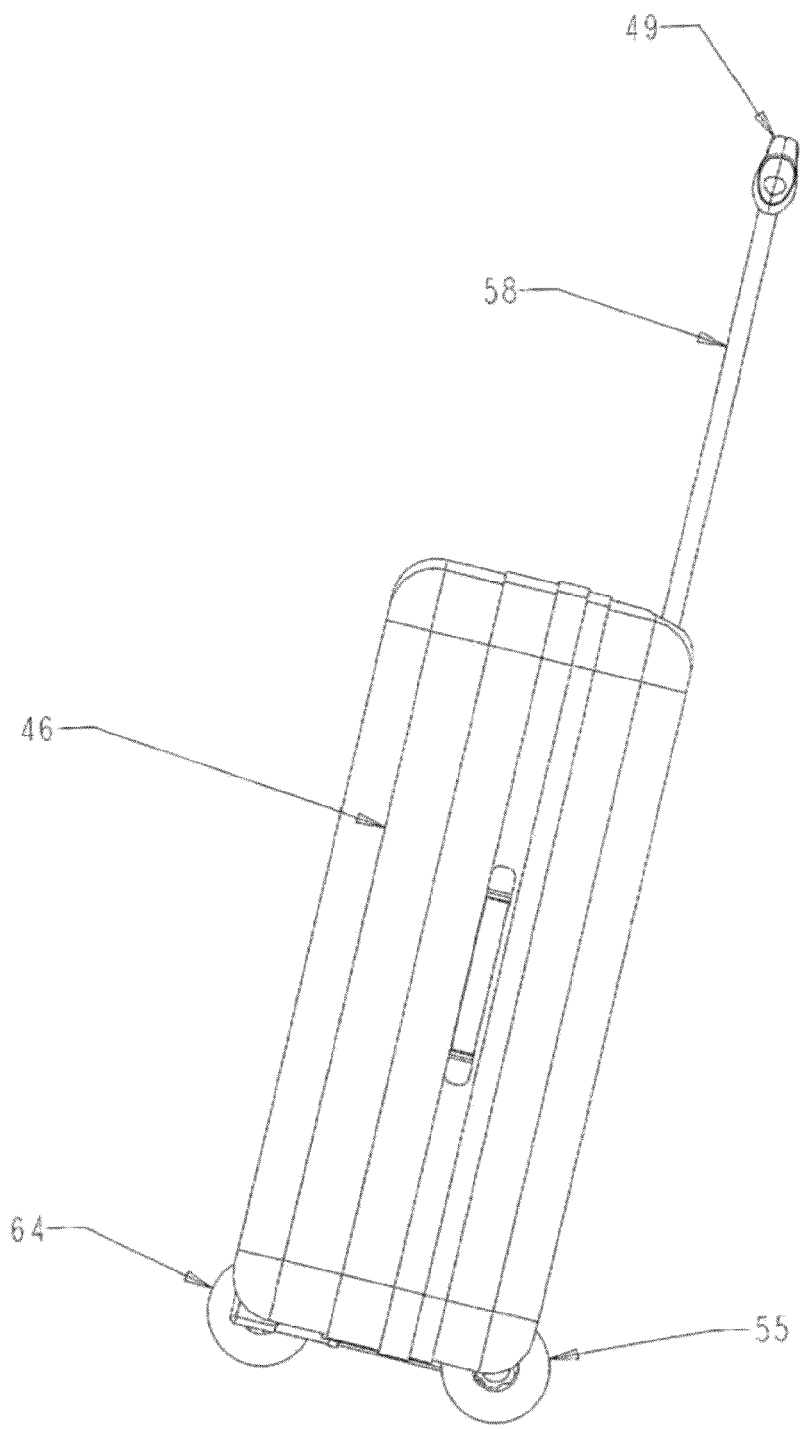
FIG. 20 is a side view of the second embodiment of the invention.
Figure 22:
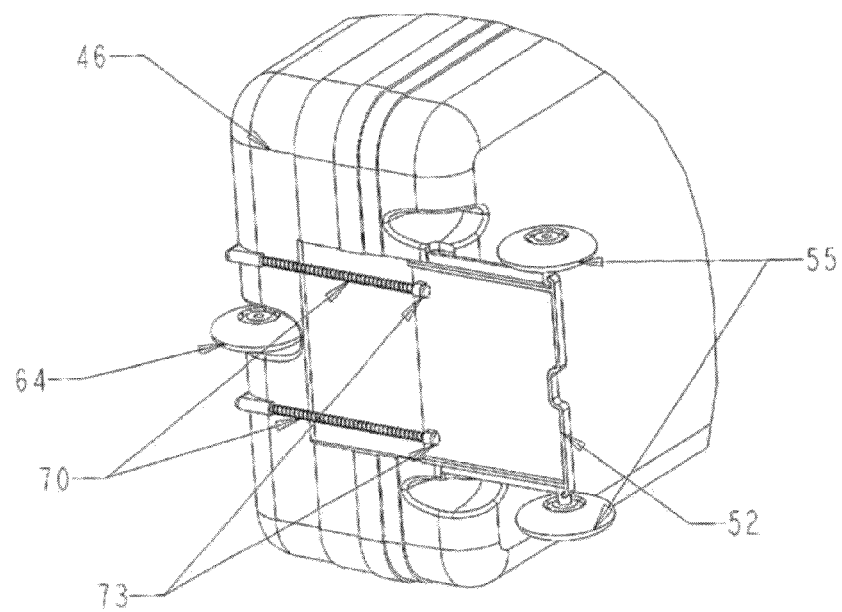
FIG. 22 is a bottom view of the second embodiment of the invention with the platform extended.
Figure 21:
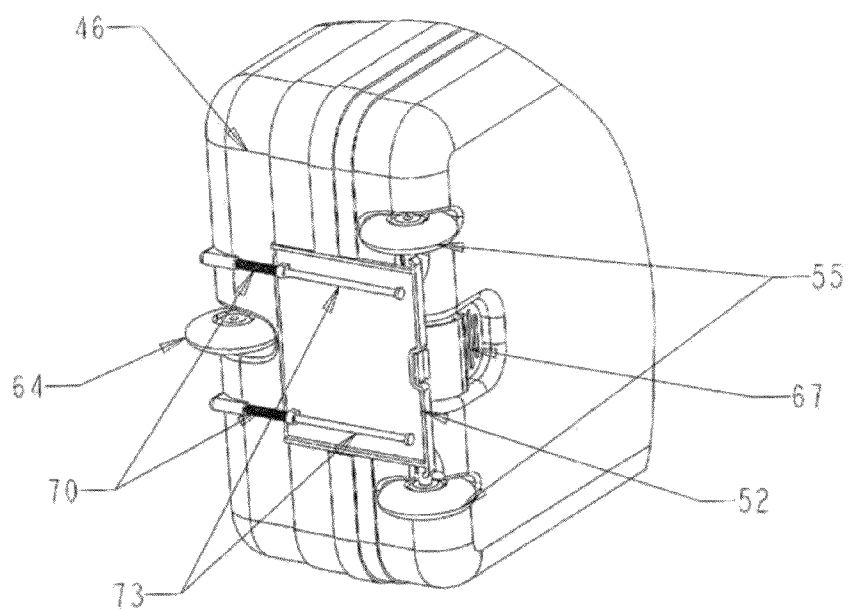
FIG. 21 is a bottom view of the second embodiment of the invention with the platform retracted.

The second embodiment of the invention is similar to the first, having a cargo container 46, a telescoping tube 58, a platform 52 and wheels 55 as shown in FIGS. 17 and 18. Telescoping tube 58 is connected to front wheel 64 through the same steering mechanism described in the first embodiment. As shown in FIGS. 21 and 22 platform 52 is slidably mounted on rods 73. Platform springs 70 bias the platform to its extended position as shown in FIG. 22. A spring biased platform release hatch 67 retains the platform 52 in its retracted position. Rigid handle 49 has two handle bars 61 which form a central opening. Operation of the second embodiment is the same as the first except that the platform is deployed to its extended position by depressing platform release hatch 67, and is retracted pushing it against the bias of springs 70 until caught by platform release hatch 67.

Figure 23:
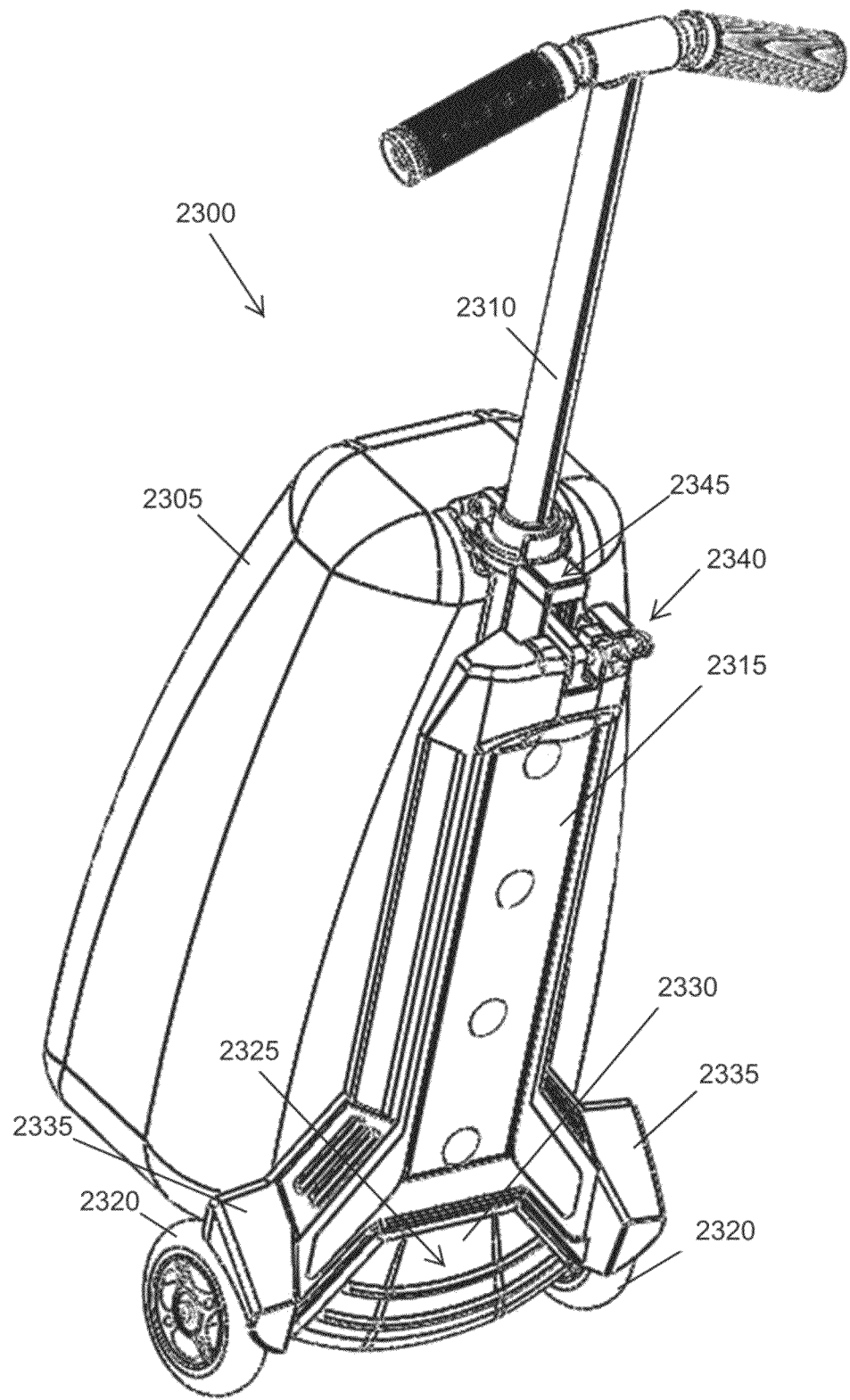
FIG. 23 illustrates a closed isometric view of an alternate embodiment for a closed convertible backpack, wheeled luggage, and scooter system.

FIG. 23 illustrates a closed isometric view of an alternate embodiment for a closed convertible backpack, wheeled luggage, and scooter system, referred to herein for convenience as a mobility cargo platform 2300. Platform 2300 includes a cargo container 2305, a retractable, telescoping handle 2310, and a stowable rider deck 2315. The preferred embodiment for platform 2300 includes three wheels: one steering wheel (not shown) mounted to a steerage linkage coupled to handle 2310 so that turning handle results in turning the wheel and controlling direction, and a pair of multiuse platform rear wheels 2320 coupled to a lower edge of rider deck 2315. As braking assembly 2325, shown in detail below, includes a pedal actuator 2330 for engaging a pair of brake pads against rear wheels 2320, and specialized fenders 2335 disposed near rear wheels 2320. A latching system 2340 secures rider deck 2315 in the closed position. A roller assembly attached to rider deck 2315 and a track assembly 2345, coupled to handle 2310, guides transition of rider deck 2315 as it moves between a closed/retracted position and an open/extended position.

Figure 24:
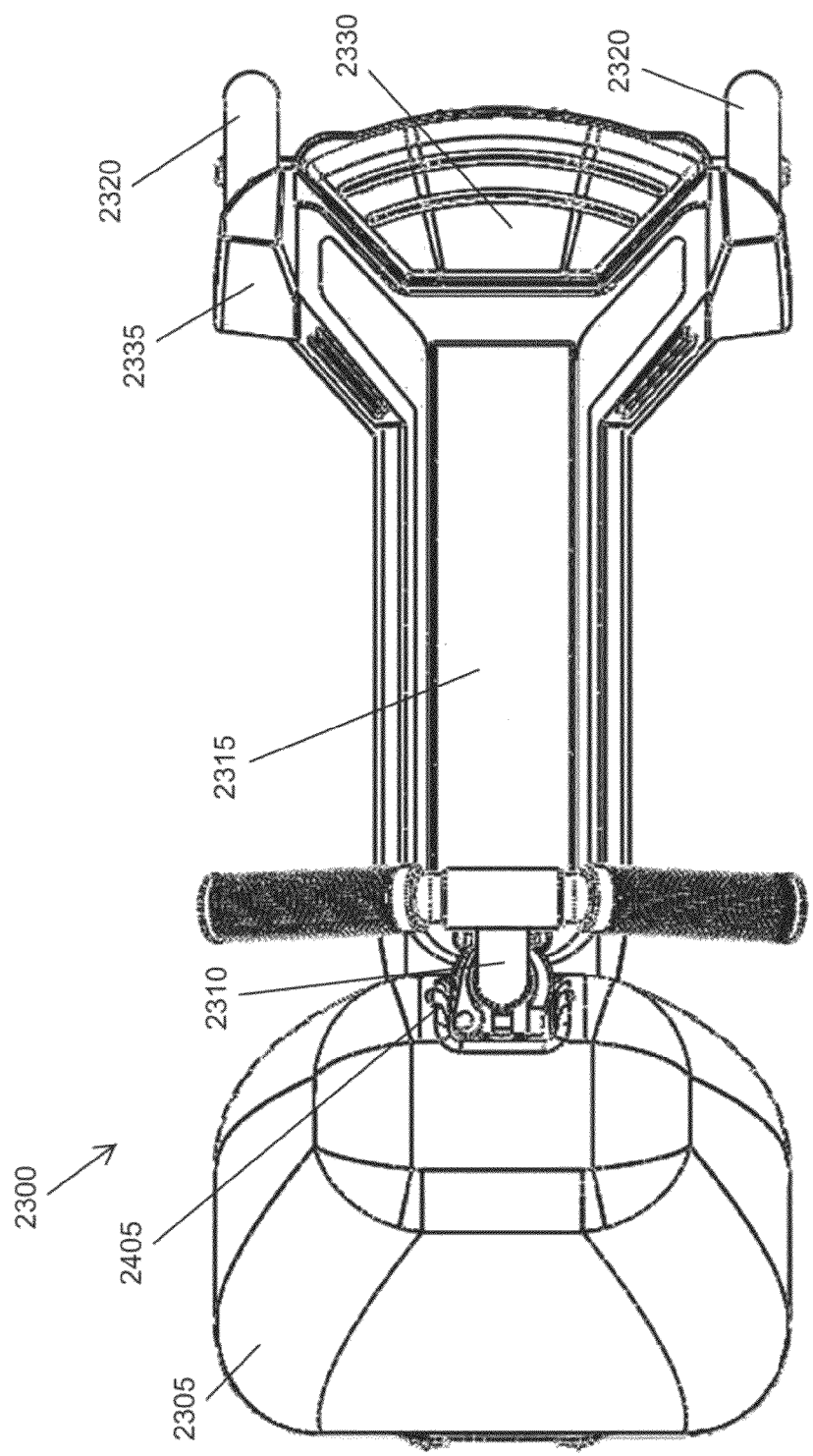
FIG. 24 illustrates a top plan view of the alternate embodiment shown in FIG. 23 with a rider deck opened and extended.
Figure 25:
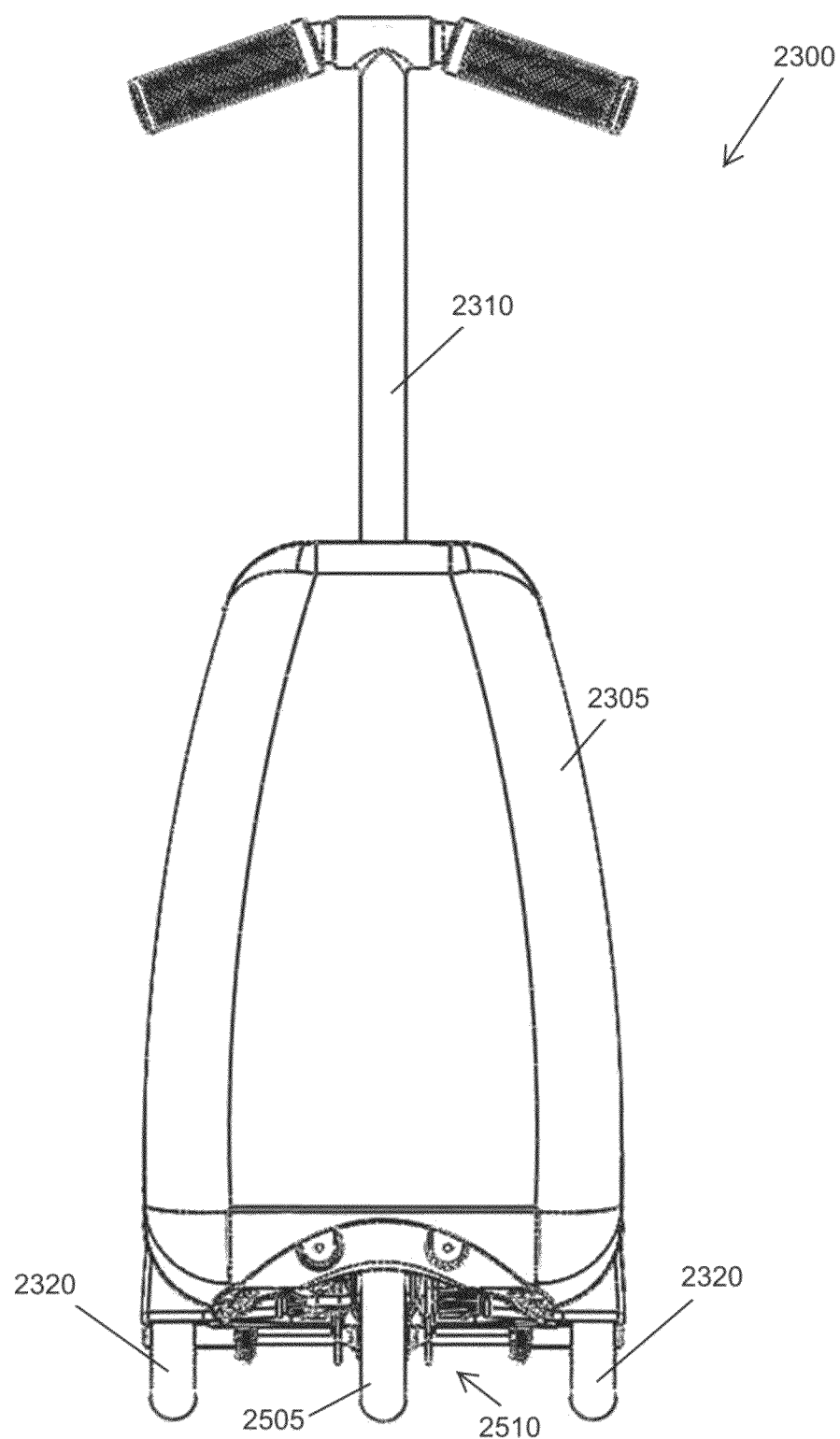
FIG. 25 illustrates a front plan view of the alternate embodiment shown in FIG. 23.

FIG. 24 illustrates a top plan view of platform 2300 shown in FIG. 23 with rider deck 2315 opened and extended. A handle lock is shown for locking handle 2310 in an extended position (shown) or a retracted position in which handle 2310 is telescoped down (shown in FIG. 26). FIG. 25 illustrates a front plan view of platform 2300 shown in FIG. 23. In this view, a front steering wheel 2505 (described but not shown in FIG. 23) is coupled to a steering linkage 2510. Steering linkage 2510 helps to decouple steering ability from cargo weight.

Figure 26:
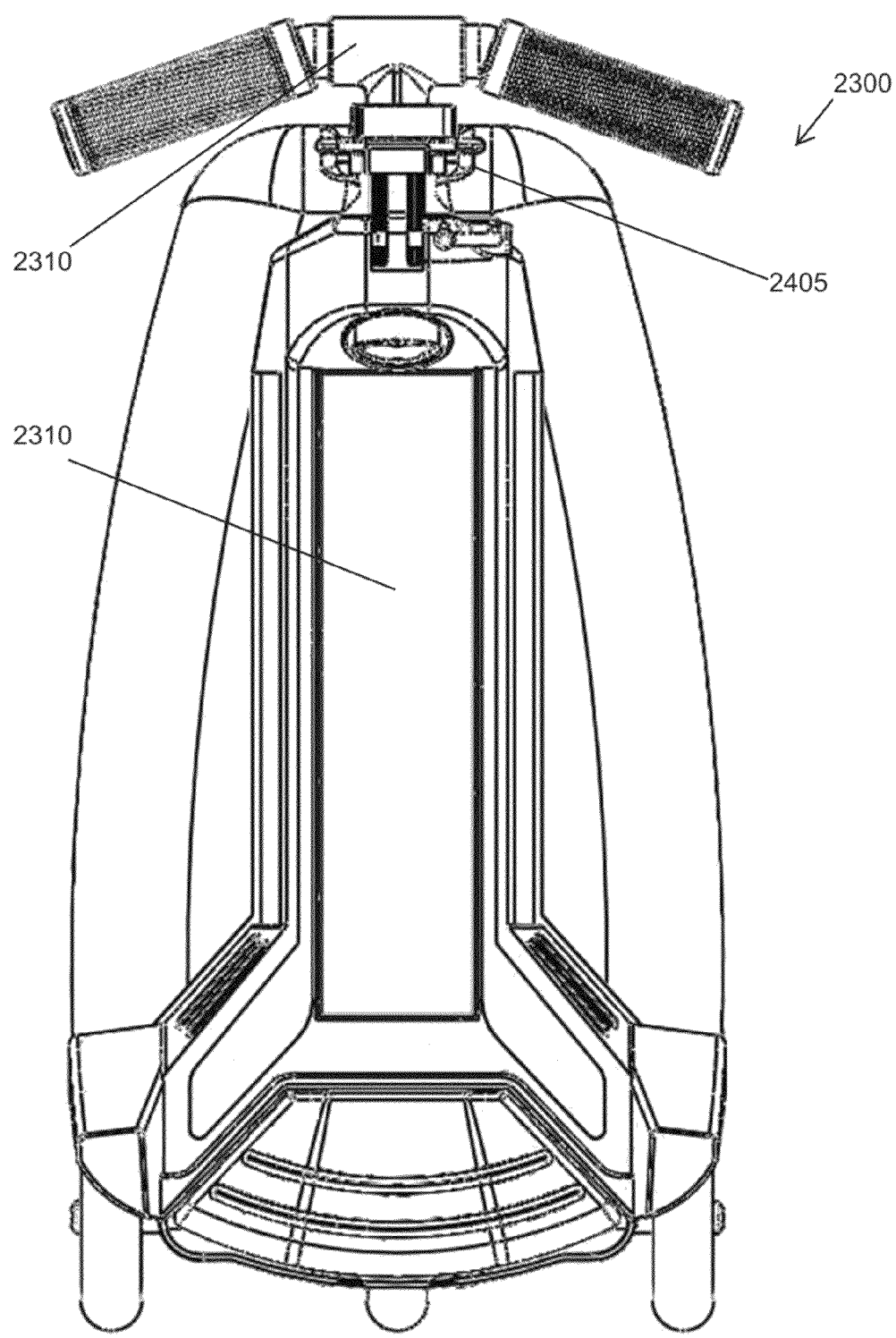
FIG. 26 illustrates a back plan view of the alternate embodiment shown in FIG. 23 with the rider deck closed.
Figure 27:
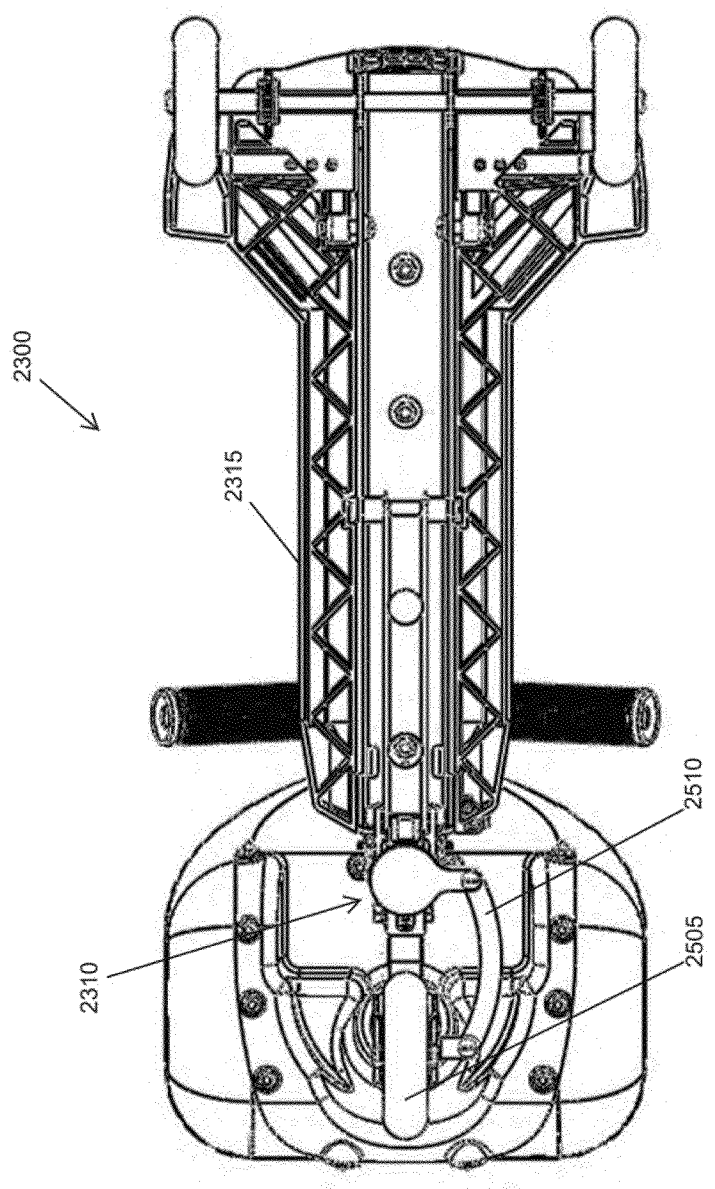
FIG. 27 illustrates a bottom plan view of the alternate embodiment shown in FIG. 23 with the rider deck open and extended.

FIG. 26 illustrates a back plan view of platform 2300 shown in FIG. 23 with the rider deck 2315 closed and handle 2310 retracted and stowed. In this configuration, platform 2300 is ready for storage or to be carried as a bag/backpack using one or more straps. Handle lock 2405 is used to lock/unlock handle 2310 for telescoping. FIG. 27 illustrates a bottom plan view of platform 2300 shown in FIG. 23 with rider deck open 2315 and extended. Steering linkage 2510 is shown coupling handle 2310 to front steering wheel 2505.

Figure 28:
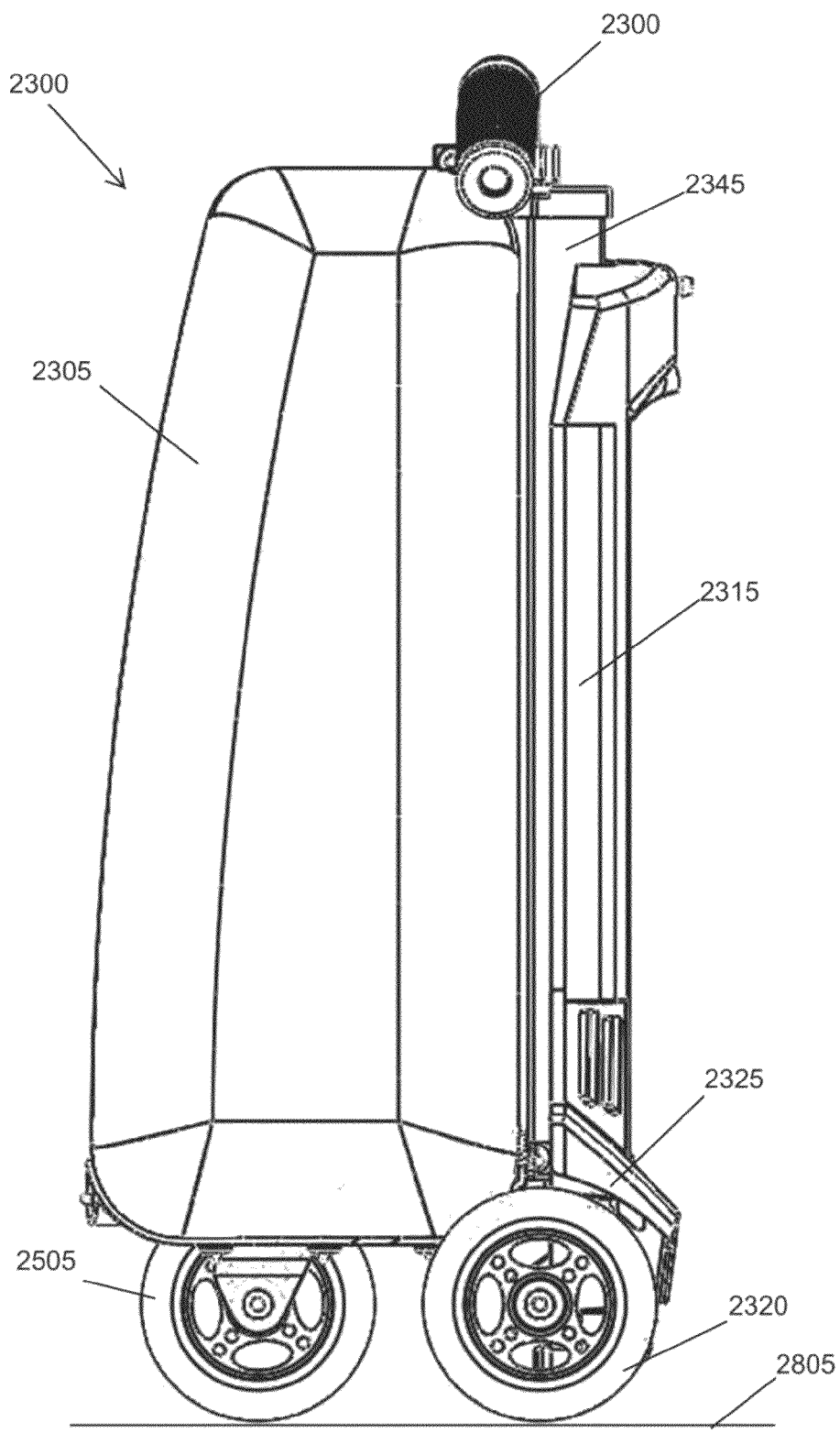
FIG. 28 illustrates a side view of the alternate embodiment shown in FIG. 23 with the rider deck closed.
Figure 29:
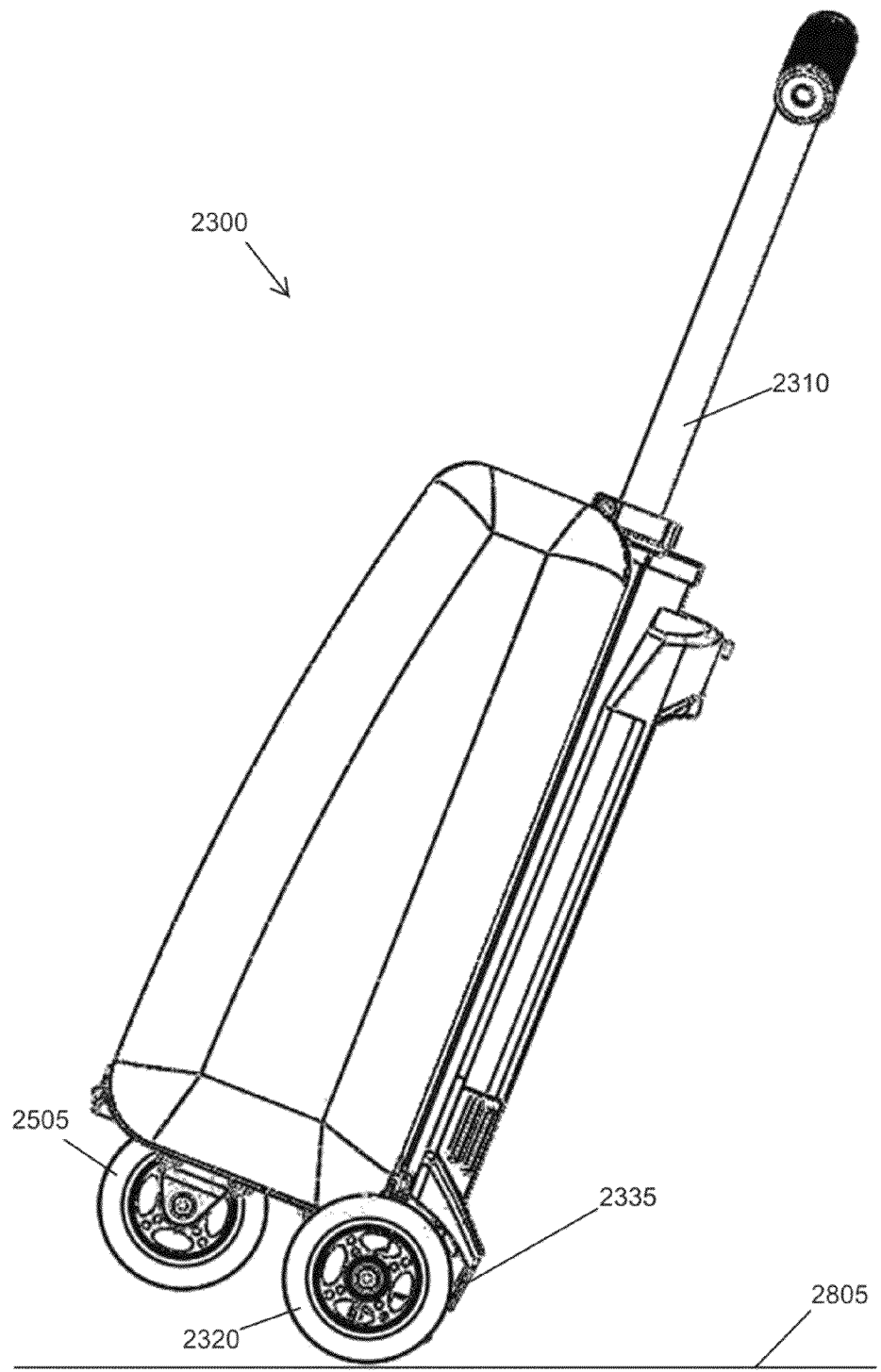
FIG. 29 illustrates the side view of the alternate embodiment shown in FIG. 28 tilted into the pull configuration.

FIG. 28 illustrates a side view of platform 2300 shown in FIG. 23 with rider deck 2315 closed, handle 2310 retracted, and platform 2300 stationary and stable on a surface 2805 as it sits on all three wheels. FIG. 29 illustrates the side view of platform 2300 shown in FIG. 28 tilted into the pull configuration with handle 2310 extended, rider deck 2315 closed, and front steering wheel 2505 lifted up off of surface 2805 as platform 2300 is moved (e.g., pushed or pulled) over surface 2805. This view highlights one of the special features of fenders 2335: they are shortened and extend around but a partial arc of rear wheels 2320 so as to not interfere with surface 2805 as platform is tilted backwards and moved.

Figure 30:
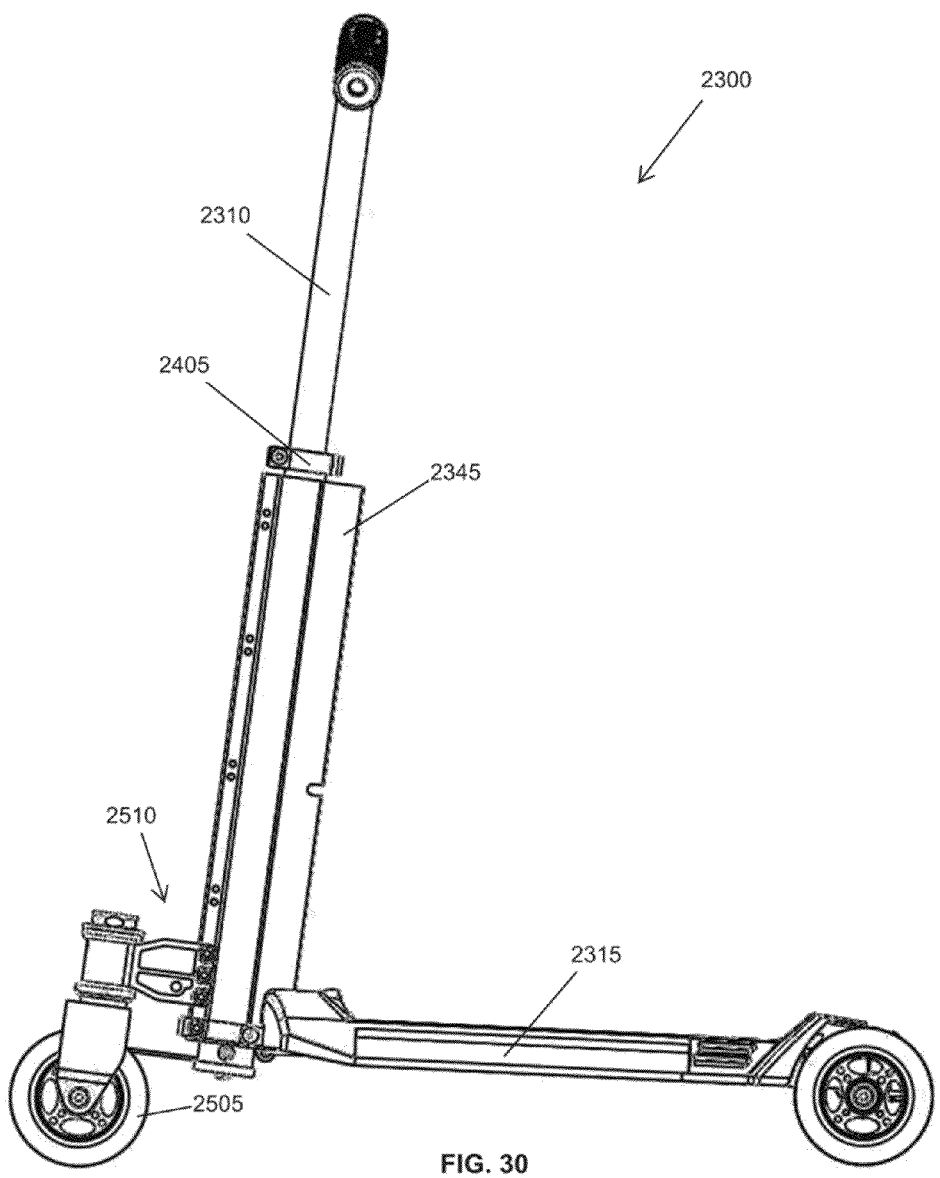
FIG. 30 illustrates a side view of the alternate embodiment shown in FIG. 23 with a luggage element removed for clarity and with the rider deck open and extended.
Figure 31:
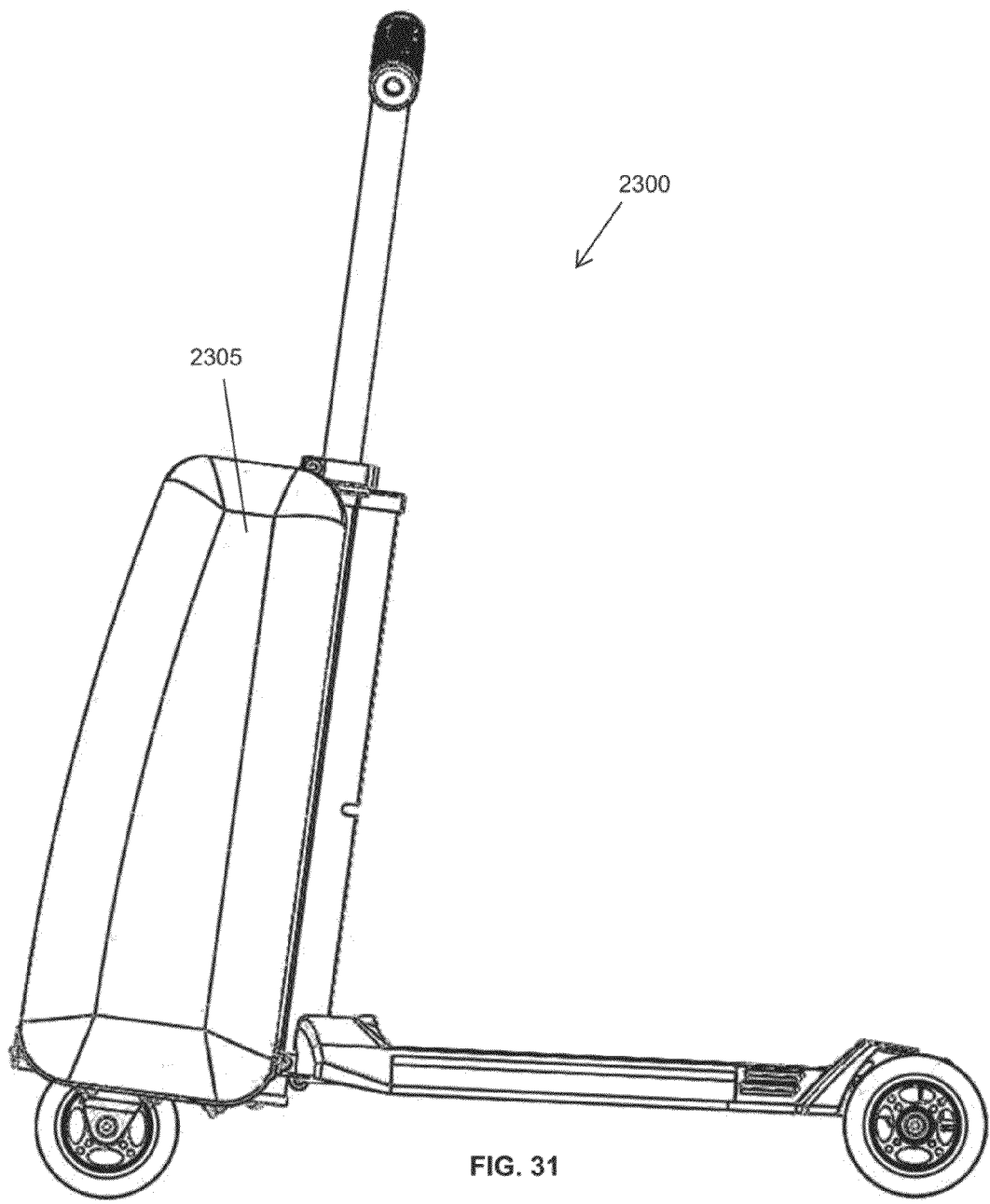
FIG. 31 illustrates the side view of FIG. 30 with the luggage element added for context.

FIG. 30 illustrates a side view of platform 2300 shown in FIG. 23 with cargo container 2305 removed for clarity and with rider deck 2315 open and handle 2310 extended. FIG. 31 illustrates the side view of FIG. 30 with cargo container 2305 added for context.

Figure 32:
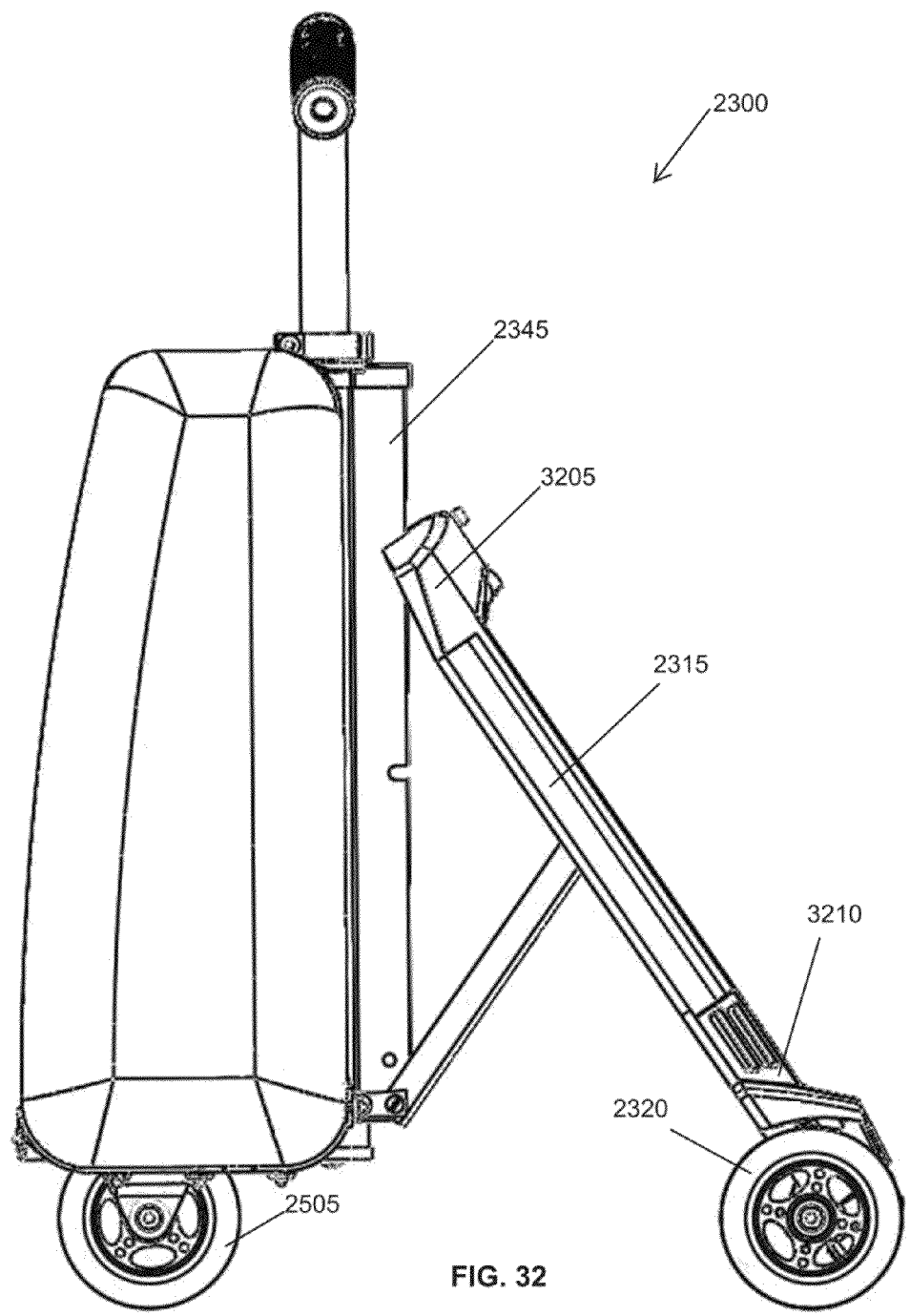
FIG. 32 illustrates a side view of the alternate embodiment shown in FIG. 23 with the rider deck intermediate the open and closed positions.

FIG. 32 illustrates a side view of platform 2300 shown in FIG. 23 with rider deck 2315 intermediate its open and closed positions. A distal end 3205 of rider deck 2315, opposite of a proximal end 3210 where rear wheels 2320 are attached, glidingly rolls within track assembly 2345 as it moves up/down to close/open rider deck 2315 (which retracts/extends rider deck 2315 as well). To close platform 2300, distal end 3205 is moved up, and as distal end 3205 moves up in track assembly 2345, rear wheels 2320 move closer to front steering wheel 2505 and rider deck 2315 moves more vertical. To open platform 2300, distal end 3205 is moved down, and as distal end 3205 moves down in track assembly 2345, rear wheels 2320 move further from front steering wheel 2505 and rider deck 2315 moves more horizontal.

Figure 33:
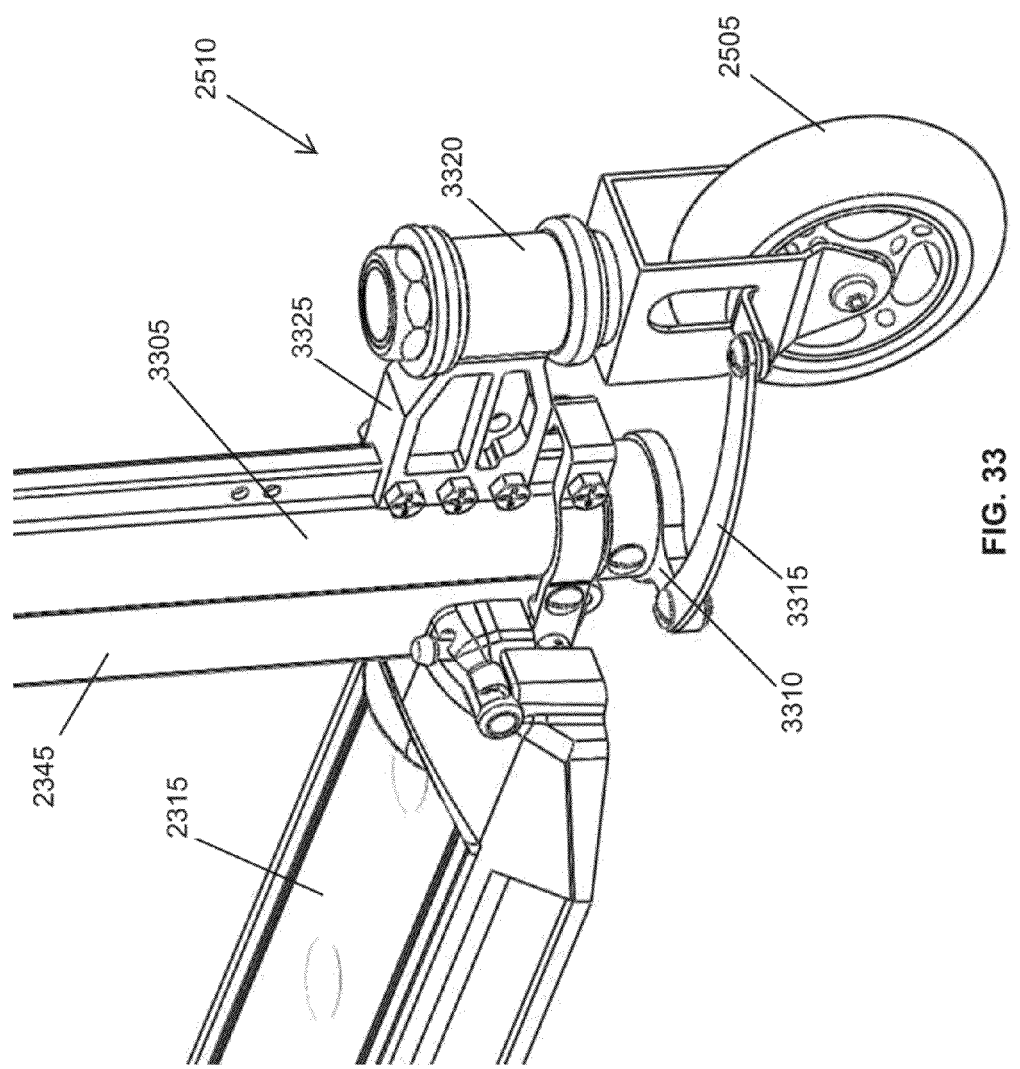
FIG. 33 illustrates a detail view of steerage linkage of the alternate embodiment shown in FIG. 23.

FIG. 33 illustrates a detail view of steering linkage 2510 of platform 2300 shown in FIG. 23. Steering linkage 2510 includes a lower tube 3305 into which handle 2310 telescopes and within which handle 2310 rotates. A rotation arm 3310 is coupled to the bottom of lower tube 3305 and rotates as handle 2310 rotates. A linkage arm 3315 couples rotation arm 3310 to front steering wheel 2505. Front wheel is rotatably supported within a caster/bearing 3320 extending from lower tube 3305 by a bracket 3325. Caster/bearing 3320 can provide shock absorption in some embodiments. Steering linkage 2510 helps improve safety by making turning easier when weight is added to platform 2300. Without steering linkage 2510, a user would need to manage the weight with each turn.

Figure 34:
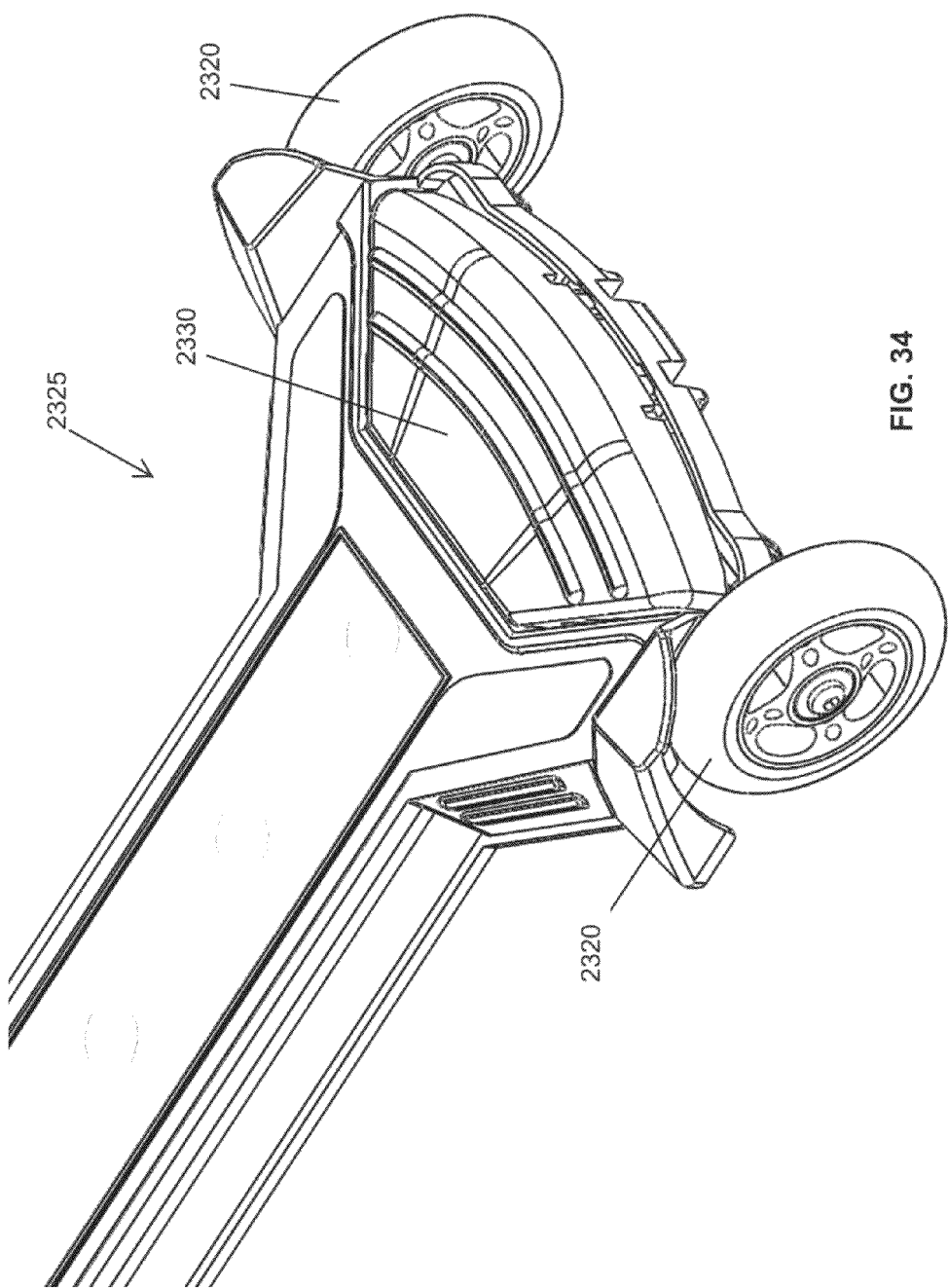
FIG. 34 illustrates an isometric view of a brake assembly of the alternate embodiment shown in FIG. 23.
Figure 35:
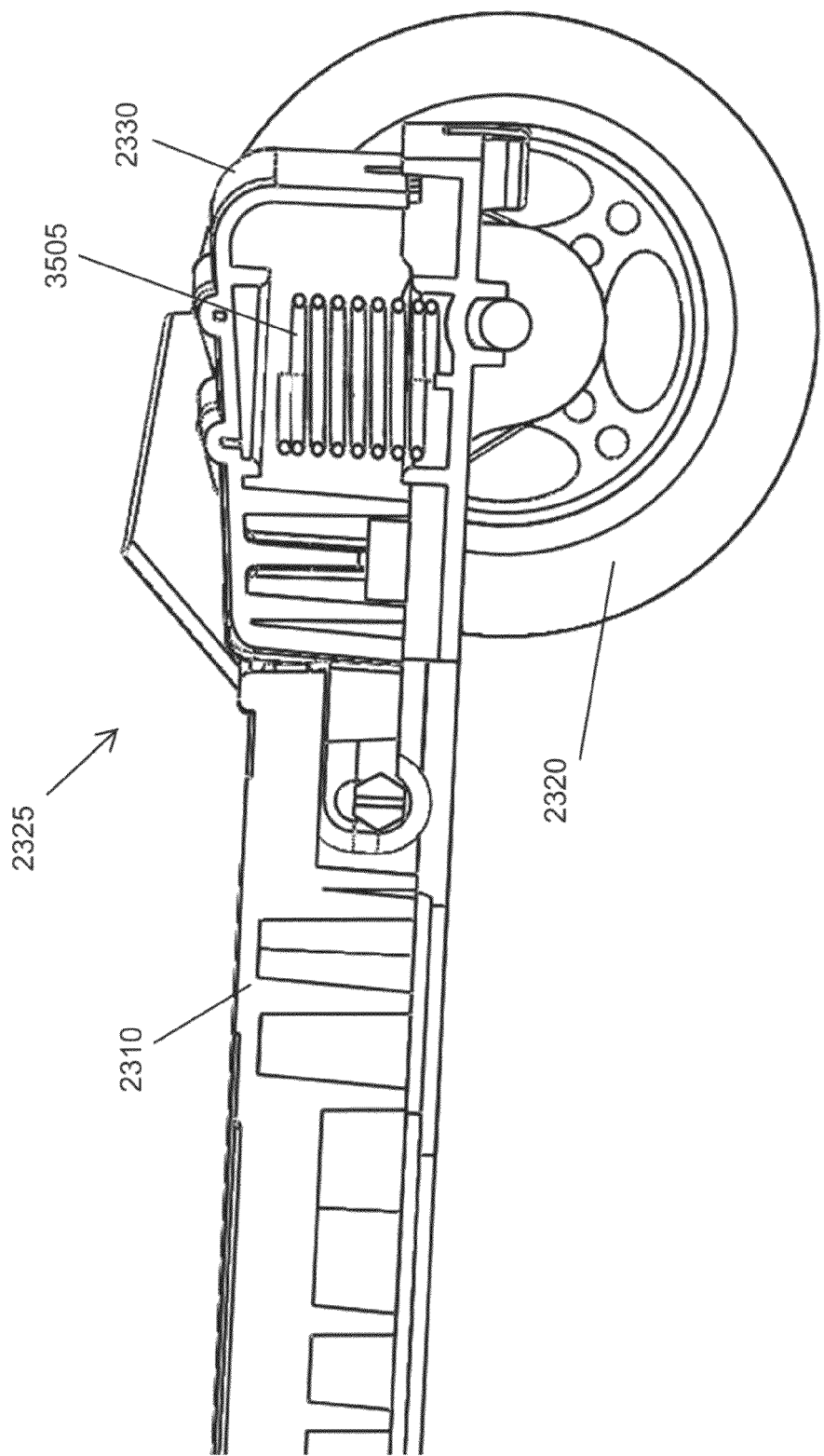
FIG. 35 illustrates a side section view of the brake assembly shown in FIG. 34.

FIG. 34 through FIG. 38 highlight a preferred braking solution. FIG. 34 illustrates a isometric view of brake assembly 2325 of platform 2300 shown in FIG. 23. Pedal actuator 2330 is coupled to both rear wheels 2320 to actuate braking with both, improving safety as compared to a single brake solution. FIG. 35 illustrates a side section view of the brake assembly shown in FIG. 34 and includes brake springs 3505 coupling rider deck 2315 to pedal actuator 2330 to bias pedal actuator 2330 to the unbraked position.

Figure 36:
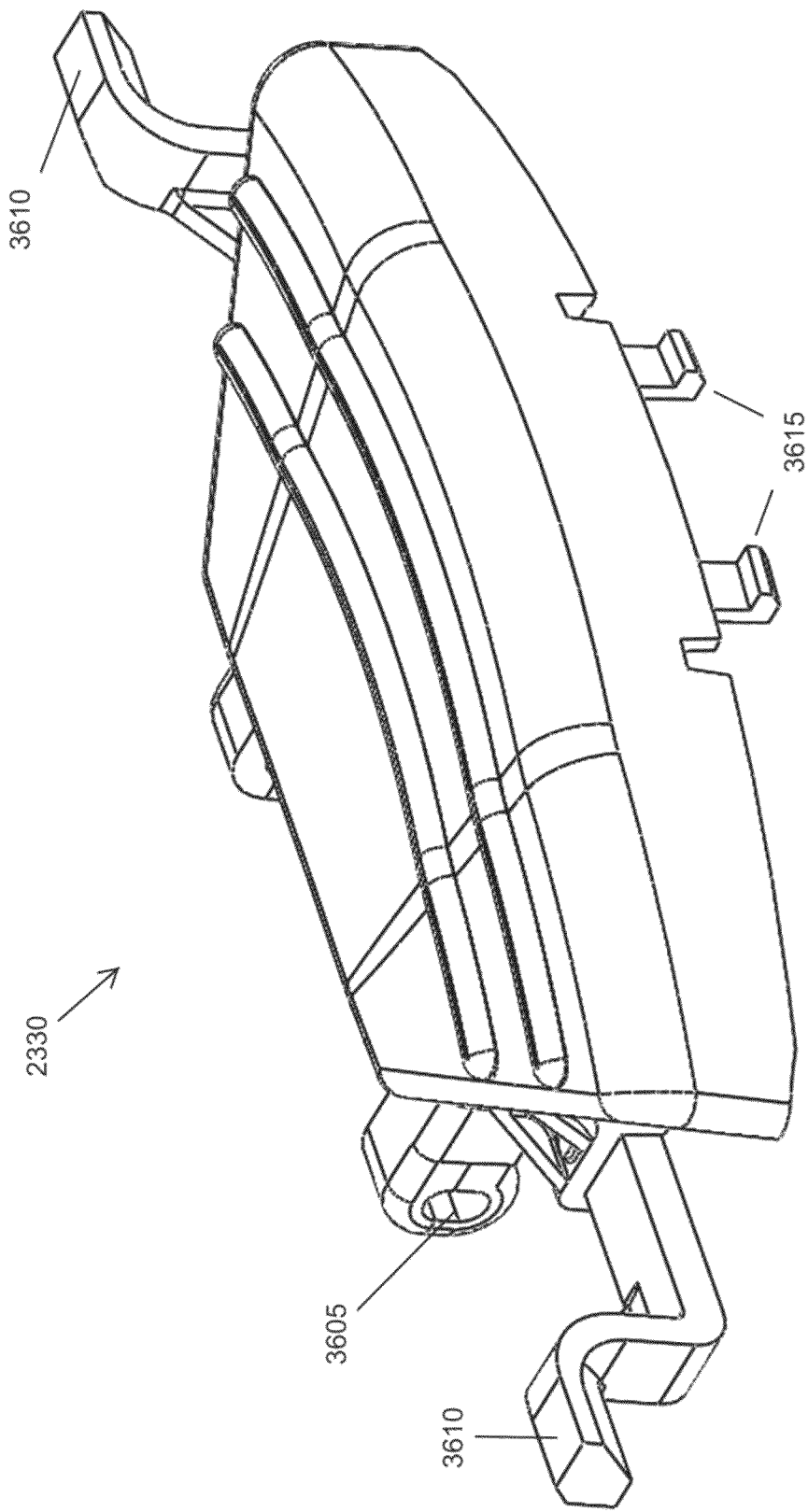
FIG. 36 illustrates a plan view of a brake pedal of the brake assembly shown in FIG. 34.
Figure 37:
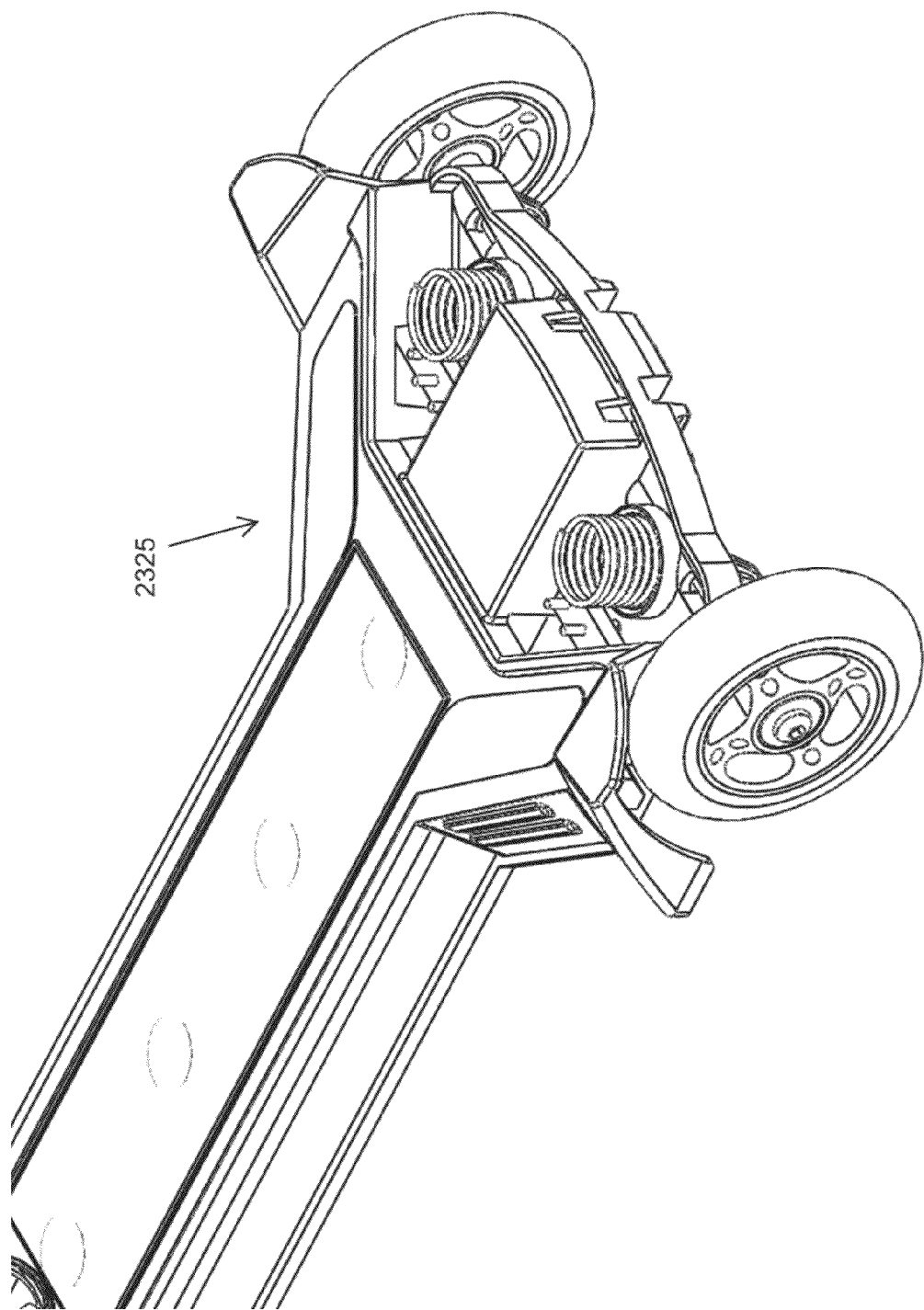
FIG. 37 illustrates an isometric view of the brake assembly shown in FIG. 34 with the brake pedal shown in FIG. 36 removed.
Figure 38:
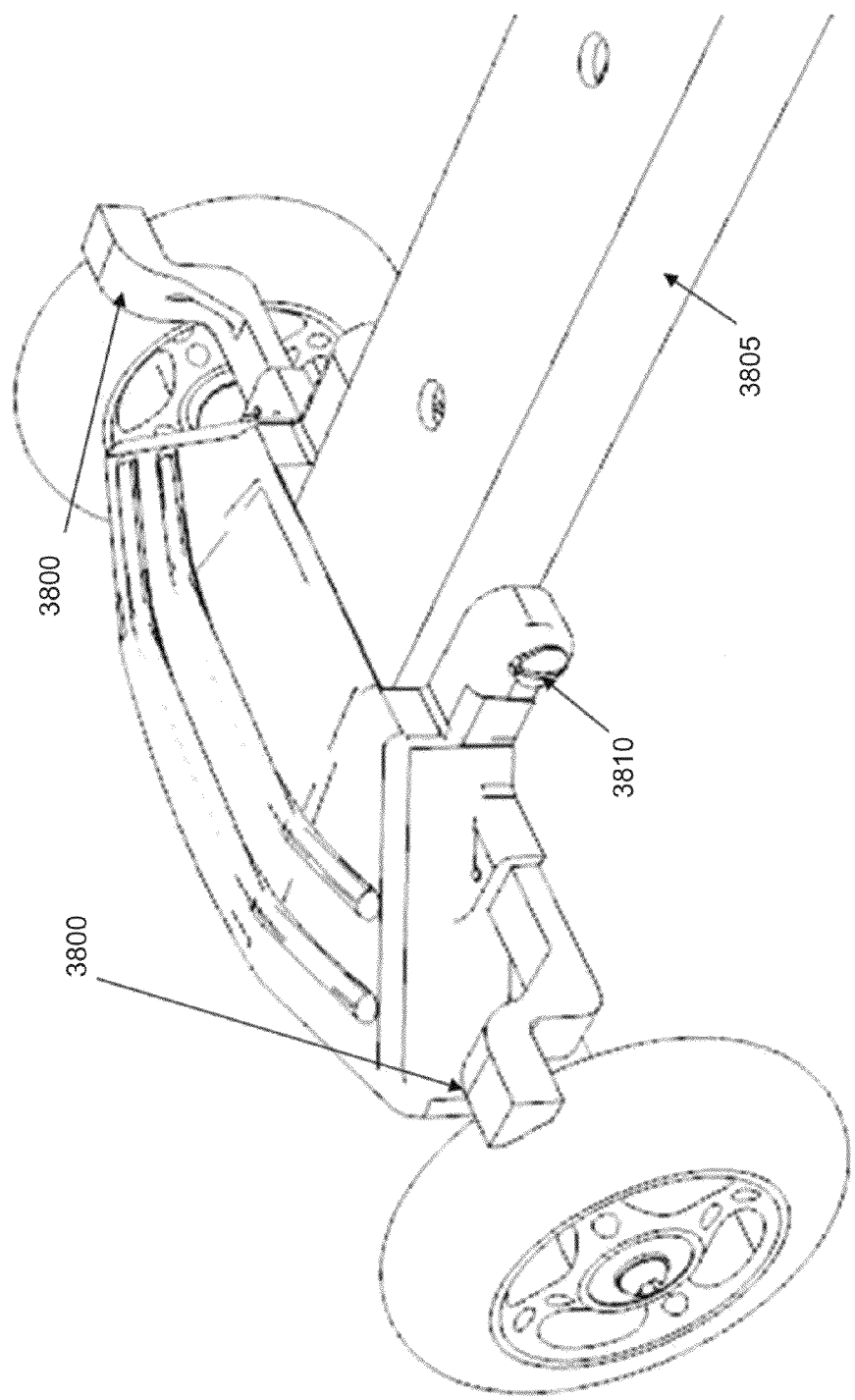
FIG. 38 illustrates operation of a braking system for the alternate embodiment shown in FIG. 23.

FIG. 36 illustrates a plan view of pedal actuator 2330 of brake assembly 2325 shown in FIG. 34. Pedal actuator 2330 includes apertures 3605 to pivotally couple to rider deck 2315 and to selectively contact a brake pad 3610 to each rear wheel 2320. A pair of latches 3615 ensure that pedal actuator 2330 does not rotate too far upward and accidentally trip a rider or otherwise interfere with availability for braking. FIG. 37 illustrates an isometric view of brake assembly 2325 shown in FIG. 34 with the brake pedal shown in FIG. 36 removed. FIG. 38 illustrates operation of the braking system for platform 2300 shown in FIG. 23. A pair of brake pads 3800 (in some implementations a single pad) make contact with both (or a single rear wheel) when pedal actuator 2330 (shown in FIG. 23) is depressed. A deck support 3805 includes an aluminum channel fastened to an underside of platform 2300 to provide structural rigidity. Pedal actuator 2330 hinges about an axle 3810 mounted to deck support 3805.

Figure 39:
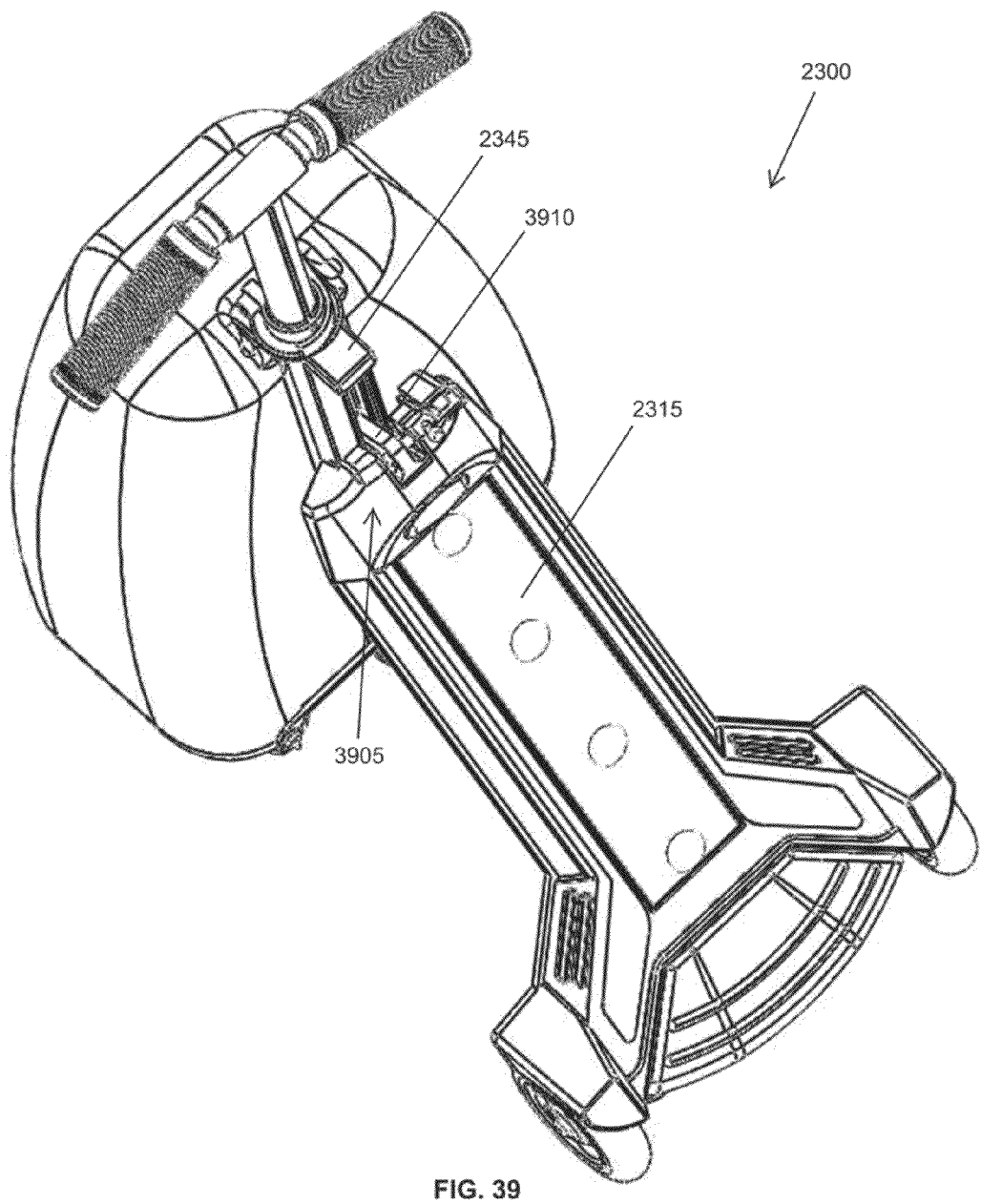
FIG. 39 illustrates a roller assembly connecting system coupling the rider deck to a backpack assembly for the alternate embodiment shown in FIG. 23.
Figure 40:
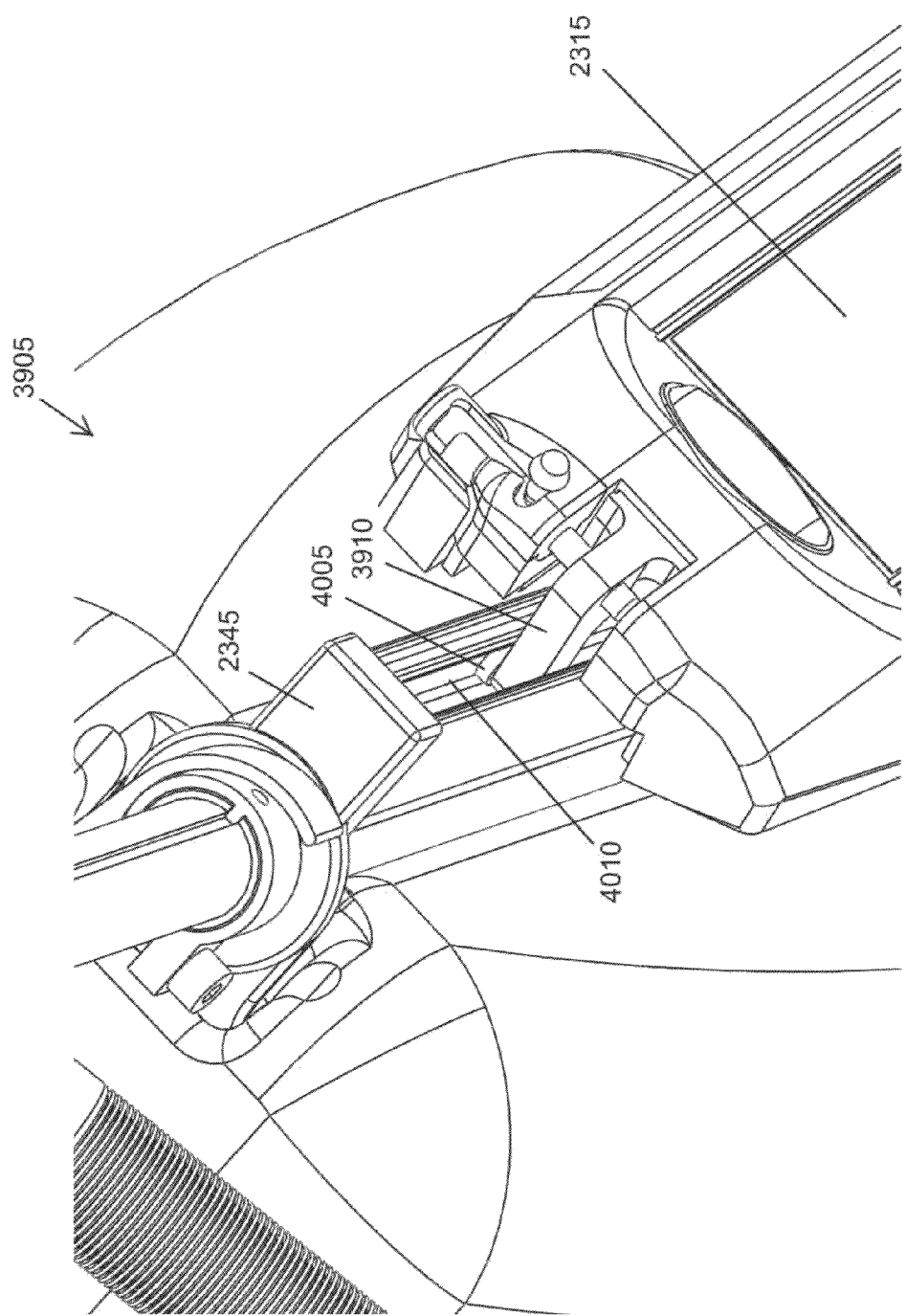
FIG. 40 illustrates a detail view of the roller assembly shown in FIG. 39.
Figure 41:
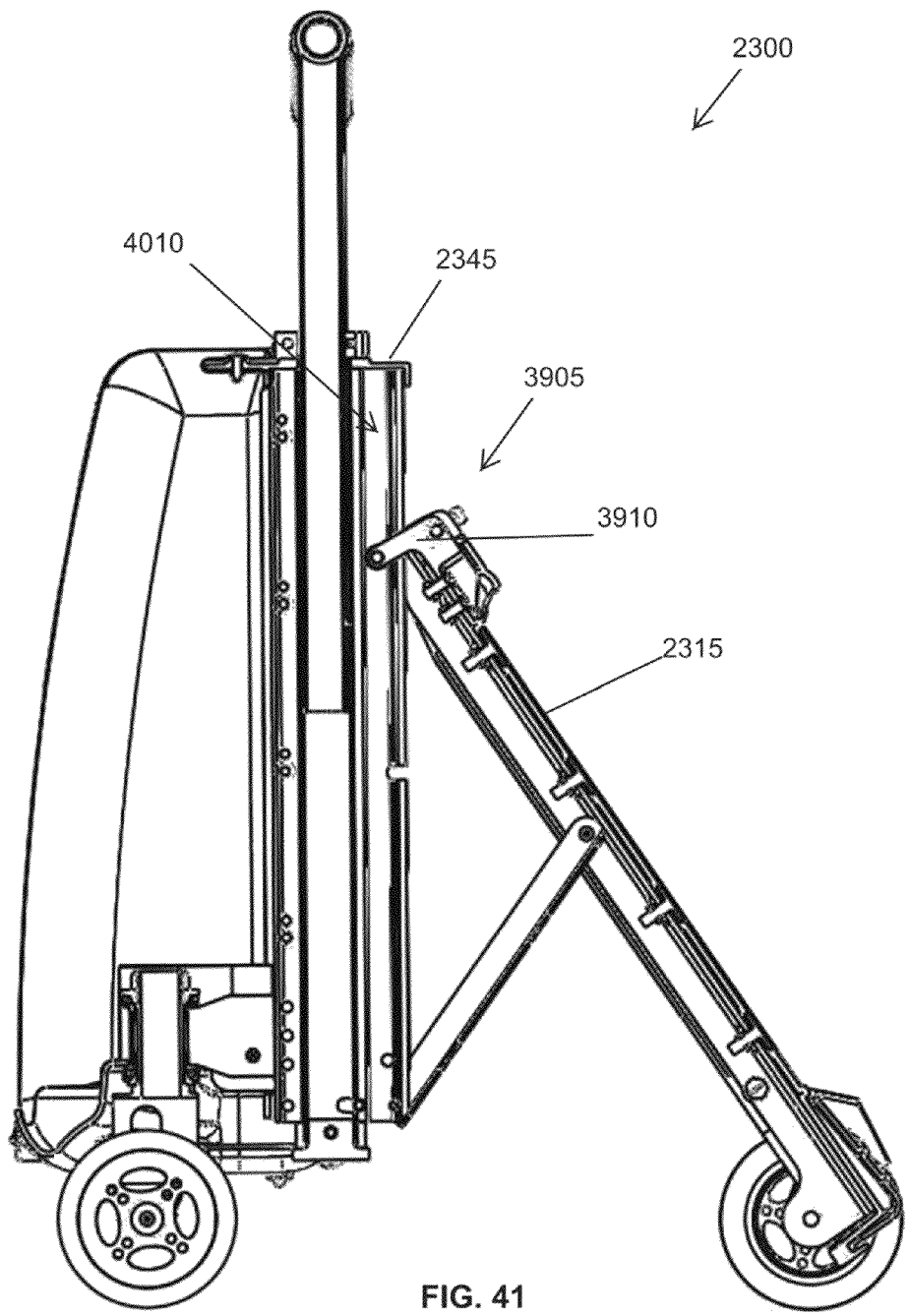
FIG. 41 illustrates a first side sectional view of the roller assembly shown in FIG. 39.
Figure 42:
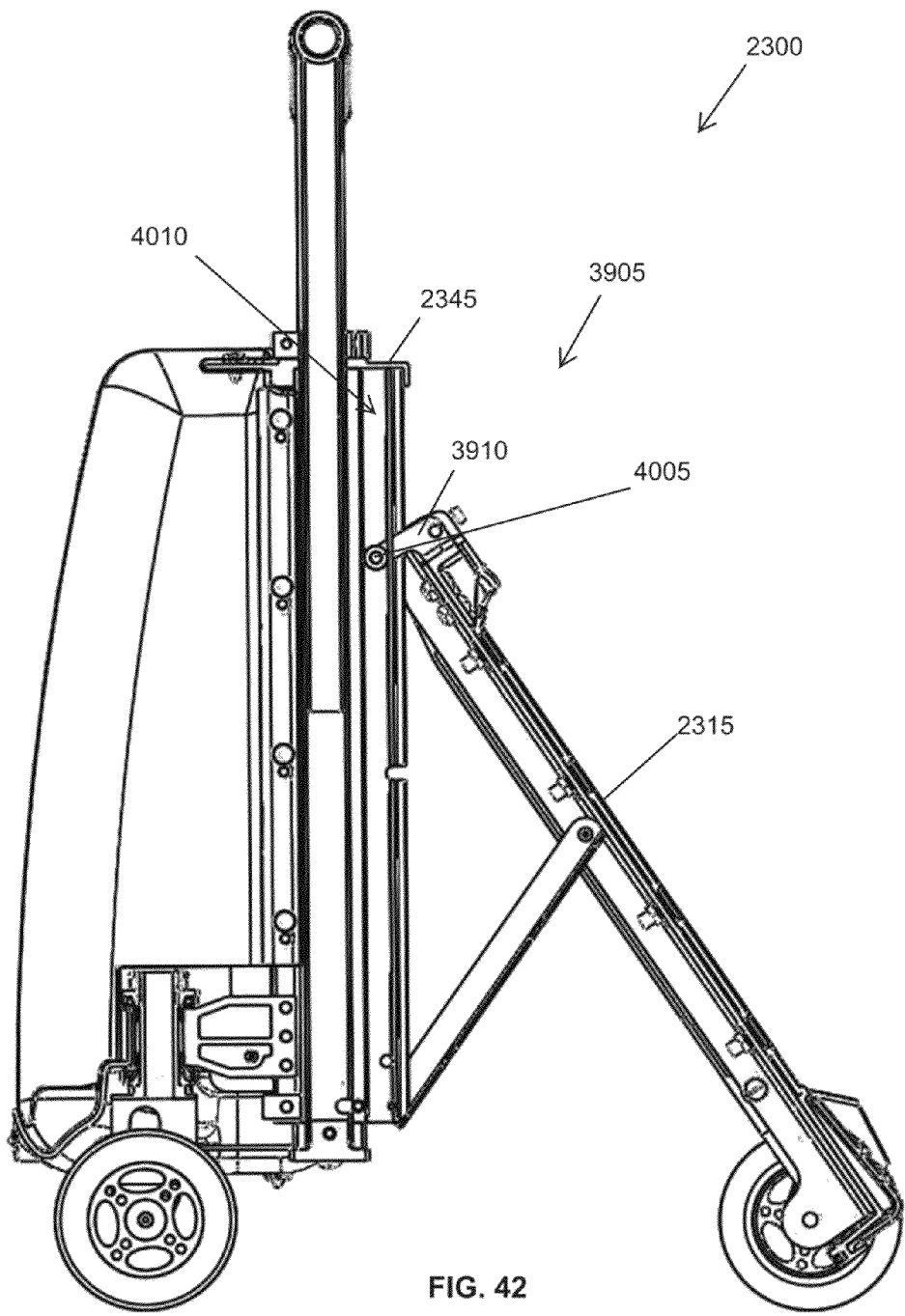
FIG. 42 illustrates a second side sectional view of the roller assembly shown in FIG. 39.

FIG. 39 illustrates a roller assembly connecting system 3905 coupling rider deck 2315 to track assembly 2345 for platform 2300 shown in FIG. 23. Roller assembly connecting system 3905 includes an arm 3910 with a pair of rollers that engage a pair of tracks inside track assembly 2345. FIG. 40 illustrates a detail view of roller assembly connecting system 3905 shown in FIG. 39. A roller 4005 of the pair of rollers is shown engaging a track 4010 of track assembly 2345. The other roller and track are mirror images of those shown. FIG. 41 illustrates a first side sectional view of roller assembly connecting system 3905 shown in FIG. 39. FIG. 42 illustrates a second side sectional view of roller assembly connecting system 3905 shown in FIG. 39. Arm 3910, roller 4005, and track 4010 are shown.

Figure 43:
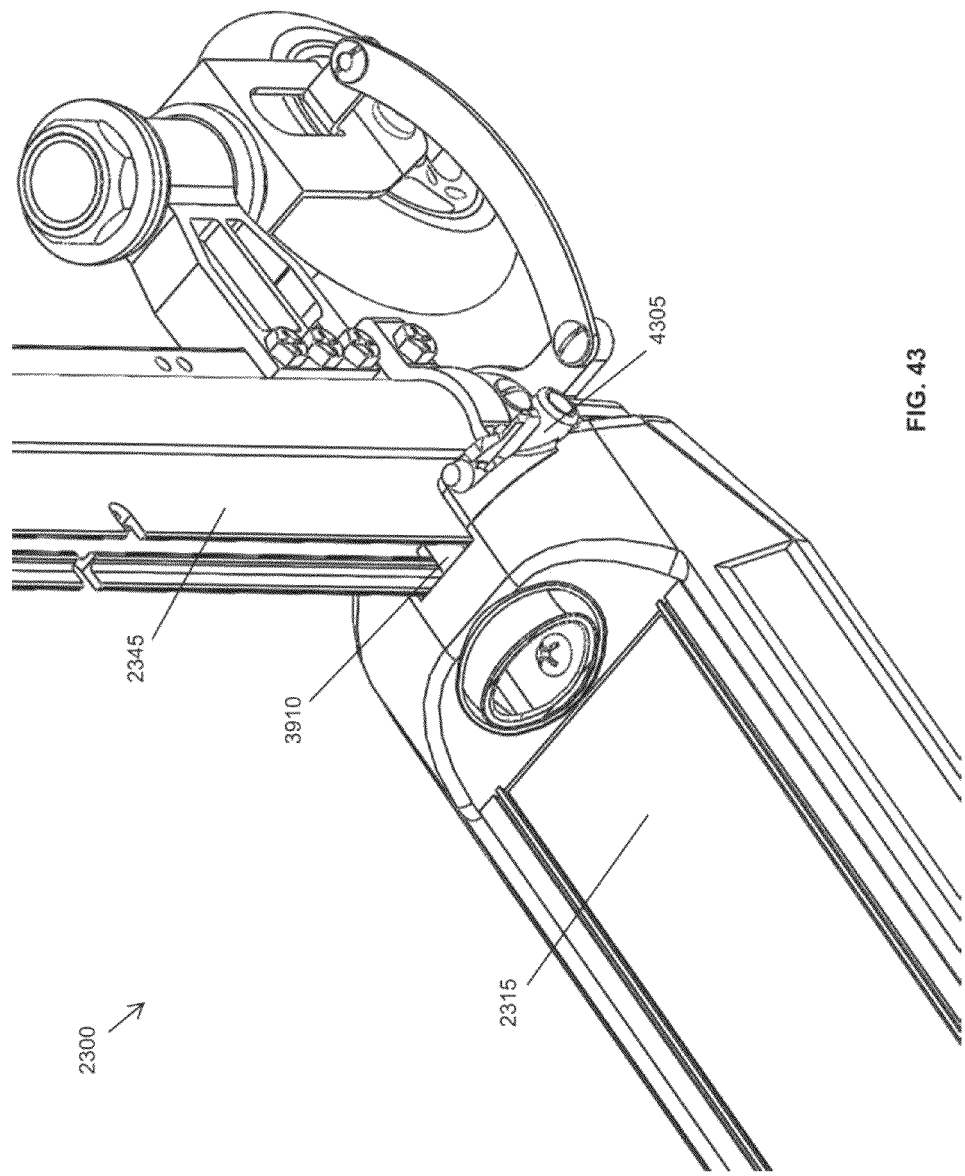
FIG. 43 illustrates a plan view for a representative deck latching system for the alternate embodiment shown in FIG. 23.

In some cases and for some embodiments and applications, there may be a need or desire to latch rider deck 2315 into the open position. Some designs can produce undesirable flexing/pivoting about connection points between rider deck 2315 and track assembly 2345. For example there can be a forward rotation of handle 2310 while rider deck 2315 is open/extended and a rider is aboard. FIG. 43 illustrates a plan view for a representative deck latching system 4305 for platform 2300 shown in FIG. 23. Deck latching system 4305 of the preferred embodiment is designed and configured to both latch rider deck 2315 open, but also to reduce/eliminate forward rotation of handle 2310 when platform 2300 is ridden in scooter mode. Deck latching system 4305 is a sliding bolt latch design that includes a biased pin for engagement with, and disengagement from, track assembly 2345.

Figure 44:
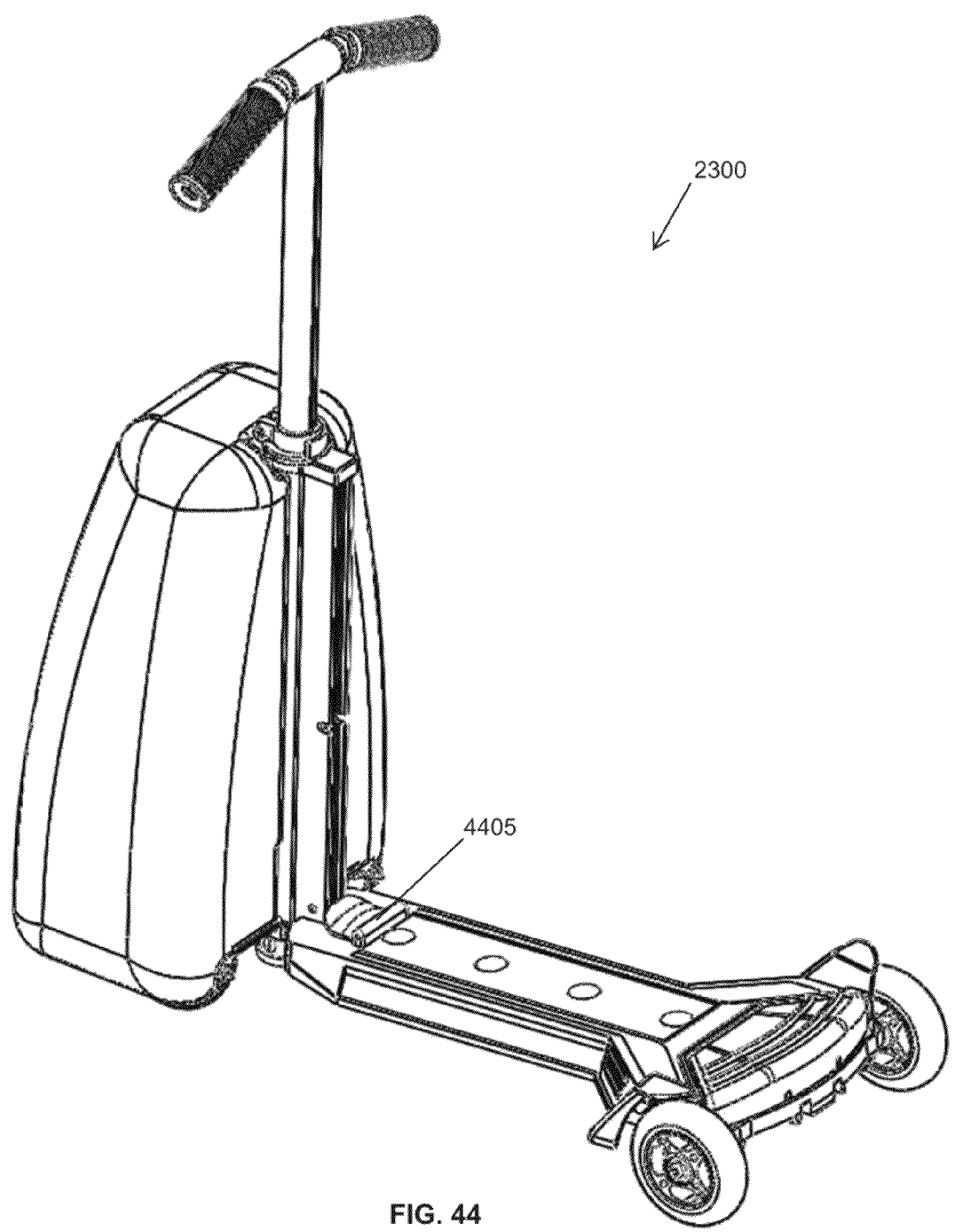
FIG. 44 illustrates a plan view for an alternative representative deck latching system for the alternate embodiment shown in FIG. 23.
Figure 45:
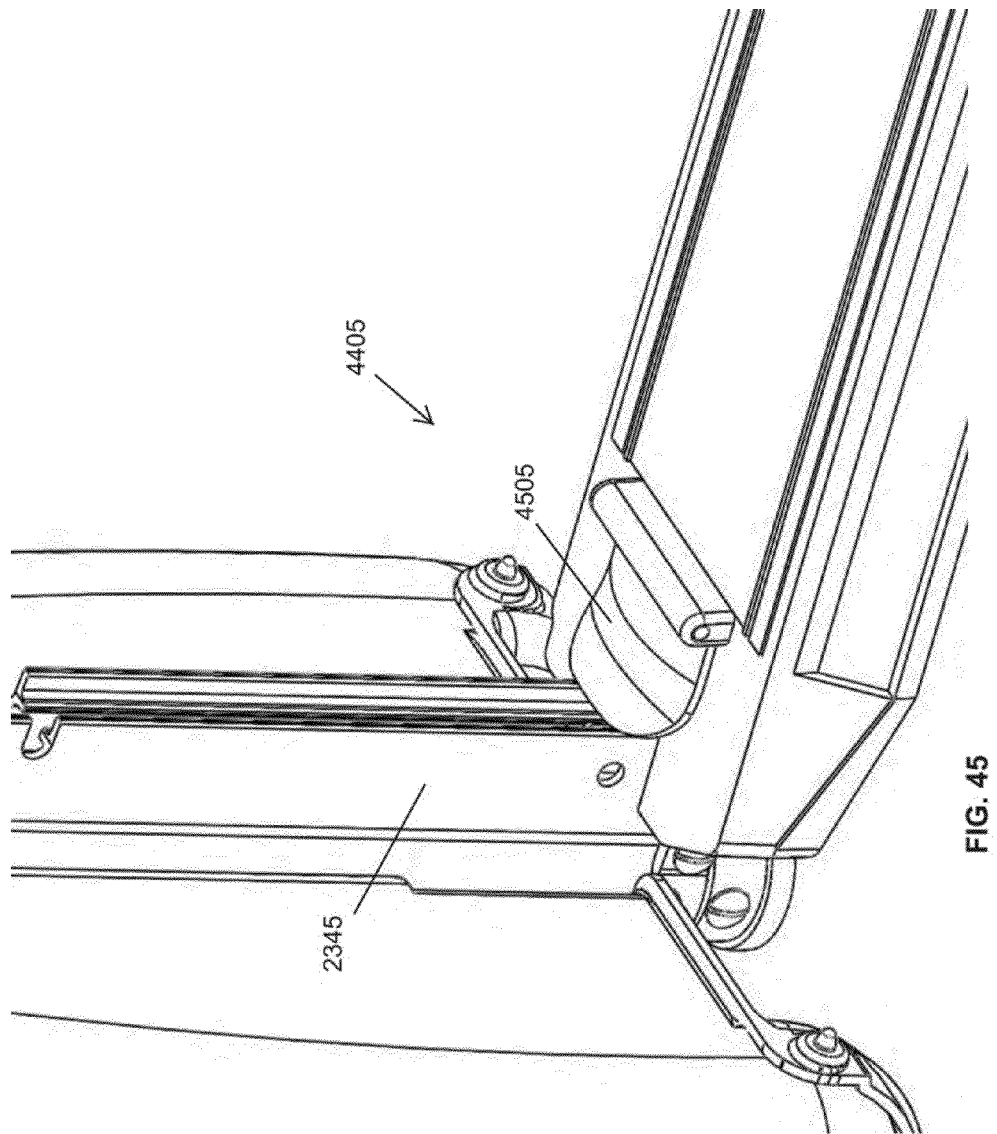
FIG. 45 illustrates a detail plan view of the deck latching system shown in FIG. 44.

FIG. 44 illustrates a plan view for an alternative representative deck latching system 4405 for platform 2300 shown in FIG. 23. FIG. 45 illustrates a detail plan view of deck latching system 4405 shown in FIG. 44. Deck latching system 4405 includes a pivoting handgrip 4505 that pulls up to initiate disengagement of deck latching system 4405 from track assembly 2345 and rotates downward to initiate engagement of track assembly 2345.

Figure 46:
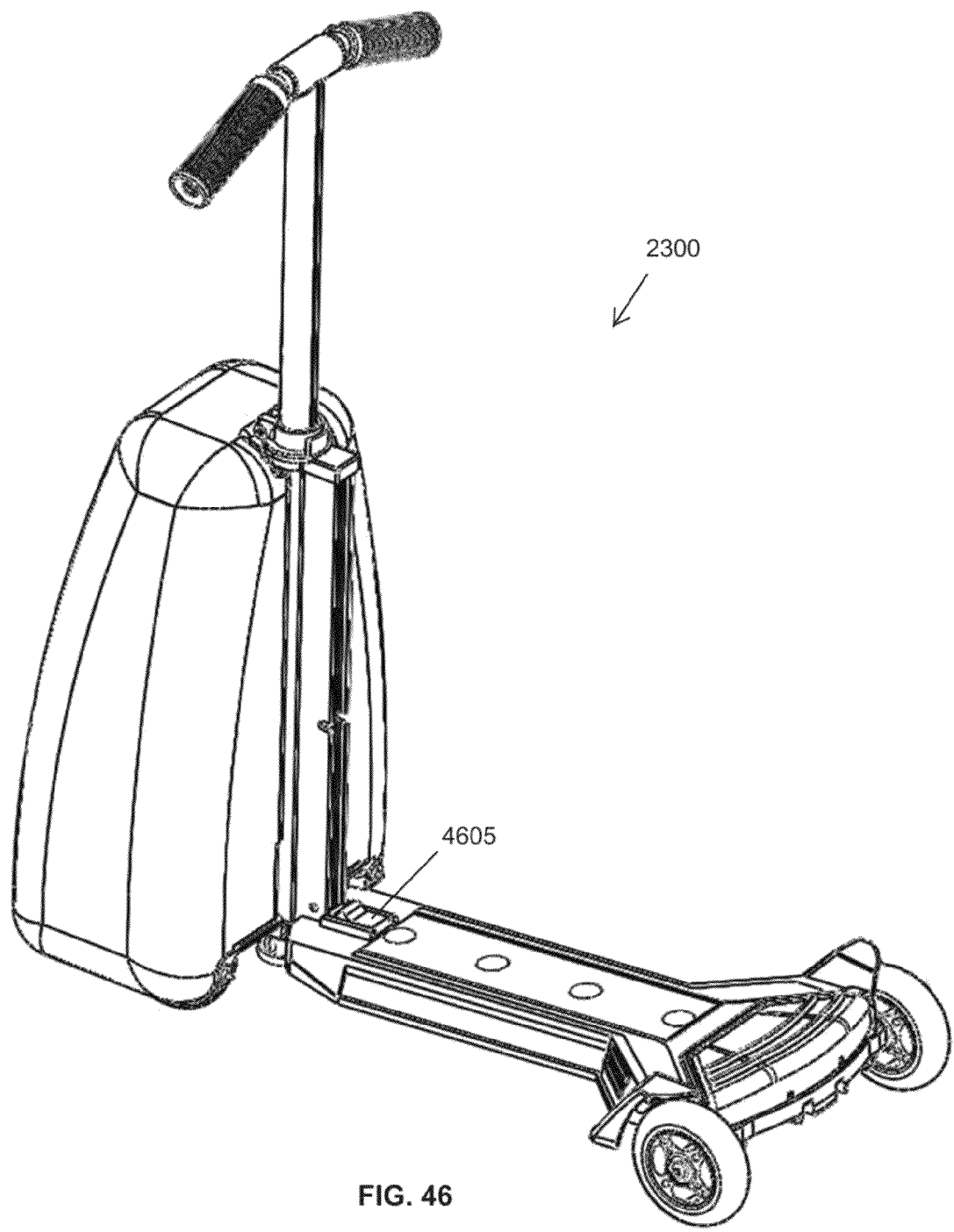
FIG. 46 illustrates a plan view for an alternative representative deck latching system for the alternate embodiment shown in FIG. 23.
Figure 47:
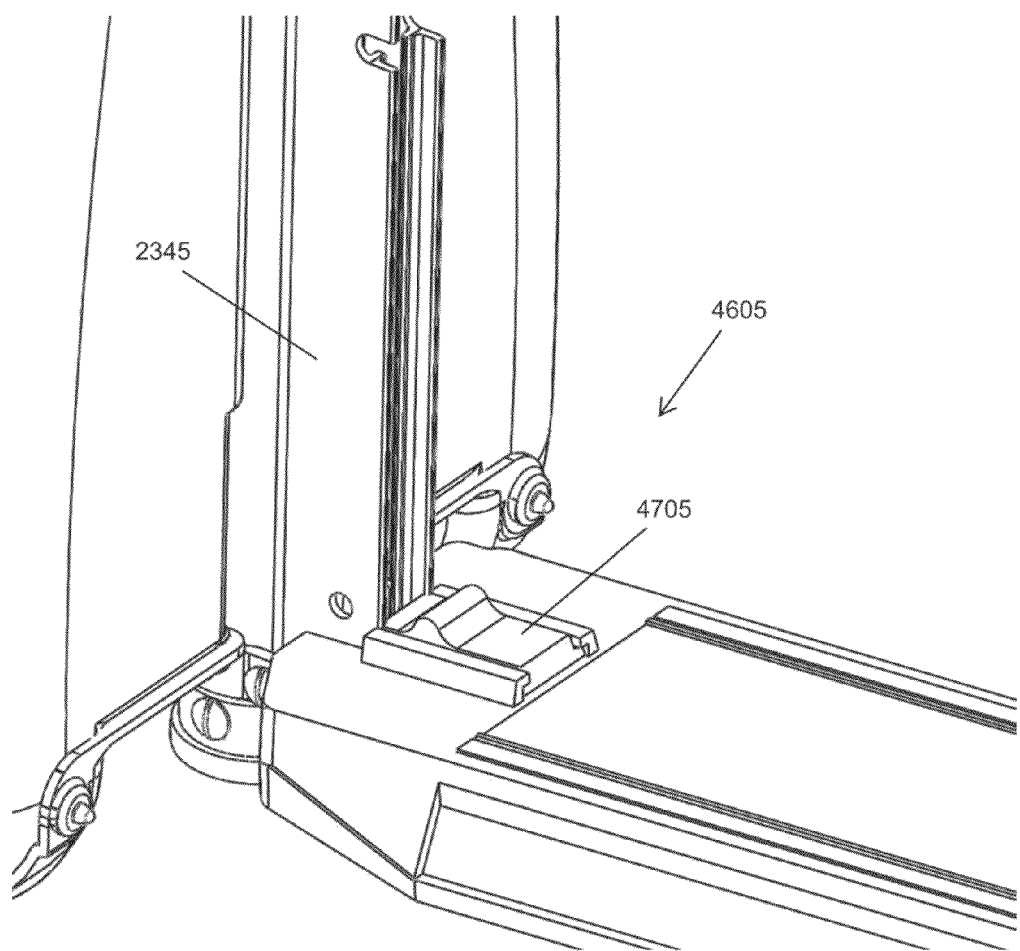
FIG. 47 illustrates a detail plan view of the deck latching system shown in FIG. 46.

FIG. 46 illustrates a plan view for an alternative representative deck latching system 4605 for platform 2300 shown in FIG. 23. FIG. 47 illustrates a detail plan view of deck latching system 4605 shown in FIG. 46. Deck latching system 4605 includes a sliding latch 4705 that slides backward to initiate disengagement of deck latching system 4605 from track assembly 2345 and slides forward to initiate engagement of track assembly 2345.

Figure 48:
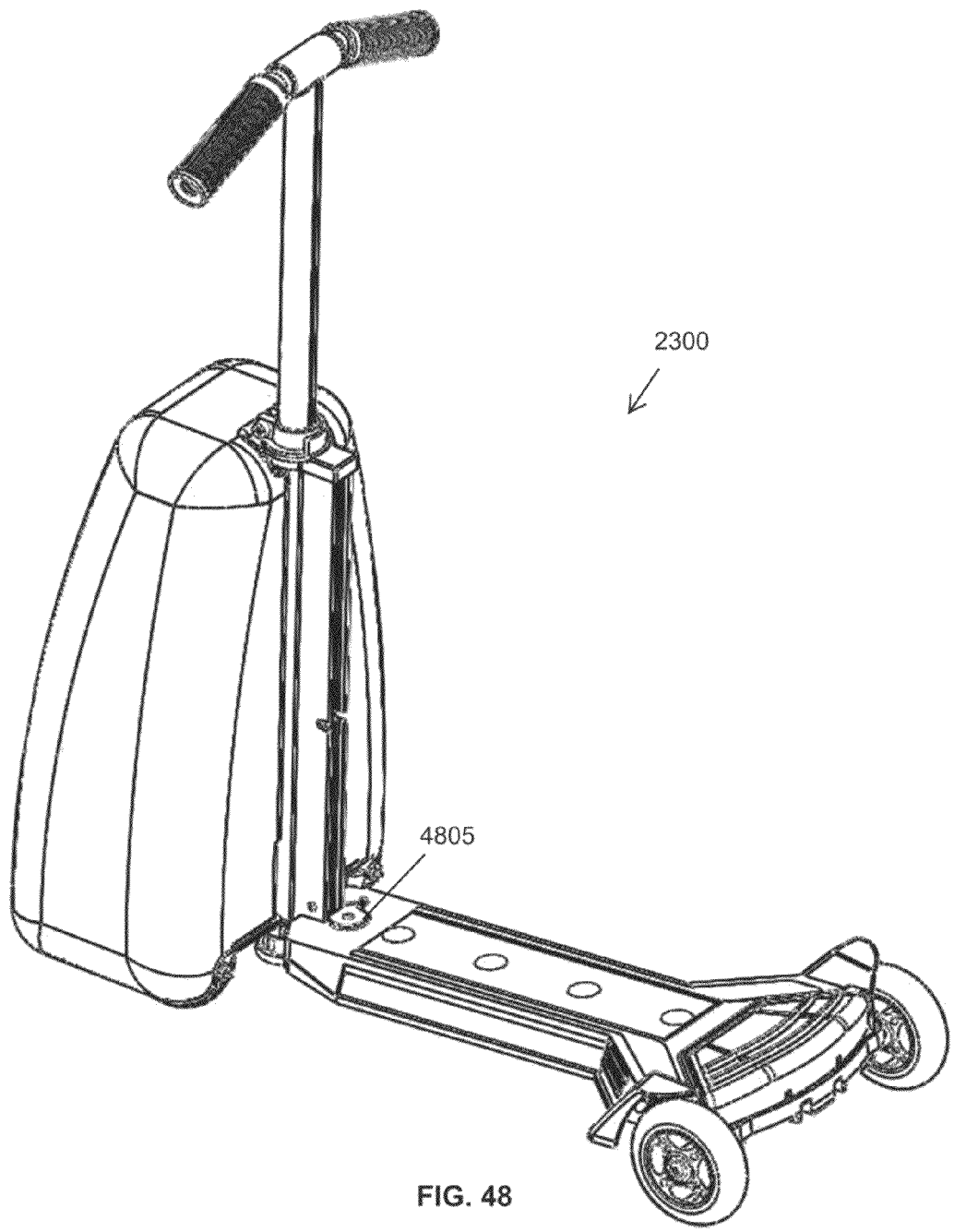
FIG. 48 illustrates a plan view for an alternative representative deck latching system for the alternate embodiment shown in FIG. 23.
Figure 49:
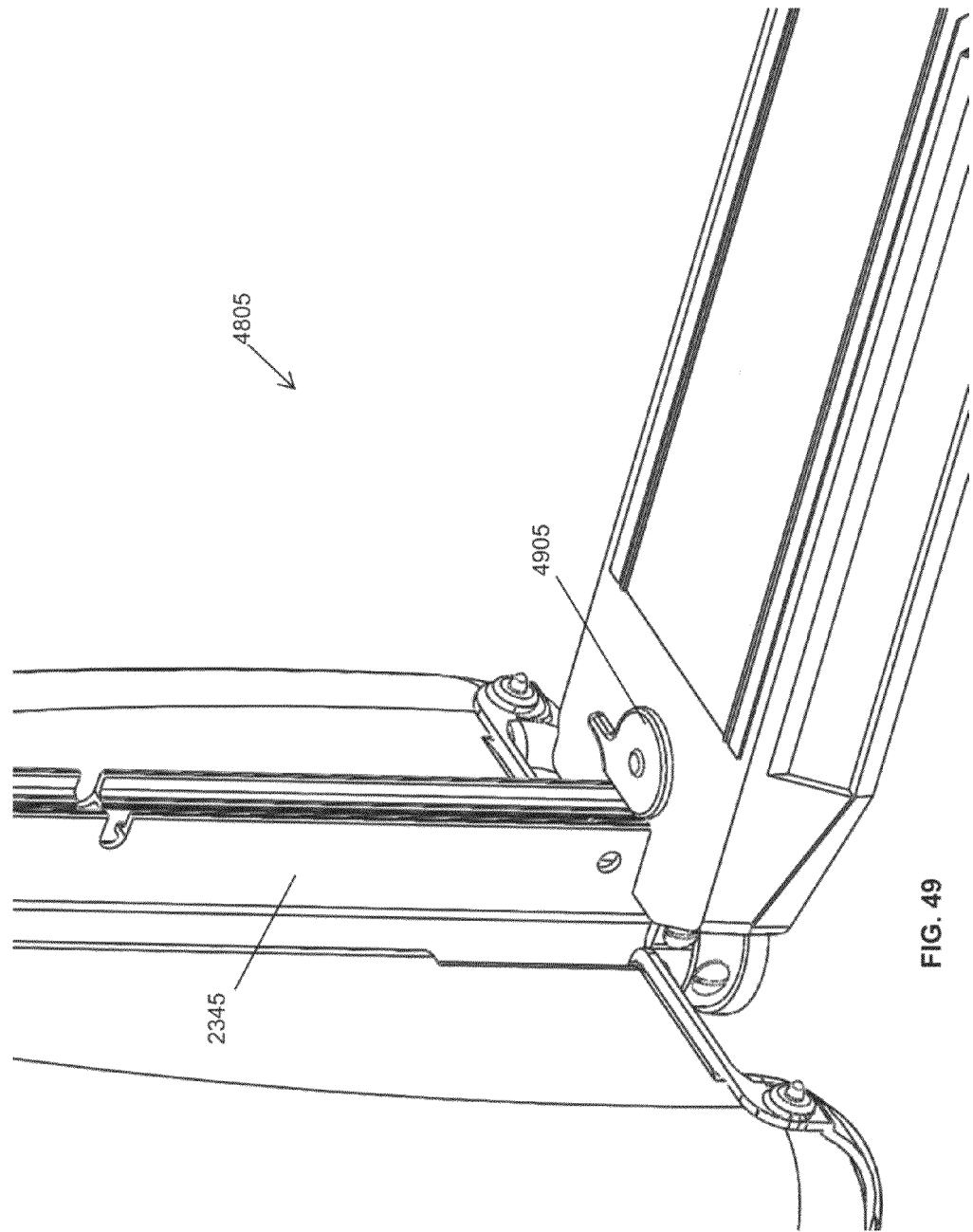
FIG. 49 illustrates a detail plan view of the deck latching system shown in FIG. 48.

FIG. 48 illustrates a plan view for an alternative representative deck latching system 4805 for platform 2300 shown in FIG. 23. FIG. 49 illustrates a detail plan view of deck latching system 4805 shown in FIG. 48. Deck latching system 4805 includes a rotating latch 4905 that rotates in one direction to initiate disengagement of deck latching system 4805 from track assembly 2345 and rotates in the other direction to initiate engagement of track assembly 2345.

Figure 50:
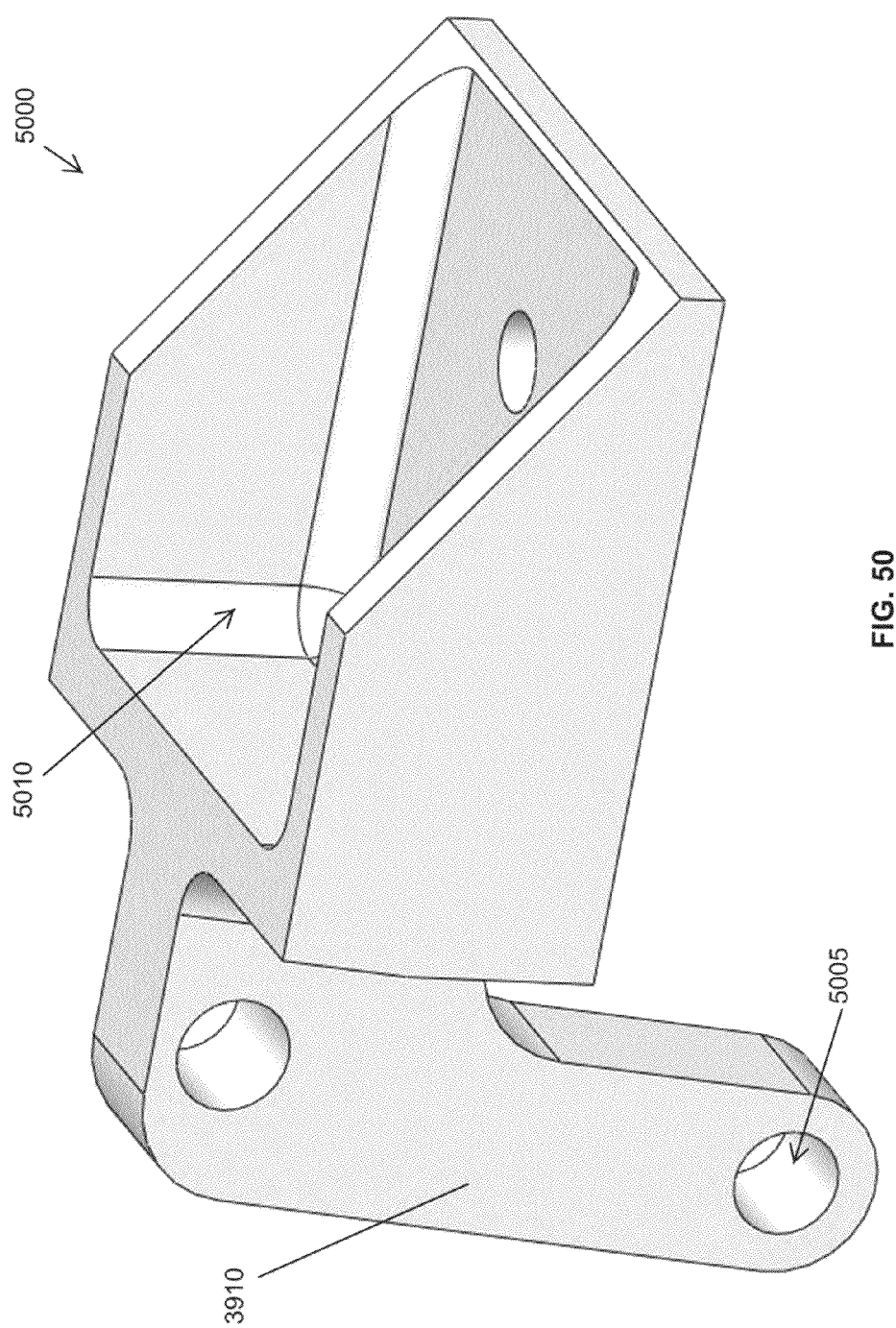
FIG. 50 illustrates a deck stop for the alternate embodiment shown in FIG. 23.

FIG. 50 illustrates a deck stop 5000 for platform 2300 shown in FIG. 23. Deck stop 5000 is part of the connection system between the rider deck and the track assembly shown and described herein. Arm 3910 is part of deck stop 5000 and includes an aperture 5005 for mounting the rollers that move within the tracks of the track assembly. A recess 5010 receives and secures a strut underlying the rider deck to add strength. Latching mechanisms described herein are responsive to this arrangement of deck stop 5000. Alternatives to deck stop 5000 may be implemented, for example, deck stop 5000 may be mounted under the rider deck which allows removal of a front "hump" shown at the front of the rider deck in some figures and would permit alternate latching mechanisms to be used. Additionally, for some designs, the hump may on the distal end of the rider deck can make wearing platform 2300 in backpack mode uncomfortable for some users. Alternative structures resulting in reduction/elimination of the hump or this effect are advantageous.

Figure 51:
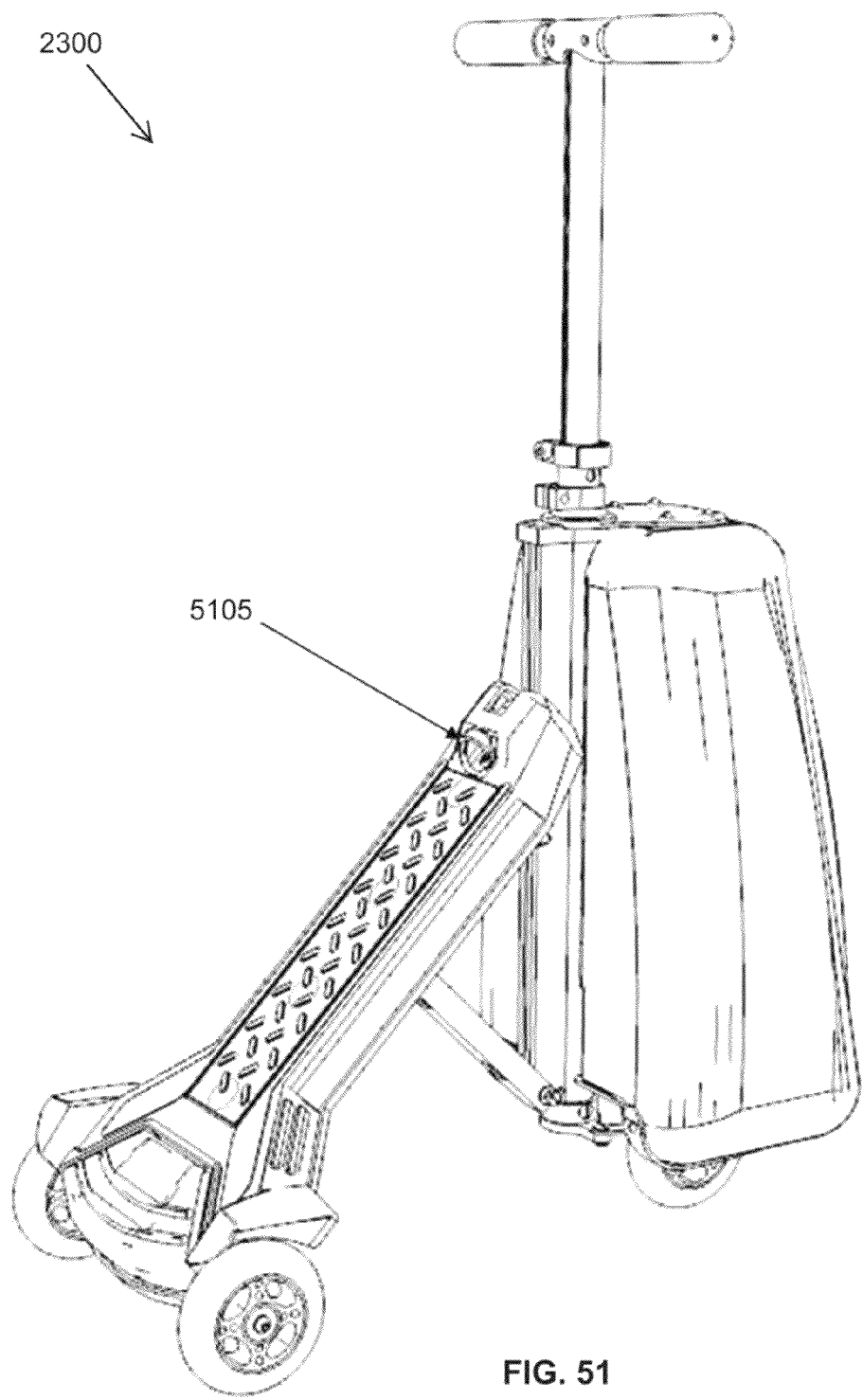
FIG. 51 illustrates a deck pull handle for the alternate embodiment shown in FIG. 23.
Figure 52:
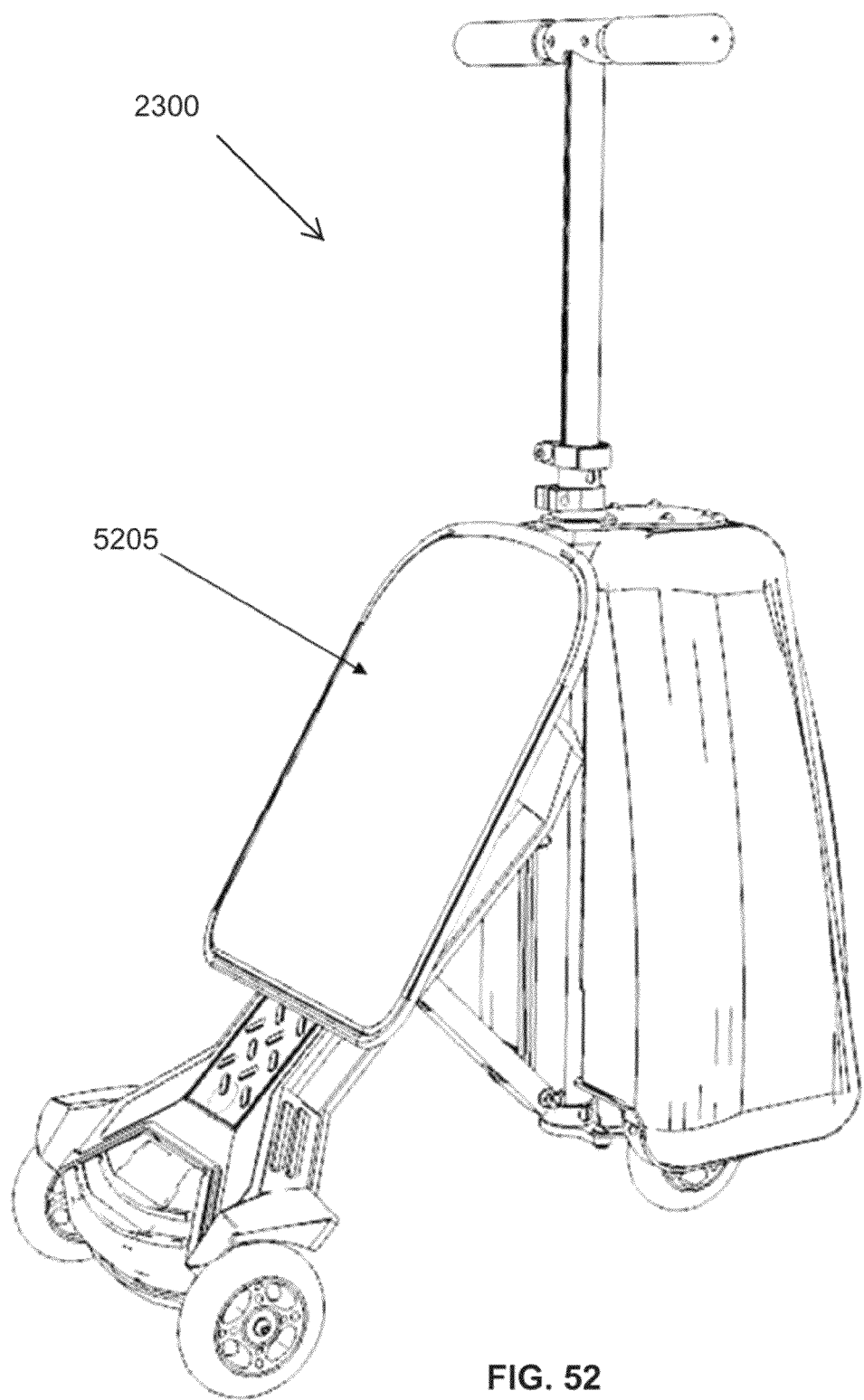
FIG. 52 illustrates an isometric view of an optional backpack pad used with the alternative embodiment shown in FIG. 23.

FIG. 51 illustrates a deck pull handle 5105 for platform 2300 shown in FIG. 23. FIG. 52 illustrates an isometric view of an optional backpack pad 5205 used with platform 2300 shown in FIG. 23. Deck pull handle 5105 is, in some embodiments, integrated into platform 2300, allowing for its deployment and stowage. Backpack pad 5205 hinges at the top and secures at the bottom with selective attachment structures (e.g., magnets and the like) in the folded/closed position.

Figure 53:
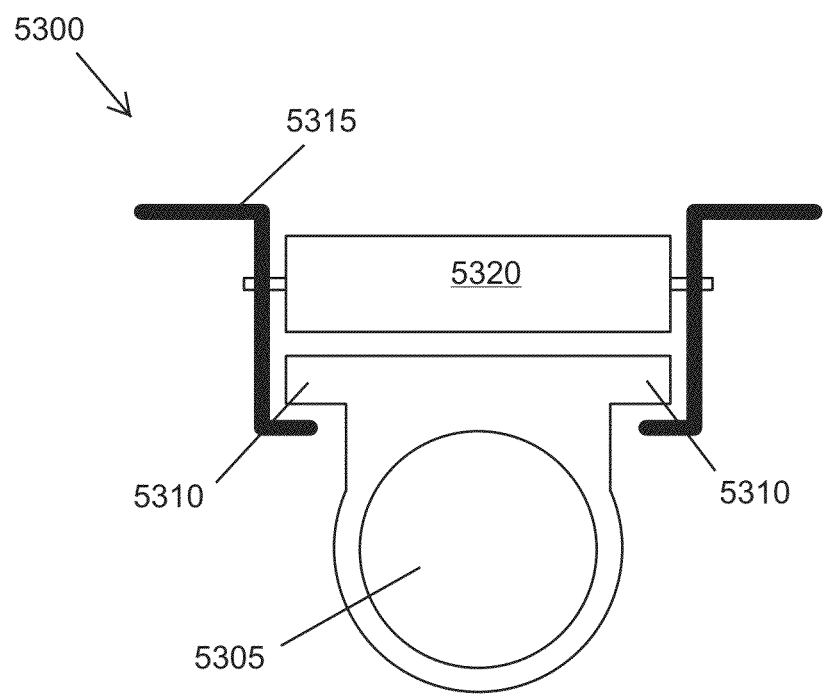
FIG. 53 illustrates an alternative to the roller assembly shown in FIG. 39.

FIG. 53 illustrates an alternate deck roller assembly 5300 that is an alternative to roller assembly connecting system 3905 shown in FIG. 39. Deck roller assembly 5300 includes a "spine" support 5305 (e.g., a tube for handle 2310 or the like) that includes a pair of integrated flanges 5310. A roller assembly engages flanges 5310 and includes a roller 5320. Attachment of rider deck 2315 to assembly 5315 allows opening/closing similar to that as described herein for other roller assembly alternatives.

Other improvements include structures making platform 2300 less bulky, and lighter, and reducing costs of goods. The figures herein represent prototypes and initial visualizations of the product and in some ways are sturdier than required for manufacturing. Some of the designs reflect prototypes built from 1"-thick solid aluminum stock, which is unnecessary for manufactured products, but appropriate for wanting to withstand extended testing and potential failure analysis. Alternatives suitable for manufacture may include designs inspired from folding ironing tables (which employ very inexpensive yet reliable fold-and-slide mechanism) and drawer rail hardware. The latter are made out of punched and formed steel and are rated to support considerable load. Also, they roll on inexpensive nylon rollers which could help the platform deploy smoothly. These two points of departure or inspiration alone would help reduce complexity, bulk, weight and expense considerably.

Specifics of shoulder/carrying straps have not been shown as they may implemented in many different ways. A preferred implementation includes straps mounted to a side of cargo container 2305 supporting rider deck 2315. A pair of straps are provided on lateral sides of rider deck 2315, connected at a top and at a bottom of cargo container 2305. For straps disposed on that side of cargo container 2305, it is advantageous to provide for a strap management system to inhibit having straps interfere with use during ride and pull modes. Strap management may be fairly basic, including a retaining system for the straps and cargo container such as hook-and-loop mating patches that removeably attach the straps to the cargo container and reduce interference. More exotic systems of buckles and retainers may be used to more securely and aesthetically retain the straps when not needed or desired, such as for carrying platform 2300.

Figure 54:
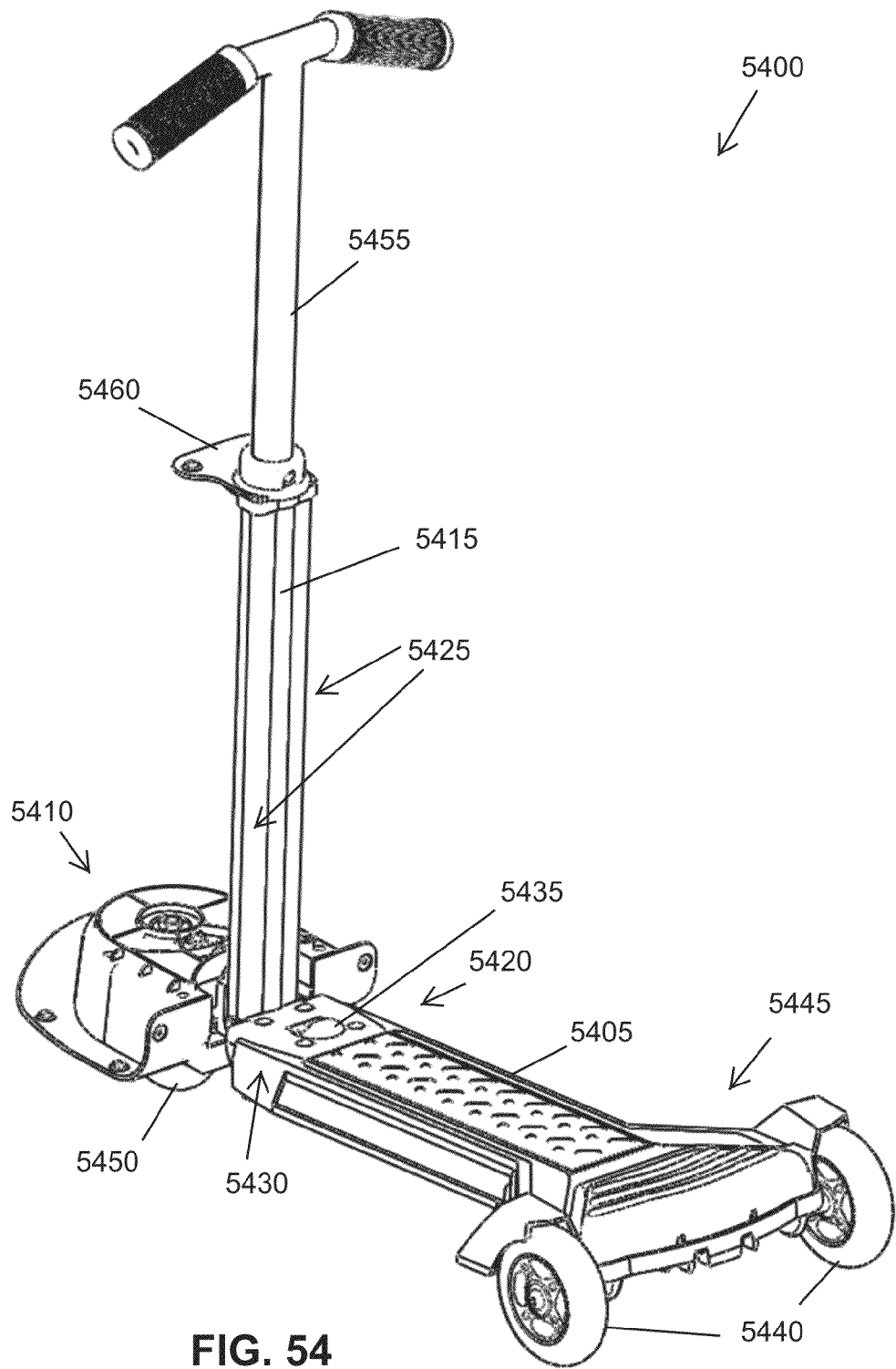
FIG. 54-FIG. 73 illustrate alternative embodiments for a backpack with a deployable wheeled rider deck.
Figure 55:
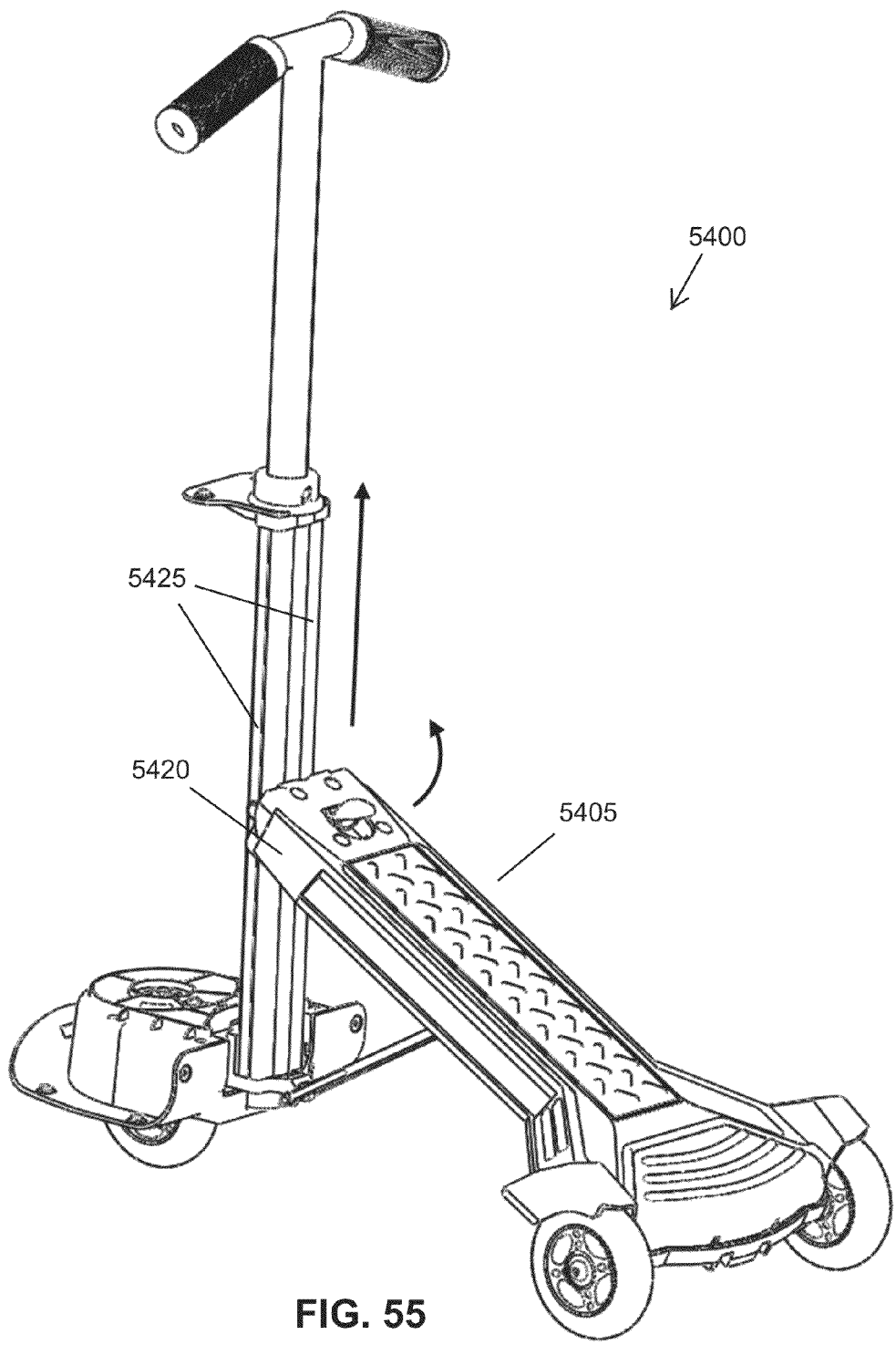
Figure 56:
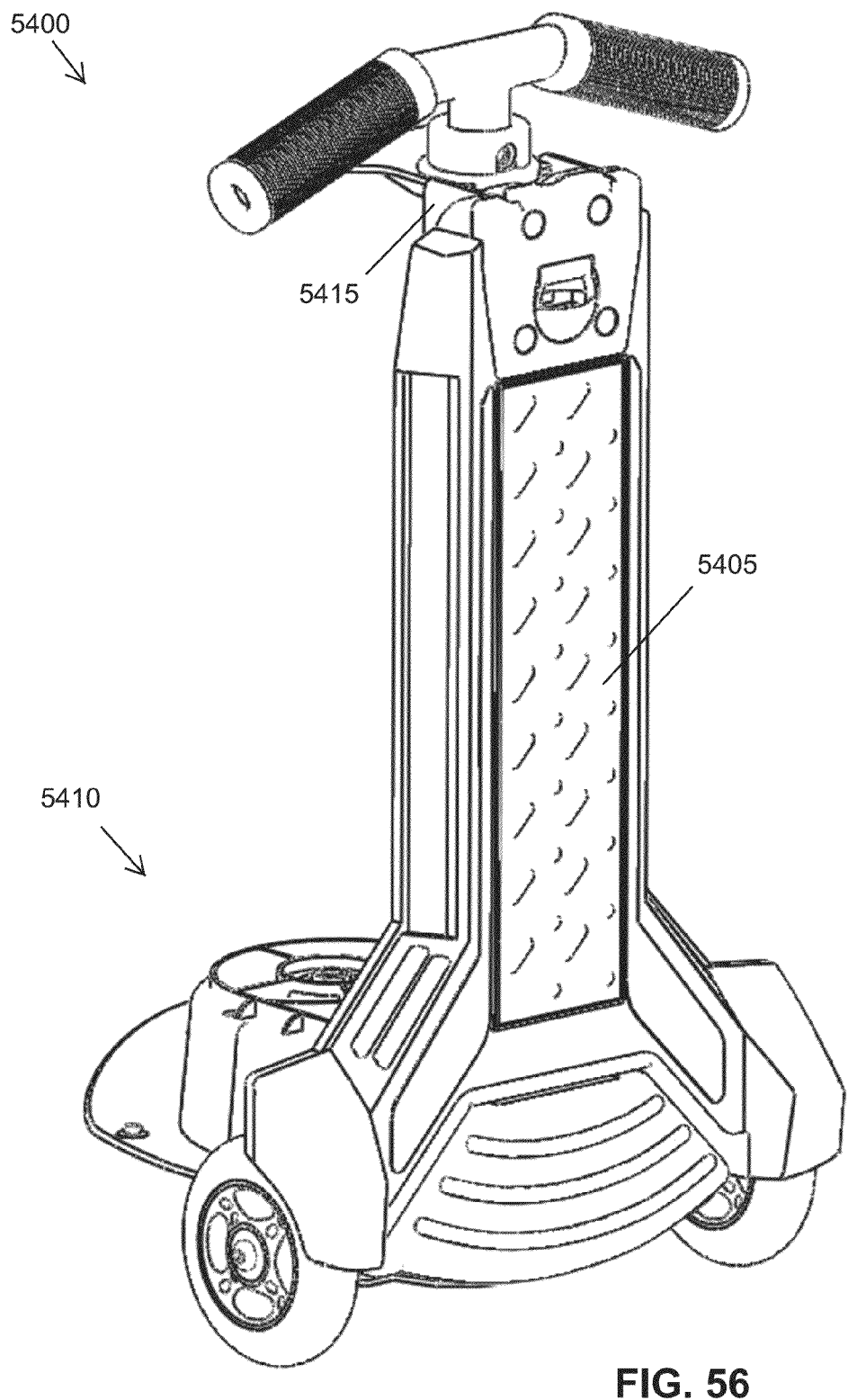

FIG. 54-FIG. 73 illustrate alternative embodiments for a backpack framework 5400 with a deployable wheeled rider deck (or platform) 5405. FIG. 54 illustrates a rear perspective view of the alternative embodiment in an open mode. FIG. 55 illustrates a rear perspective view of the alternative embodiment in an intermediate mode. FIG. 56 illustrates a rear perspective view of the alternative embodiment in a closed mode. Backpack framework 5400 is configured for use with a removable backpack (not shown) supported by a backpack support/steering shroud 5410. Backpack framework 5400 is shown without the backpack to better visualize the components and their operation. It is preferred that a user be able to detach the backpack from backpack framework 5400 and use the backpack in standalone fashion, while preserving an option for its use. In other implementations, the backpack is not required to be removable, such as having backpack framework 5400 integrated into the backpack, luggage, container, or the like.

As described herein, platform 5405 is moveably engaged with a main tube 5415 that extends generally vertically from support/shroud 5410 (some embodiments may provide a strictly vertical arrangement while other arrangements may configure main tube with a slope). Platform 5405 includes a coupling that enables a proximal end 5420 (via a lateral linkage) to travel along a track assembly (in this embodiment one or more (preferably a pair of opposing) lateral rails), herein referred to as lateral rails 5425 when transitioning platform 5405 between the open mode and the closed mode. A latching mechanism 5430 locks platform 5405 into the open mode. Latching mechanism 5430 operates by use of a simple latch handle 5435 to unlock platform 5405. This enables single-handed manipulation and operation to transition platform 5405 between the modes. The coupling may include one or more sliders, rollers and the like. Additionally, the track assembly may include a wide-range of different rails, channels, guides, and the like, in addition to or in lieu of the particular implementation shown and described herein.

Platform 5405 includes one or more (preferably a pair) of wheels 5440 at a distal end 5445. One or more (preferably one) steering wheel 5450 is coupled to main tube 5415 by a steerage linkage to enable safe steering by virtue of a steering handlebar 5455 rotatably coupled to the steerage linkage through main tube 5415. A preferred implementation includes provision of the three wheels as described which enables a user to maintain all three wheels in contact with the ground in either the open mode or the closed mode.

Representative attachment points, for example a plate 5460, are shown to support repeatable (de)attachment of a backpack to backpack framework 5400. (Other attachment points may be disposed on other parts, for example, along a perimeter of support/shroud 5410.)

In FIG. 55, backpack framework 5400 is transitioning from the open mode (e.g., FIG. 54) to the closed mode (e.g., FIG. 56). Proximal end 5420 slides up and down along lateral rails 5425 to fold/unfold platform 5405. In FIG. 56, platform 5405 is completely folded against main tube 5415.

Figure 57:
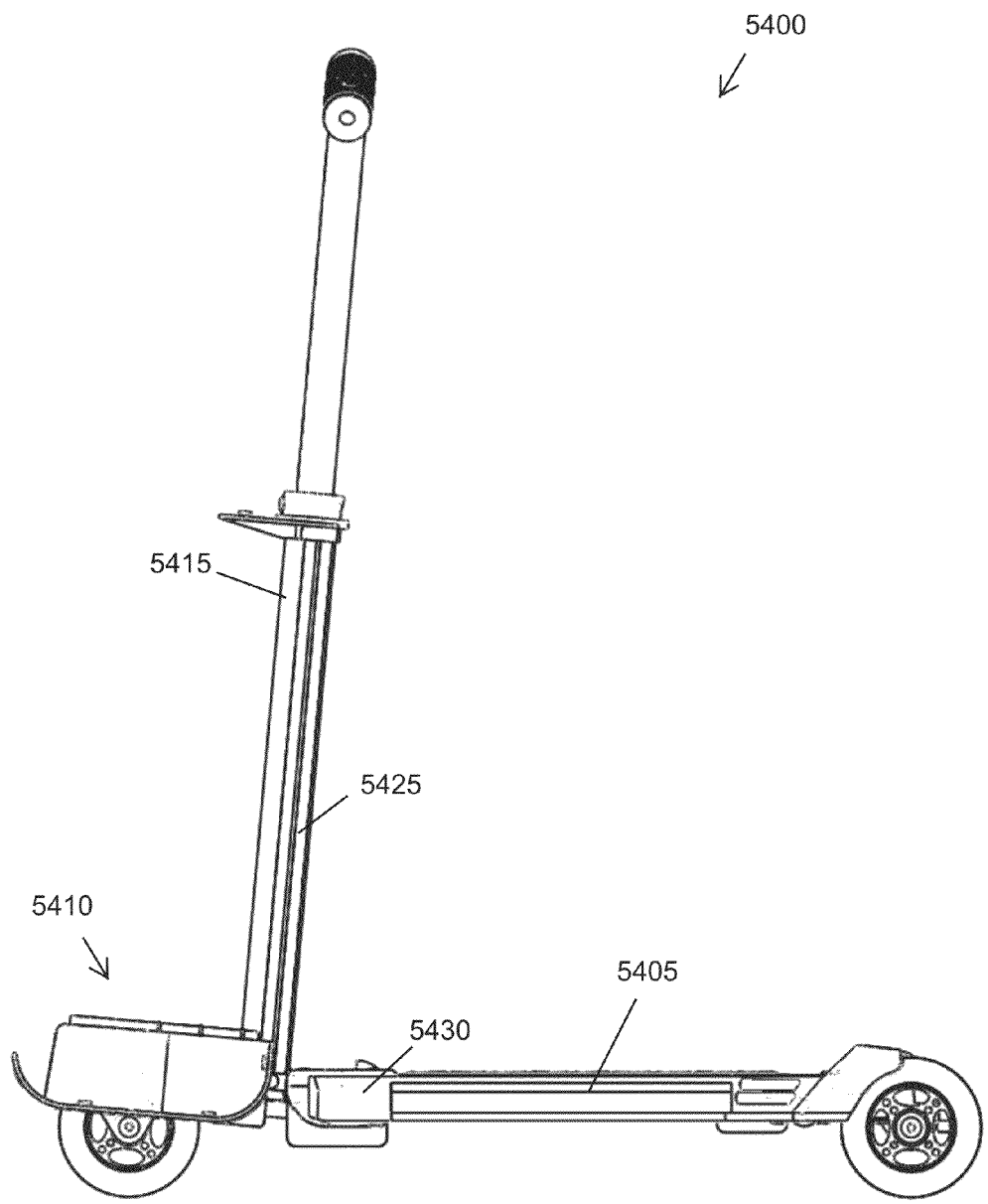
Figure 58:
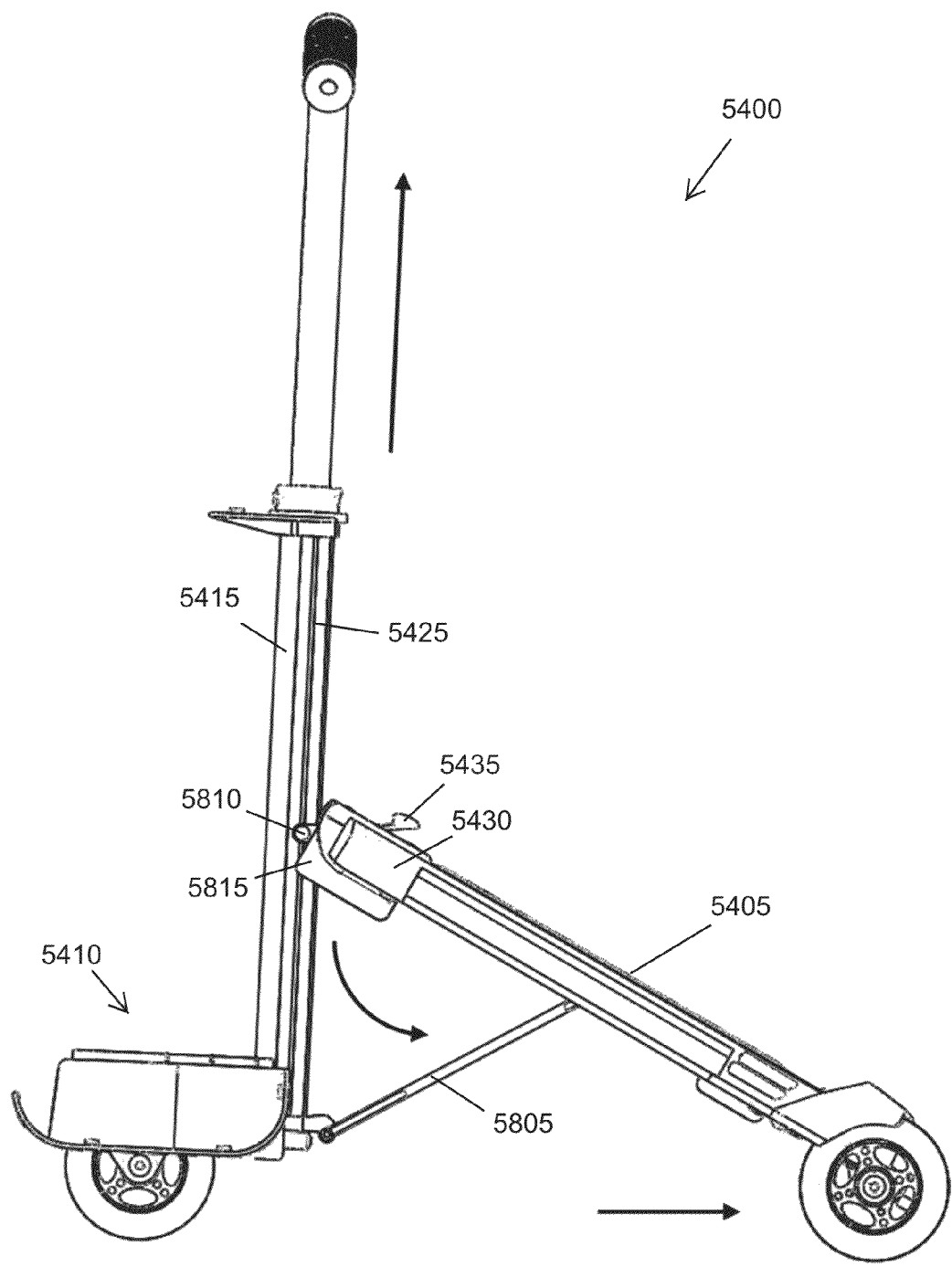
Figure 59:
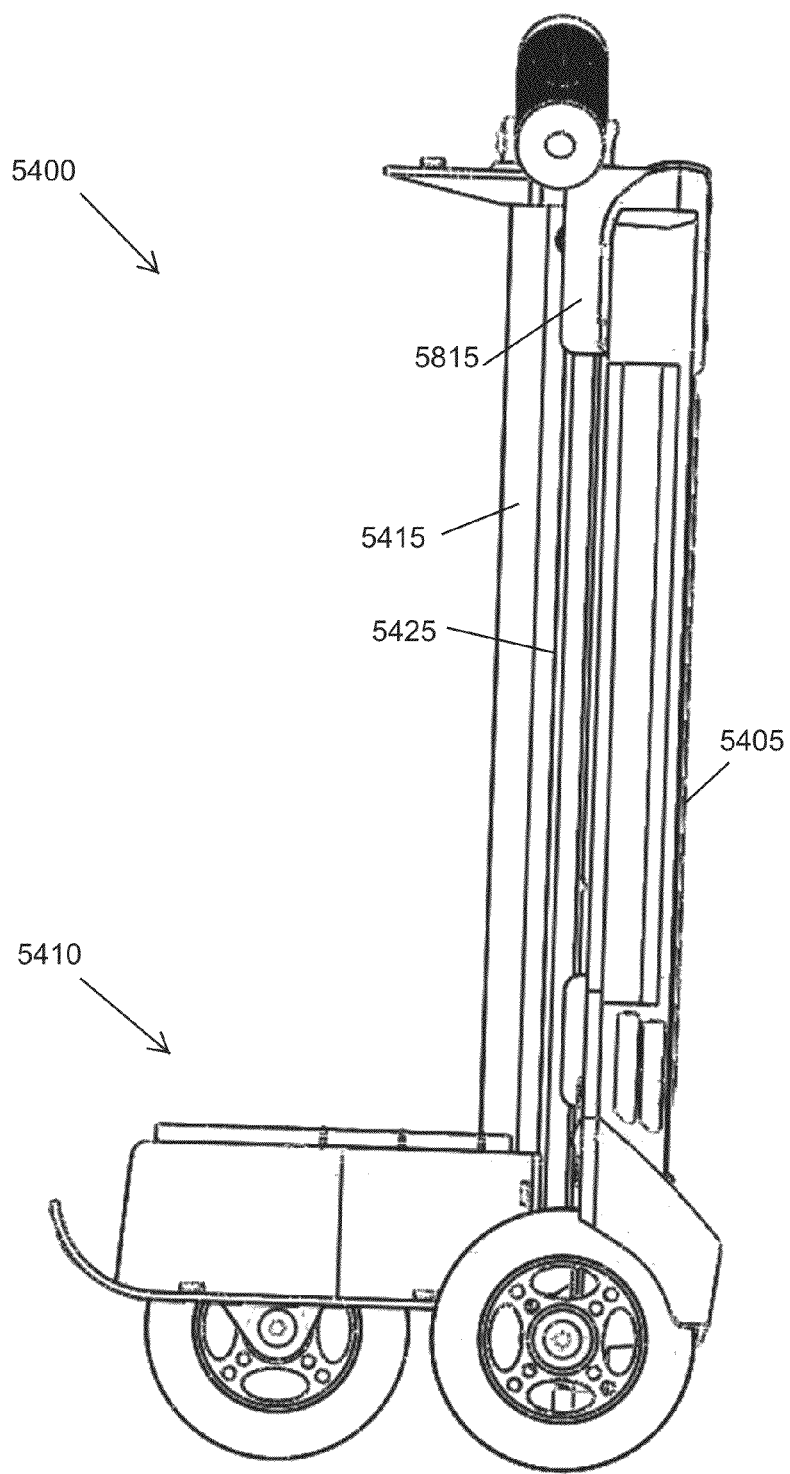

FIG. 57 illustrates a side view of the alternative embodiment in the open mode. FIG. 58 illustrates a side view of the alternative embodiment in the intermediate mode. FIG. 59 illustrates a side view of the alternative embodiment in the closed mode. FIG. 58 presents a linkage 5805 that, similarly to linkage 40 in FIG. 14, couples platform 5405 to main tube 5415. The attachment may be with one or more rollers or sliders or the like. While linkage 5805 provides advantages in operational stability and safety, linkage 5805 is a potential source of a pinch hazard, depending upon an interrelationship and interaction of linkage 5805 with other components. Some embodiments may include an option to releasably couple linkage 5805 to one or more of platform 5405 and main tube 5415. This allows linkage 5805 to release and separate rather than catch and injure any finger or other appendage. Other protection systems include use of a protective shroud.

Support/shroud 5410 serves a dual purpose in supporting a backpack as mentioned, and surrounding and inhibiting access to the steerage linkage. The steering linkage could be an additional pinching hazard. There are other potential hazards that may be shielded with a shroud. For example, a roller/linkage slider 5810 that engages lateral rail(s) 5425 and rolls/slides may in some implementations be considered to produce a pinch hazard. Use of a shroud 5815 can reduce such pinch hazards and improves the safety of such devices.

Also as seen in FIG. 58, use of roller/slider(s) 5810 and lateral rail(s) 5425 moves platform 5405 and its connection to main tube 5415 forward from rear connection and allows for use of simple latching mechanism 5430 and one-handed transition.

Figure 60:
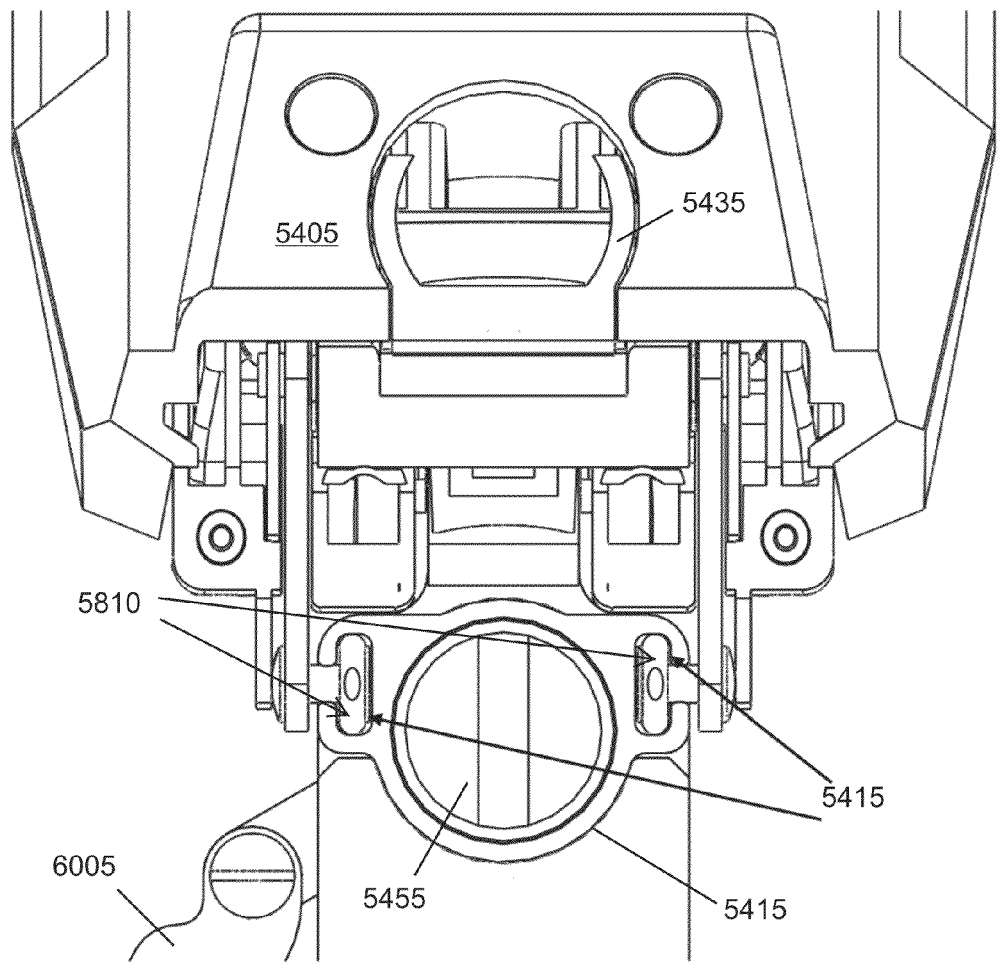
Figure 61:
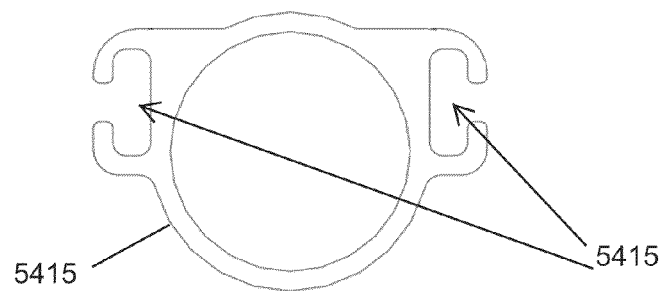

FIG. 60 illustrates a top view of a portion of the wheeled rideable platform 5405 engaging main tube 5415. FIG. 61 illustrates a top view of a pair of lateral rails 5425 used in FIG. 60. A portion of a steerage linkage 6005 is shown in FIG. 60. Steerage linkage 6005 is coupled to the front wheel and is operated by handlebar 5455 through main tube 5415.

Figure 62:
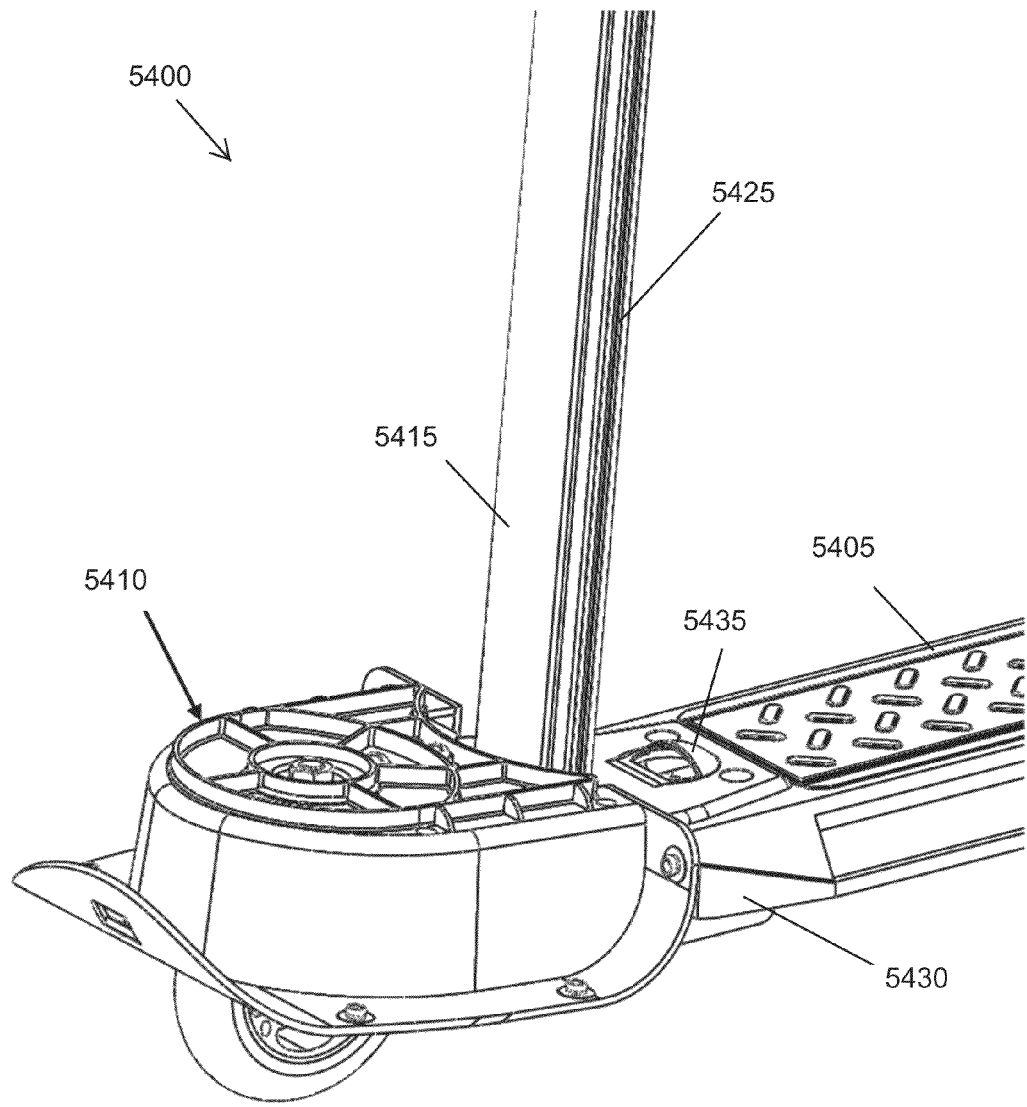
Figure 63:
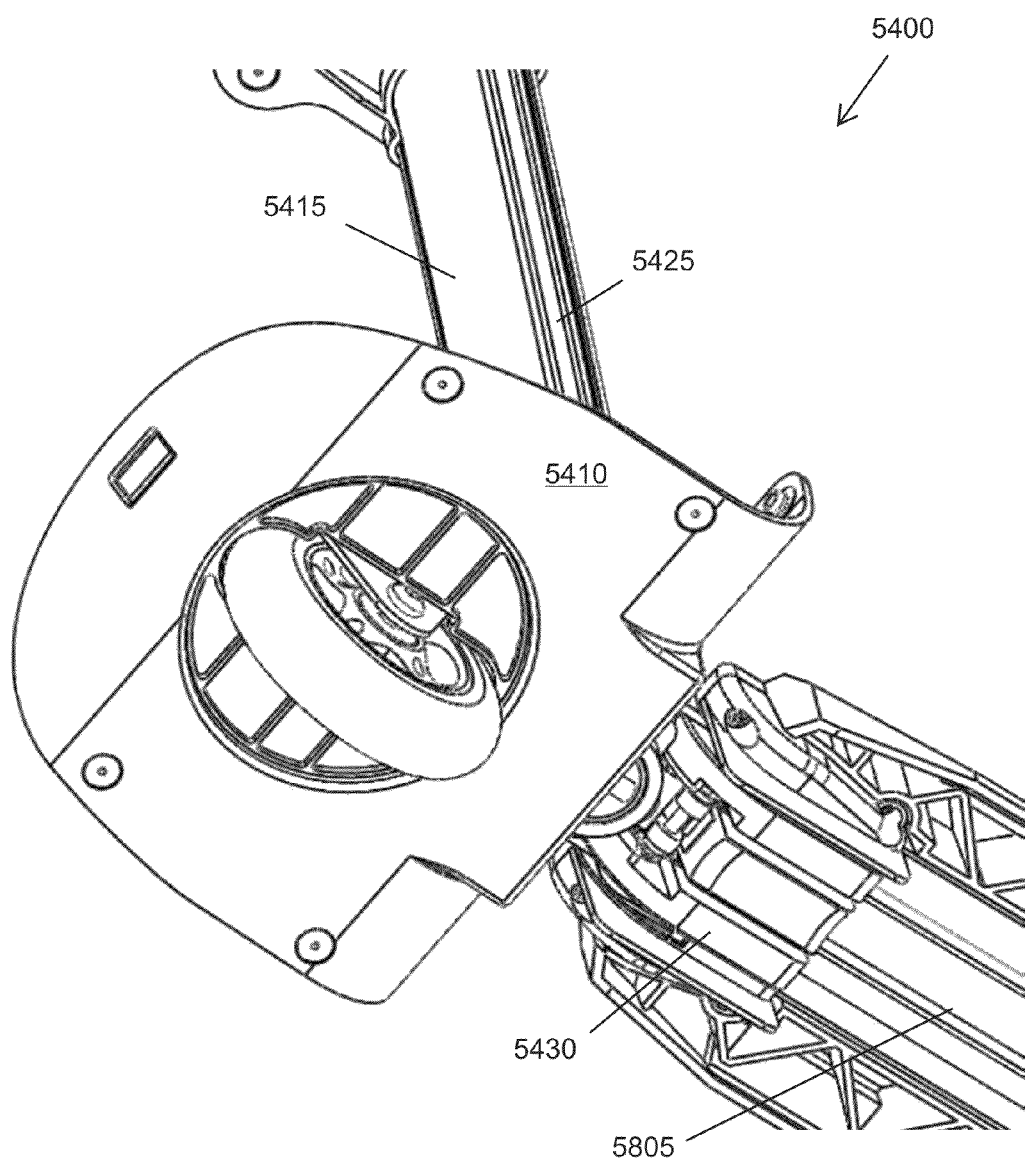

FIG. 62 illustrates a close-up section of a front perspective view of the alternative embodiment. The close-up is of backpack framework 5400 in the open mode and latching mechanism 5430 engaged and securing platform 5405 open. FIG. 63 illustrates a bottom perspective view of the section illustrated in FIG. 62.

Figure 64:
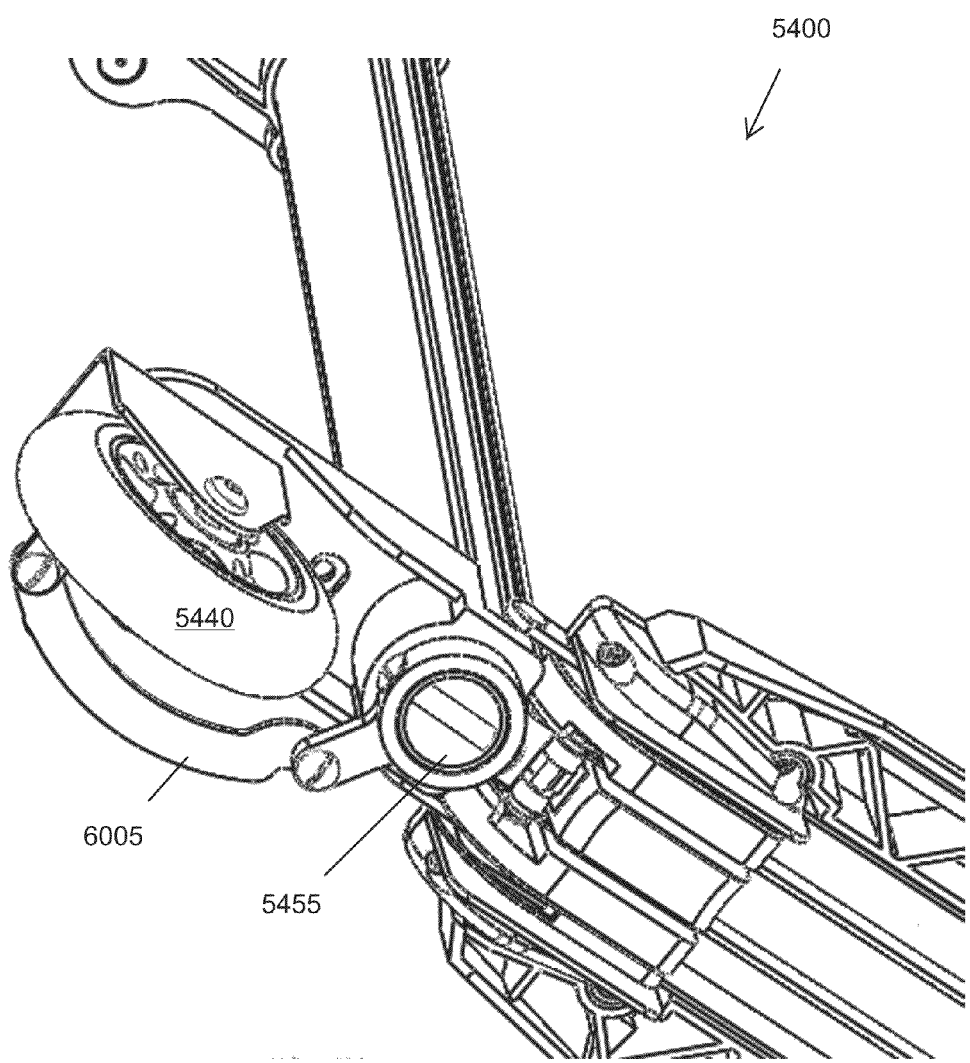

FIG. 64 illustrates the bottom perspective view of the section illustrated in FIG. 63 without support/shroud 5410. Steerage linkage 6005 is shown coupling handlebar 5455 to front steering wheel 5450. Turning handlebar 5455 turns front wheel 5440 by virtue of linkage 6005. This arrangement enables safe turning and makes it so that turning is independent of the weight and arrangement of the cargo. Without linkage 6005, a user would need to "lift" the weight of the cargo for every course correction, increasing risk as the load increases.

Figure 65:
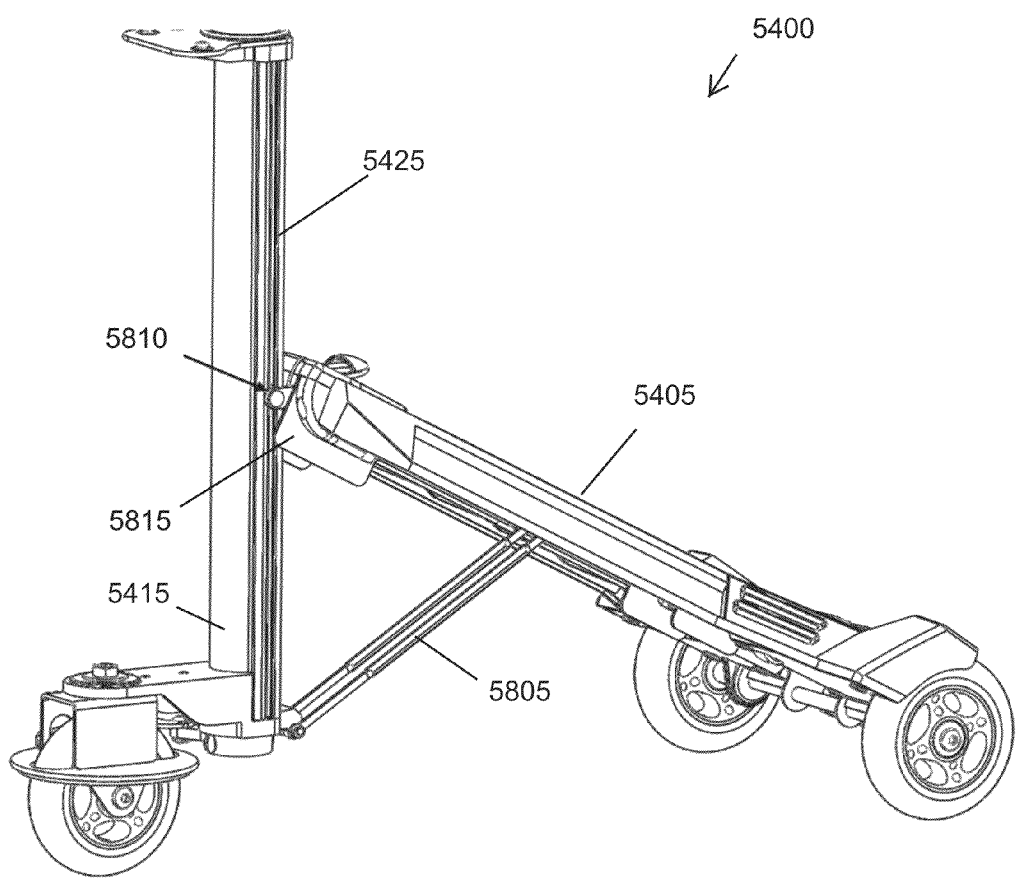
Figure 66:
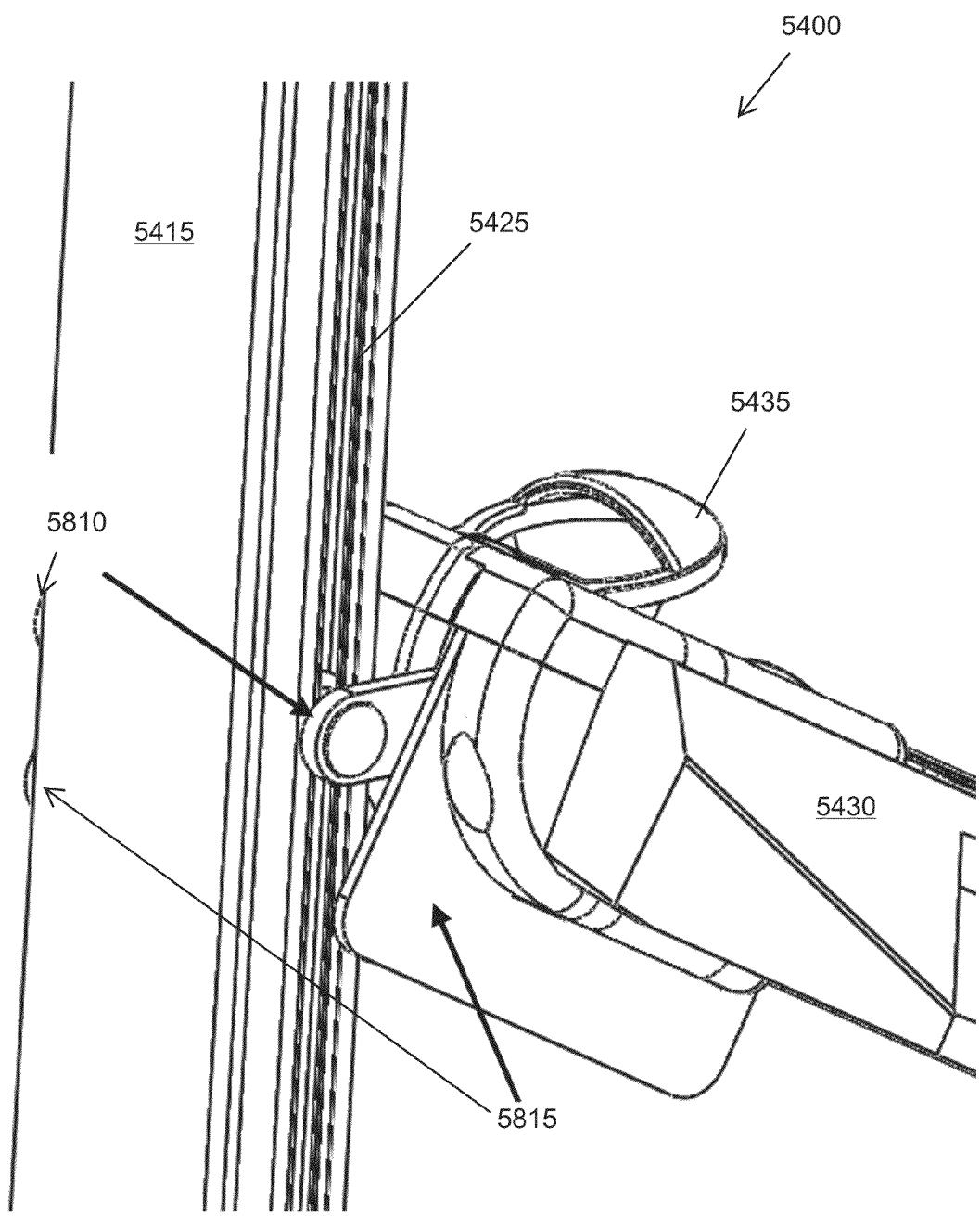

FIG. 65 illustrates a front perspective view of backpack framework 5400 in an intermediate (non-open/non-closed mode). Backpack framework 5400 is shown without support/shroud 5410 and includes roller/slider linkage 5810 engaging lateral rail 5425. As seen in FIG. 65, linkage 5805 is implemented as a pair of mechanical linkages that couple platform 5405 to main tube 5415. FIG. 66 illustrates a detail view of FIG. 65 including roller/slider linkage 5810 coupled to lateral rails 5425.

Figure 67:
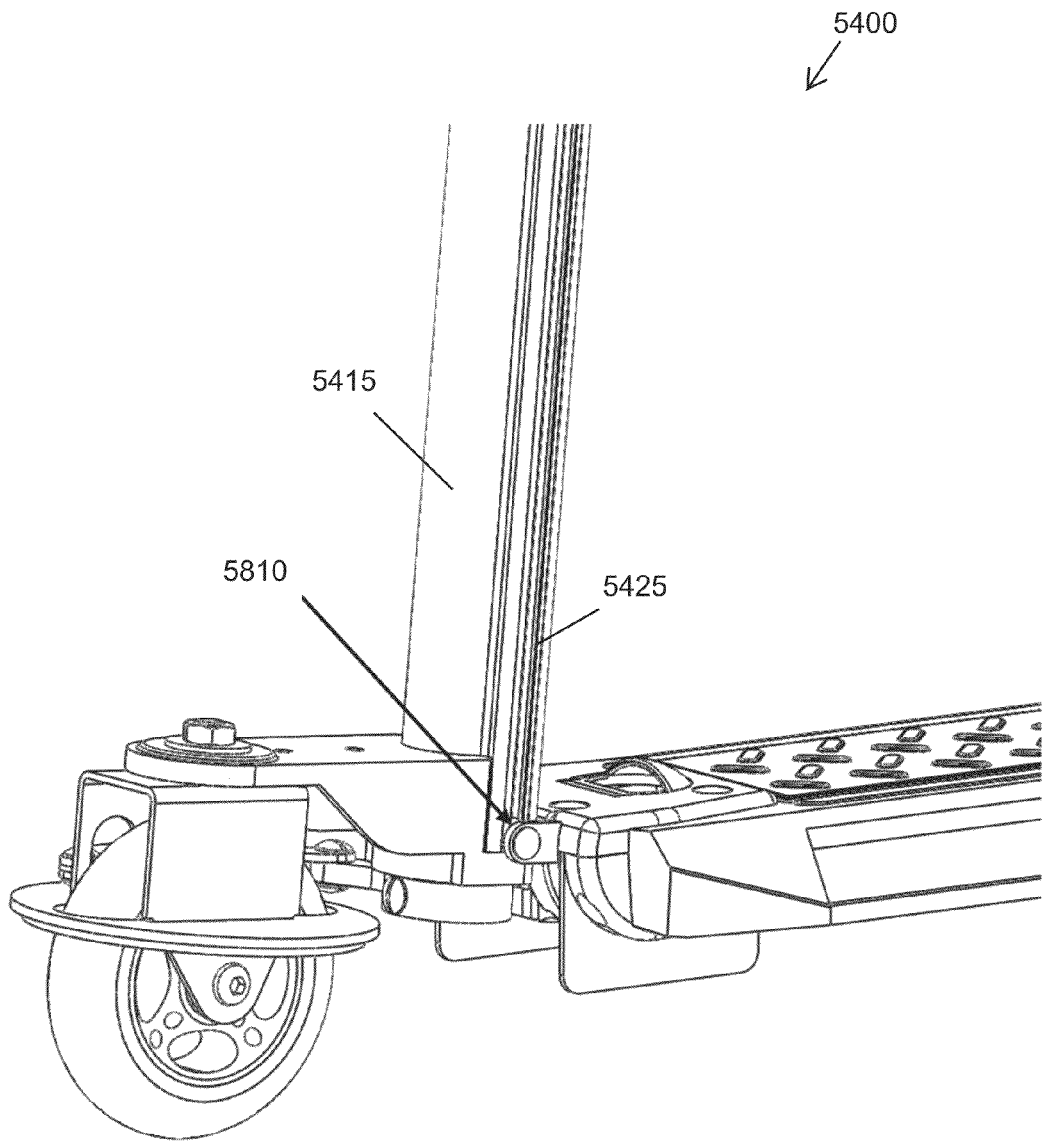

FIG. 67 illustrates a front detail perspective view of backpack framework 5400 in the open mode. Roller/slider linkage 5810 is coupled lateral rail 5425.

Figure 68:
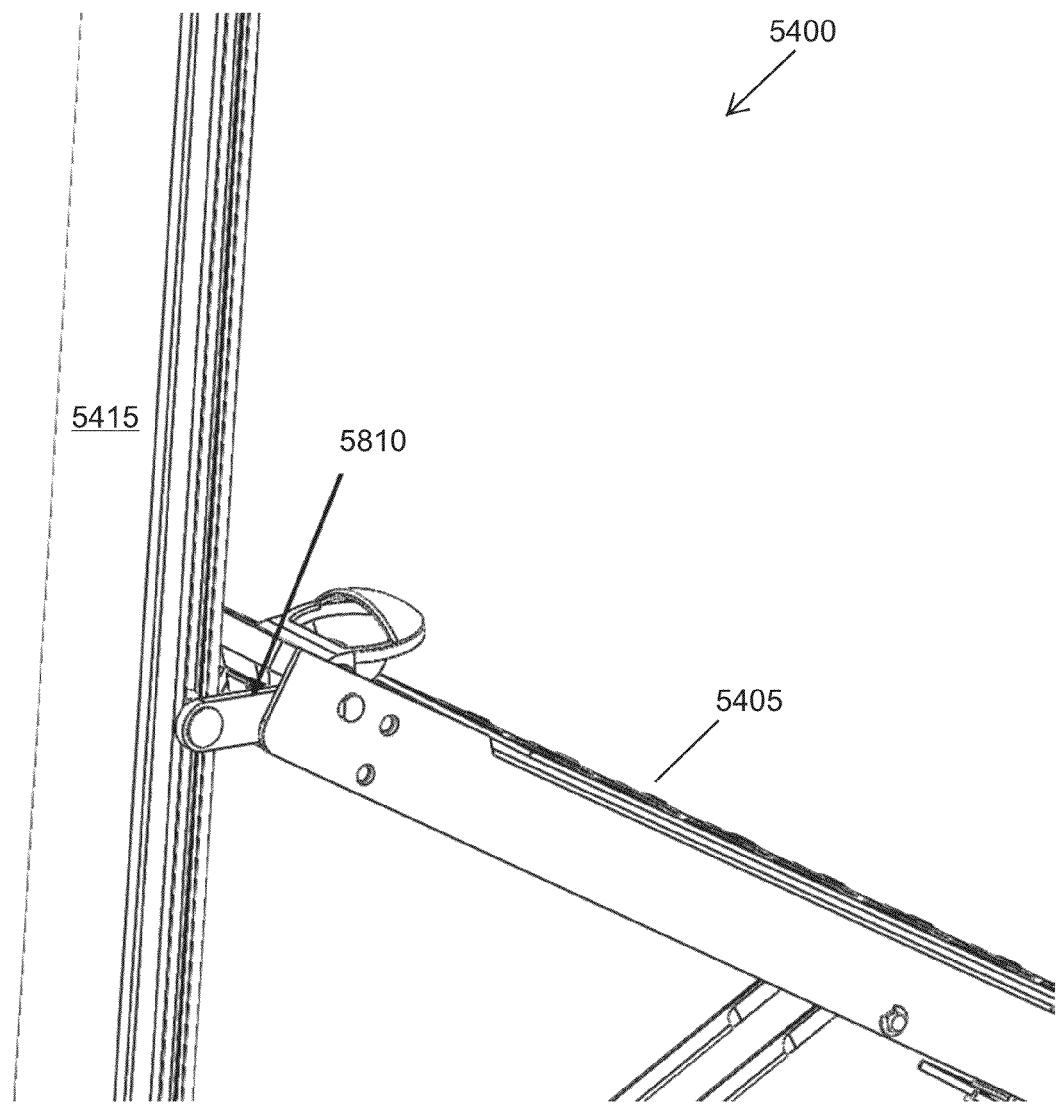

FIG. 68 illustrates the perspective view of FIG. 65 with linkage shroud 5815 removed.

Figure 69:
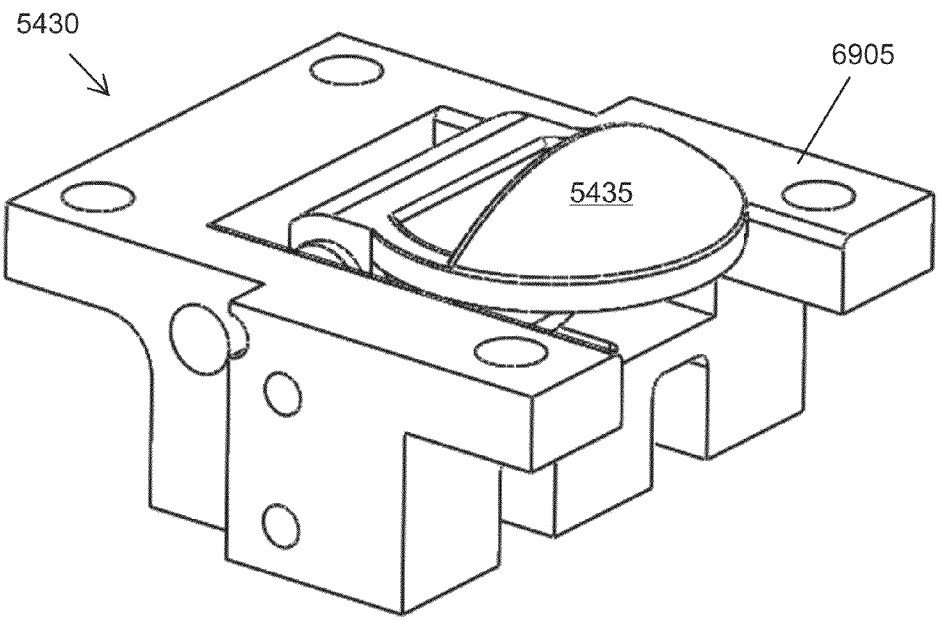
Figure 70:
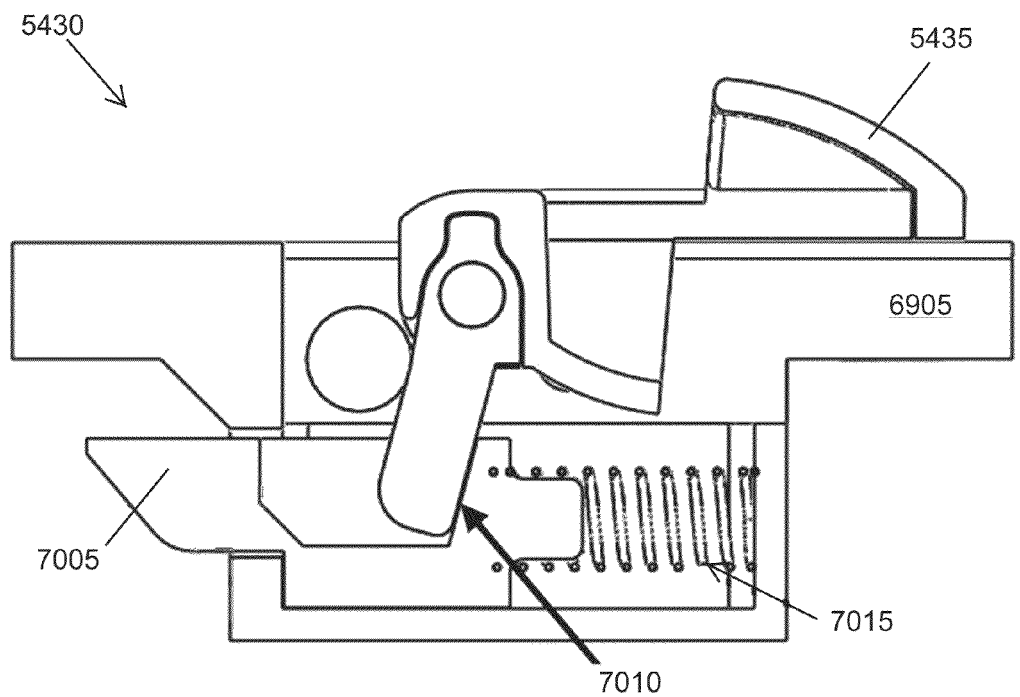
Figure 71:
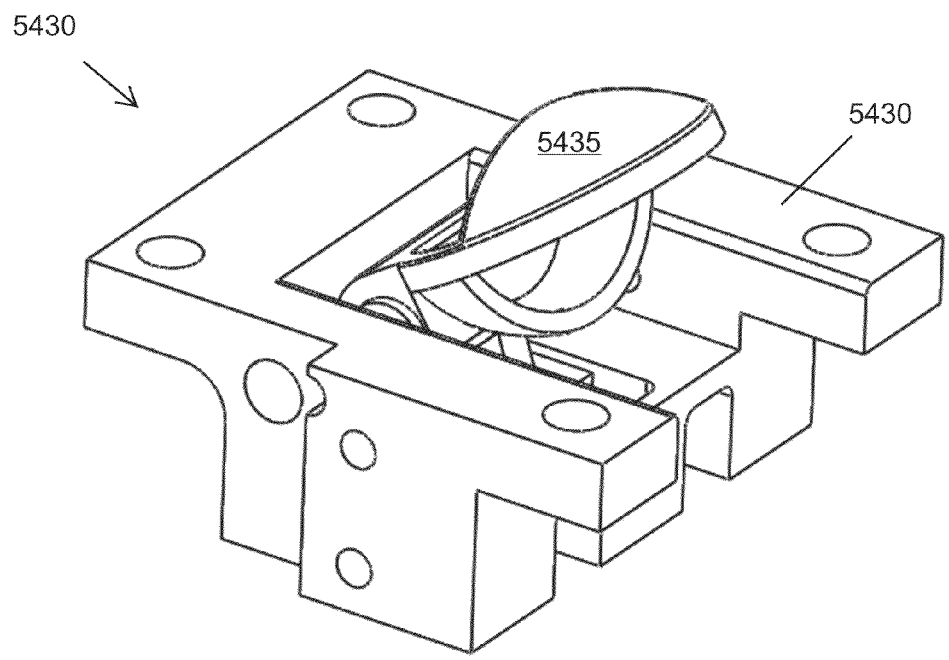
Figure 72:
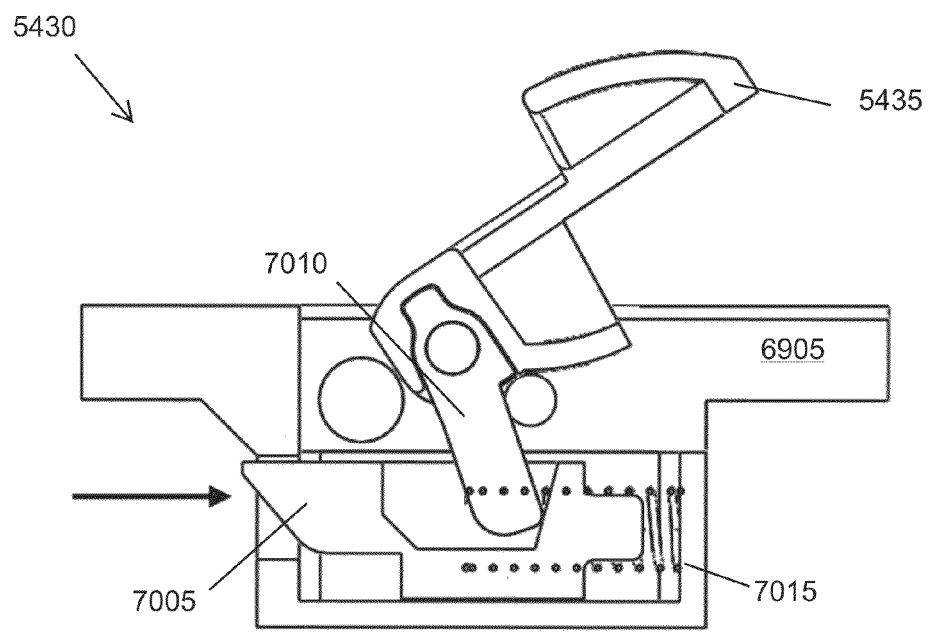

FIG. 69-FIG. 73 illustrate details of latching mechanism 5430 in latched and unlatched positions. FIG. 69 illustrates a perspective view of the latch mechanism in the latched position. FIG. 70 illustrates a side view of the latch mechanism of FIG. 69. FIG. 71 illustrates a perspective view of the latch mechanism in the unlatched position. FIG. 72 illustrates a side view of the latch mechanism of FIG. 71. Latching mechanism includes a housing 6905 that allows proper arrangement, orientation, and operation of the component parts. These parts include a latch 7005, a latch handle lever 7010, a compression spring 7015, and latch handle 5435. Compression spring 7015 biases latch 7005 in the locked position and latch handle 5435 downward. Lifting latch handle 5435 overcomes the biasing and moves latch 7005 to the unlocked position. Latch 7005 includes a beveled end to enable transition of the platform from the closed mode to the open mode to automatically lock without lifting latch handle 5435. On the main tube there is a complementary latch engagement structure that latch 7005 engages in the locked position. The beveling allows automatic locking as latch 7005 contacts the latch engagement structure but ensures positive latching so that locking mechanism 5430 may only be unlocked by manually and intentionally lifting latch handle 5435.

During operation, unlocking latching mechanism 5430 by lifting latch handle 5435 simultaneous unlocks the platform and provides the user with a handle to continue the motion and in a single action lift and close the platform. Lifting latch handle 5435 causes latch handle lever 7010 to withdraw latch 7005 and move it against compression spring 7015, thereby disengaging the lock mode.

Figure 73:
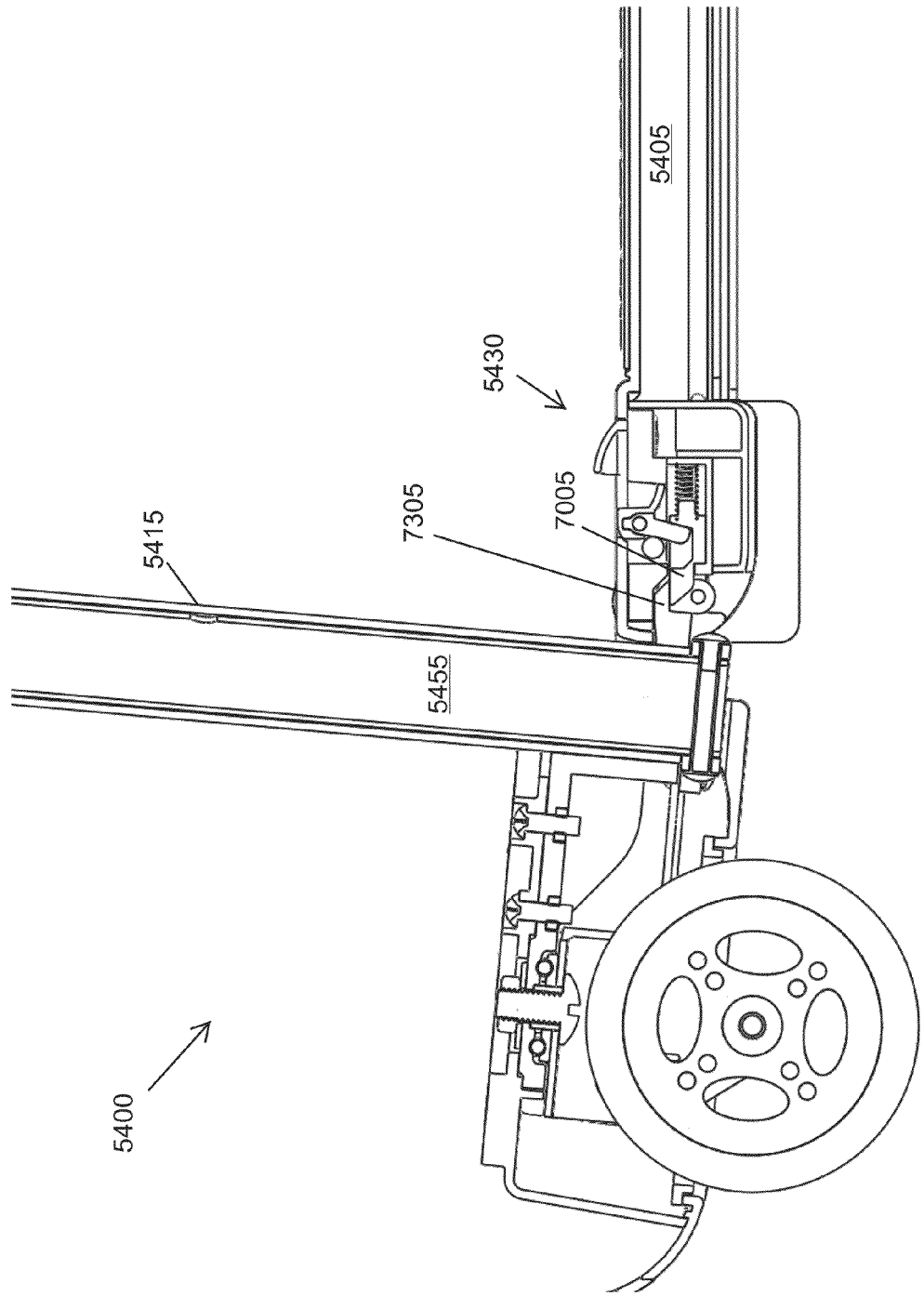

FIG. 73 illustrates backpack framework 5400 in the open mode including a side cross-section of engagement of latch mechanism in the latched position. Shown in FIG. 73 is a complementary latch engagement structure 7305 that interacts with latch 7005 to lock and unlock latching mechanism 5430, and platform 5405.

Optionally, the cargo container of any embodiment can be made of a suitably durable synthetic or natural fabric shell or it can be formed of a synthetic or natural fabric shell mounted over a rigid frame. Additionally, either embodiment can have a power source such as an electric or gas motor mounted in the platform or cargo container.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A mobility cargo platform comprising, a cargo container including a wall defining an inside and an outside, and a generally vertical central assembly including a tube having a length extending from a first location proximate a base of the cargo container towards a second location nearer a top of the cargo container, and a platform having a proximal end movably connected to the tube of the cargo container to move along the length of the central assembly wherein the platform includes a stowed mode and a riding mode with the stowed mode providing for the platform to be disposed generally parallel to the wall with the platform having an inner surface towards the inside and an outer surface further away from the inside than the inner surface and with the riding mode disposing the outer surface as a riding surface; and a latching assembly, coupled to said platform and to the tube, securing releasably the platform in the stowed mode.

2. The mobility cargo platform of claim 1 wherein a proximal end of the platform is moveably coupled to the tube and wherein a distal end of the platform includes a plurality of wheels, further comprising a braking assembly coupled to one or more of the plurality of wheels.

3. The mobility cargo platform of claim 2 the braking assembly includes a brake pad coupled to the one or more plurality of wheels and a pedal actuator coupled to the distal end and to the brake pad with actuation of the pedal actuator initiating contact between the brake pad and the one or more plurality of wheels.

4. The mobility cargo platform of claim 1 wherein the plurality of wheels includes a pair of rear wheels.

5. The mobility cargo platform of claim 4 further comprising a rear fender disposed proximate an outer perimeter of each rear wheel of the pair of rear wheels moving over a support surface, each rear fender configured for a partial arc about the outer perimeter enabling a rearward tilting of the cargo container in the closed mode and supported by the pair of rear wheels over the support surface, wherein the rearward tilting does not engage the support surface with either of the rear fenders.

6. The mobility cargo platform of claim 1;
    wherein the tube includes a longitudinal channel extending from the first location to the second location and a track assembly disposed along an outside of the tube extending upwardly from the first location to the second location;
    wherein the proximal end of the platform includes a track engagement assembly moveably coupled to the track assembly proximate the first location when in the in the riding mode and proximate the second location when in the stowed mode;
    wherein the track assembly includes a pair of vertically extending opposed channels coupled to an outer surface of the vertically extending central main support; and
    wherein the track engagement assembly includes a roller assembly coupled to the track assembly, the roller assembly including a first roller coupled to a first channel of the track assembly and a second roller coupled to a second channel of the track assembly.

7. The mobility cargo platform of claim 2 wherein the latching assembly further latches releasably the platform in the riding mode.

8. The mobility cargo platform of claim 7 wherein the latching assembly is configured to inhibit a forward pitching of the tube about the track engagement assembly when the platform is in the riding mode and loaded with a rider during forward motion.

9. The mobility cargo platform of claim 2;
    wherein the tube includes a longitudinal channel extending from the first location to the second location and a track assembly disposed along an outside of the tube extending upwardly from the first location to the second location;
    wherein the proximal end of the platform includes a track engagement assembly moveably coupled to the track assembly proximate the first location when in the in the riding mode and proximate the second location when in the stowed mode;
    wherein the track assembly includes a pair of vertically extending opposed channels coupled to an outer surface of the vertically extending central main support; and
    wherein the track engagement assembly includes a roller assembly coupled to the track assembly, the roller assembly including a first roller coupled to a first channel of the track assembly and a second roller coupled to a second channel of the track assembly;
    wherein the latching assembly further latches releasably the platform in the riding mode;
    wherein the latching assembly is configured to inhibit a forward pitching of the tube about the track engagement assembly when the platform is in the riding mode and loaded with a rider during forward motion; and
    wherein the latching assembly includes a sliding bolt including a biased pin for engagement with, and disengagement from, the track assembly.

10. The mobility cargo platform of claim 1 wherein the tube includes a track assembly extending from the first location to the second location, wherein the track assembly includes a pair of vertically extending lateral rails coupled to opposing outer surfaces of the tube; wherein the proximal end of the platform includes a track engagement assembly, and wherein the track engagement assembly includes a roller assembly coupled to the track assembly, the roller assembly including a first roller coupled to a first rail of the track assembly and a second roller coupled to a second rail of the track assembly.

11. The mobility cargo platform of claim 2 wherein the cargo container is an independent container configured to be repeatedly attached to and detached from the vertically extending central main support.

\* \* \* \* \*